US012561946B2

(12) United States Patent
Rahmes et al.

(10) Patent No.: US 12,561,946 B2
(45) Date of Patent: Feb. 24, 2026

(54) OBJECT DETECTION DEVICE INCORPORATING QUANTUM COMPUTING AND GAME THEORETIC OPTIMIZATION AND RELATED METHODS

(71) Applicant: EAGLE TECHNOLOGY, LLC, Melbourne, FL (US)

(72) Inventors: Mark D. Rahmes, Melbourne, FL (US); Glenn Boudreaux, Melbourne, FL (US); William W. Watkins, Melbourne Beach, FL (US); Morteza Akbari, Rockledge, FL (US); Michael C. Garrett, Melbourne, FL (US); Chad Lau, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 258 days.

(21) Appl. No.: 18/322,758

(22) Filed: May 24, 2023

(65) Prior Publication Data

US 2024/0355089 A1 Oct. 24, 2024

Related U.S. Application Data

(63) Continuation-in-part of application No. 17/200,388, filed on Mar. 12, 2021, now Pat. No. 12,265,882.

(51) Int. Cl.
*G06V 10/75* (2022.01)
*G06N 10/60* (2022.01)
*G06V 10/762* (2022.01)

(52) U.S. Cl.
CPC ............. *G06V 10/76* (2022.01); *G06N 10/60* (2022.01); *G06V 10/762* (2022.01)

(58) Field of Classification Search
CPC .......... G06N 10/20; G06N 3/08; G06N 3/044; G06N 3/045
See application file for complete search history.

(56) References Cited

U.S. PATENT DOCUMENTS 6,272,479 B1 8/2001 Farry et al.
6,518,018 B1 2/2003 Szostak et al.
(Continued)

FOREIGN PATENT DOCUMENTS

CN 105531725 4/2016
CN 108256651 7/2018
(Continued)

OTHER PUBLICATIONS

U.S. Appl. No. 18/322,777, filed May 24, 2023 Lui et al.
(Continued)

*Primary Examiner* — Akwasi M Sarpong
*Assistant Examiner* — Michael L Burleson
(74) *Attorney, Agent, or Firm* — ALLEN, DYER, DOPPELT, GILCHRIST, P.A. Attorneys at Law

(57) ABSTRACT

An object detection device may include a variational auto-encoder (VAE) configured to encode image data to generate a latent vector, and decode the latent vector to generate new image data. The object detection device may also include a quantum computing circuit configured to perform quantum subset summing, and a processor. The processor may be configured to generate a game theory reward matrix for a plurality of different deep learning models, cooperate with the quantum computing circuit to perform quantum subset summing of the game theory reward matrix, select a deep learning model from the plurality thereof based upon the quantum subset summing of the game theory reward matrix, and process the new image data using the selected deep learning model for object detection.

24 Claims, 40 Drawing Sheets

(56) References Cited

U.S. PATENT DOCUMENTS

| | | | |
|---|---|---|---|
| 7,069,282 | B2 | 6/2006 | Rizzotto et al. |
| 7,203,715 | B2 | 4/2007 | Rizzotto et al. |
| 7,334,008 | B2 | 2/2008 | Branciforte et al. |
| 7,359,928 | B2 | 4/2008 | Porto et al. |
| 7,400,282 | B2 | 7/2008 | Tanaka et al. |
| 8,077,988 | B2 | 12/2011 | Donoho |
| 8,583,903 | B2 | 11/2013 | Freedman et al. |
| 9,047,571 | B2 | 6/2015 | Miller et al. |
| 9,693,361 | B2 | 6/2017 | Learned et al. |
| 10,176,433 | B2 | 1/2019 | Hastings et al. |
| 10,423,887 | B2 | 9/2019 | Roetteler et al. |
| 10,505,524 | B1 | 12/2019 | Cohen et al. |
| 10,592,216 | B1 | 3/2020 | Richardson et al. |
| 10,664,761 | B2 | 5/2020 | Haener et al. |
| 10,666,238 | B1 | 5/2020 | Cohen et al. |
| 10,713,582 | B2 | 7/2020 | Dadashikelayeh |
| 10,846,407 | B1 | 11/2020 | Serebryany et al. |
| 11,120,357 | B2 | 9/2021 | Zeng et al. |
| 2003/0149511 | A1 | 8/2003 | Rizzotto et al. |
| 2004/0059765 | A1 | 3/2004 | Rizzotto et al. |
| 2004/0130956 | A1 | 7/2004 | Porto et al. |
| 2004/0162640 | A1 | 8/2004 | Branciforte et al. |
| 2004/0179622 | A1 | 9/2004 | Calabro et al. |
| 2006/0224547 | A1 | 10/2006 | Ulyanov et al. |
| 2007/0120727 | A1 | 5/2007 | Tanaka et al. |
| 2008/0033672 | A1 | 2/2008 | Gulati |
| 2008/0140746 | A1 | 6/2008 | Papageorgiou et al. |
| 2008/0140749 | A1 | 6/2008 | Amato et al. |
| 2011/0161638 | A1 | 6/2011 | Freedman et al. |
| 2014/0192388 | A1 | 7/2014 | Miller et al. |
| 2016/0202195 | A1 | 7/2016 | Wittwer et al. |
| 2017/0147695 | A1 | 5/2017 | Shit |
| 2017/0330101 | A1 | 11/2017 | Hastings et al. |
| 2018/0038973 | A1 | 2/2018 | Ascough et al. |
| 2018/0038975 | A1 | 2/2018 | Rahmes et al. |
| 2018/0144262 | A1 | 5/2018 | Roetteler et al. |
| 2018/0324595 | A1 | 11/2018 | Shima |
| 2019/0340532 | A1 | 11/2019 | Ducore et al. |
| 2019/0361675 | A1 | 11/2019 | Haener et al. |
| 2019/0362270 | A1 | 11/2019 | Haener et al. |
| 2020/0097859 | A1 | 3/2020 | Hu et al. |
| 2020/0125402 | A1 | 4/2020 | Griffin et al. |
| 2020/0134107 | A1 | 4/2020 | Low et al. |
| 2020/0169317 | A1 | 5/2020 | Rahmes et al. |
| 2020/0169458 | A1* | 5/2020 | Rahmes ............ H04B 7/18506 |
| 2020/0198138 | A1 | 6/2020 | Nagayama et al. |
| 2020/0202247 | A1 | 6/2020 | Hu et al. |
| 2020/0202249 | A1 | 6/2020 | Hastings |
| 2020/0218518 | A1 | 7/2020 | Gambetta et al. |
| 2020/0272930 | A1 | 8/2020 | Aspuru-Guzik et al. |
| 2021/0192386 | A1 | 6/2021 | Cabrita Condessa et al. |
| 2021/0241292 | A1* | 8/2021 | Pandey .................. G06N 3/044 |
| 2021/0314081 | A1 | 10/2021 | Shattil et al. |
| 2021/0319315 | A1 | 10/2021 | Hutmacher et al. |
| 2022/0053005 | A1 | 2/2022 | Liu et al. |
| 2022/0101116 | A1 | 3/2022 | Sheikholeslami et al. |
| 2022/0172050 | A1* | 6/2022 | Dalli ...................... G06N 3/047 |
| 2022/0295495 | A1 | 9/2022 | Rahmes et al. |
| 2022/0300843 | A1 | 9/2022 | Rahmes et al. |
| 2022/0327419 | A1* | 10/2022 | Brooks ............... G06F 16/9024 |

FOREIGN PATENT DOCUMENTS

| | | |
|---|---|---|
| CN | 108596248 | 9/2018 |
| CN | 110943793 | 3/2020 |
| CN | 112039820 | 12/2020 |
| CN | 113065520 | 7/2021 |
| CN | 113627151 | 11/2021 |
| WO | WO2021257128 | 12/2021 |

OTHER PUBLICATIONS

U.S. Appl. No. 18/322,851, filed May 24, 2023 Lau et al.
U.S. Appl. No. 18/322,885, filed May 24, 2023 Lau et al.
U.S. Appl. No. 17/935,289, filed Sep. 26, 2022 Rhames et al.
Gao et al. "Cross-Modal Object Detection Based on a Knowledge Update" Sensors 2022, 22(4), 1338; Feb. 10, 2022; https://www.mdpi.com/1424-8220/22/4/1338/htm; pp. 15.
Garg et al. "Advances in quantum deep learning: An overview" arXiv preprint arXiv:2005.04316. (2020); pp. 17.
Xiao et al. "A Review of Research on Signal Modulation Recognition Based on Deep Learning" https://www.mdpi.com/2079-9292/11/17/2764/htm: pp. 29 Electronics 2022, 11(17), 2764.
Papernot et al. "Distillation as a Defense to Adversarial Perturbations Against Deep Neural Networks" 2016 IEEE Symposium on Security and Privacy (SP), 2016, pp. 582-597.
Casares et al. "A Quantum Interior-Point Predictor-Corrector Algorithm for Linear Programming" Journal of physics A: Mathematical and Theoretical, 53(44), 445305. pp. 21.
Chivukula et al. "Game theoretical adversarial deep learning with variational adversaries" IEEE Transactions on Knowledge and Data Engineering, 33(11), 2020; 3568-3581.
Chang et al. "Integer Programming from Quantum Annealing and Open Quantum Systems" Integer Programming from Quantum Annealing and Open Quantum Systems. arXiv preprint arXiv:2009.11970. 2020: pp. 10.
Stein et al. "EQC: Ensembled Quantum Computing for Variational Quantum Algorithms" EQC: ensembled quantum computing for variational quantum algorithms. In Proceedings of the 49th Annual International Symposium on Computer Architecture (pp. 59-71). Jun. 2022; pp. 13.
Ramezani et al. "Machine Learning Algorithms in Quantum Computing: A Survey" Machine learning algorithms in quantum computing: A survey. In 2020 International joint conference on neural networks (IJCNN) IEEE. Jul. 2020; pp. 8.
Side et al. "Applying Quantum Optimization Algorithms for Linear Programming" https://www.preprints.org/manuscript/201703.0238/v3 ; 2017; pp. 6.
Erol et al. "Detecting Quantum Speedup of HHL Algorithm for Linear Programming Scenarios" https://www.preprints.org/manuscript/201705.0128/v1 2017 pp. 7.
Yuen et al."Optimum Testing of Multiple Hypotheses in Quantum Detection Theory" IEEE Transactions on Information Theory, vol. IT-21, No. 2, Mar. 1975; pp. 10.
Bennett et al. "Quantum cryptography without Bell's theorem" Physical review letters 68, No. 5 (1992): 557. pp. 3.
Alcazar et al. "GEO: Enhancing Combinatorial Optimization with Classical and Quantum Generative Models" https://www.researchsquare.com/article/rs-241950/latest.pdf?force_isolation=true: Aug. 8, 2022; pp. 17.
Chen et al. "Fast optimal structures generator for parameterized quantum circuits" pp. 10 arXiv preprint arXiv:2201.03309(2022). https://arxiv.org/abs/2201.03309?force_isolation=true.
Rivas et al. "Hybrid Quantum Variational Autoencoders for Representation Learning" In Proceedings of the 19th International Conference on Scientific Computing (CSC 2021), Las Vegas, NV, USA, pp. 15-17. 2021. pp. 6.
Flitney et al. "An introduction to quantum game theory" Fluctuation and Noise Letters, 2, No. 4 (2002): R175-R187. pp. 8.
Piotrowski et al. "An Invitation to Quantum Game Theory" International Journal of Theoretical Physics 42, No. 5 (2003): 1089-1099. pp. 19.
Grabbe, J. Orlin "An Introduction to Quantum Game Theory" arXiv preprint quant-ph/0506219 (2005). https://arxiv.org/abs/quant-ph/0506219?force_isolation=true. pp. 69.
Ghosh, Indranil "Quantum Game Theory- A Comprehensive Study" Resonance 26, No. 5 (2021): 671-684. pp. 14.
Stoob et al. "Quantum Computing for Applications in Data Fusion" IEEE Transactions on Aerospace and Electronic Systems (2022). pp. 11.
Usama et al. "Black-box adversarial ML attack on modulation classification" arXiv preprint arXiv:1908.00635.(2019). pp. 3.
Wei et al. "Adversarial Deception in Deep Learning: Analysis and Mitigation" In 2020 Second IEEE International Conference on Trust, Privacy and Security in Intelligent Systems and Applications (TPS-ISA) IEEE. Oct. 2020; pp. 236-245.

(56) References Cited

OTHER PUBLICATIONS

Zhou et al. "A survey of game theoretic approach for adversarial machine learning" Wiley Interdisciplinary Reviews: Data Mining and Knowledge Discovery, 9(3), e1259. 2019; pp. 15.

Xu et al. "Adversarial attacks and defenses in images, graphs and text: A review" International Journal of Automation and Computing, 17(2), 2020151-178.

Carlini et al. "Towards evaluating the robustness of neural networks" In 2017 IEEE symposium on security and privacy (sp) May 2017; pp. 39-57.

Sutanto et al. "Real-time adversarial attack detection with deep image prior initialized as a high-level representation based biurring network" Electronics, 10(1), 52 pp. 17.

Szegedy et al. "Intriguing properties of neural networks" arXiv preprint arXiv:1312.6199. 2013; pp. 10.

Tang et al. "Adversarial Deception on Deep-Learning Based Radio Waveforms Classification" In 2021 XXXIVth General Assembly and Scientific Symposium of the International Union.

Kurakin et al. "Adversarial attacks and defences competition" In The NIPS '17 Competition: Building Intelligent Systems 2018: (pp. 195-231). Springer, Cham. pp. 36.

Liu et al. "A Game Theoretical Model for Adversarial Learning" A In 2009 IEEE International Conference on Data Mining Workshops (pp. 25-30). IEEE.

Abualsaud, K., Mahmuddin, M., Hussein, R., & Mohamed, A. (Jul. 2013). Performance evaluation for compression-accuracy trade-off using compressive sensing for EEG-based epileptic seizure detection in wireless tele-monitoring. In 2013 9th International Wireless Communications and Mobile Computing Conference (IWCMC) (pp. 231-236). IEEE.

Baraniuk, R. G., Goldstein, T., Sankaranarayanan, A. C., Studer, C., Veeraraghavan, A., & Wakin, M. B. (2017). Compressive video sensing: algorithms, architectures, and applications. IEEE Signal Processing Magazine, 34(1), 52-66.

Hanif, M. S., & Bilal, M. (2019). Competitive residual neural network for image classification. ICT Express.

He, K., Zhang, X., Ren, S., & Sun, J. (2016). Deep residual learning for image recognition. In Proceedings of the IEEE conference on computer vision and pattern recognition (pp. 770-778).

Kingma, D. P., & Ba, J. (2014). Adam: A method for stochastic optimization. arXiv preprint arXiv:1412.6980.

Krizhevsky, A., Sutskever, I., & Hinton, G. E. (2012). Imagenet classification with deep convolutional neural networks. In Advances in neural information processing systems (pp. 1097-1105).

Nawaz, T., Marcenaro, L., & Regazzoni, C. S. (2017). Cyclostationary-based jammer detection for wideband radios using compressed sensing and artificial neural network. International Journal of Distributed Sensor Networks, 13(12), 1550147717748900.

Oquab, M., Bottou, L., Laptev, I., & Sivic, J. (2014). Learning and transferring mid-level image representations using convolutional neural networks. In Proceedings of the IEEE conference on computer vision and pattern recognition (pp. 1717-1724).

O'Shea, T. J., Roy, T., & Clancy, T. C. (2018). Over-the-air deep learning-based radio signal classification. IEEE Journal of Selected Topics in Signal Processing, 12(1), 168-179.

Pandian, R., Vigneswara, T., & Kumari, S. L. (2016). Effects of Decomposition Levels of Wavelets in Image Compression Algorithms. Journal of Biomedical Sciences, 5(4), 29.

Ronneberger, O., Fischer, P., & Brox, T. (Oct. 2015). U-net: Convolutional networks for biomedical image segmentation. In International Conference on Medical image computing and computer-assisted intervention (pp. 234-241). Springer, Cham.

Rajendran, S., Meert, W., Giustiniano, D., Lenders, V., & Pollin, S. (2018). Deep learning models for wireless signal classification with distributed low-cost spectrum sensors. IEEE Transactions on Cognitive Communications and Networking, 4(3), 433-445.

Ramjee, S., Ju, S., Yang, D., Liu, X., Gamal, A. E., & Eldar, Y. C. (2019). Fast deep learning for automatic modulation classification. arXiv preprint arXiv:1901.05850.

Schilling, A., Matzner, C., Rietsch, J., Gerum, R., Schulze, H., & Krauss, P. (2018). How deep is deep enough?—Quantifying class separability in the hidden layers of deep neural networks. arXiv preprint arXiv:1811.01753.

Sejdic, E., Orovic, I., & Stankovic, S. (2018). Compressive sensing meets time-frequency: an overview of recent advances in time-frequency processing of sparse signals. Digital signal processing, 77, 22-35.

Sharma, D. K., Mishra, A., & Saxena, R. (2010). Analog & Digital Modulation Techniques: An overview. International Journal of Computing Science and Communication Technologies, 3(1), 2007.

Sharma, S. K., Lagunas, E., Chatzinotas, S., & Ottersten, B. (2016). Application of compressive sensing in cognitive radio communications: A survey. IEEE communications surveys & tutorials, 18(3), 1838-1860.

Simonyan, K., & Zisserman, A. (2014). Very deep convolutional networks for large-scale image recognition. arXiv preprint arXiv:1409.1556.

Talukder, K. H., & Harada, K. (2010). Haar wavelet-based approach for image compression and quality assessment of compressed image. arXiv preprint arXiv:1010.4084.

Tembine, H. (2019). Deep learning meets game theory: Bregman-based algorithms for interactive deep generative adversarial networks. IEEE transactions on cybernetics.

Wang, S., Sun, Z., Liu, S., Chen, X., & Wang, W. (Oct. 2014). Modulation classification of linear digital signals based on compressive sensing using high-order moments. In 2014 European Modelling Symposium (pp. 145-150). IEEE.

Junyi Liu, Bohua Zhan, Shuling Wang. Shenggang Ying, Tao Liu, Yangjia Li, Mingsheng Ying, Naijun Zhan. International Conference on Computer Aided Verification. Formal Verification of Quantum Algorithms Using Quantum Hoare Logic.

Zhou, L., & Man, H. (Nov. 2013). Distributed automatic modulation classification based on cyclic feature via compressive sensing. In MILCOM 2013-2013 IEEE Military Communications Conference (pp. 40-45). IEEE.

Ali, S. Coming to a Battlefield Near You: Quantum Computing, Artificial Intelligence, & Machine Learning's Impact on Proportionality.

Berendsen, R. G. (2019). The Weaponization of Quantum Mechanics: Quantum Technology in Future Warfare. US Army School of Advanced Military Studies Fort Leavenworth United States.

Cariolaro, Gianfranco, Quantum Communications, (2015), Springer International Publishing.

Cuccaro, S. A., Draper, T. G., Kutin, S. A., & Moulton, D. P. (2004). A new quantum ripple-carry addition circuit. arXiv preprint quant-ph/0410184.

Farhi, E., & Harrow, A. W. (2016). Quantum supremacy through the quantum approximate optimization algorithm. arXiv preprint arXiv:1602.07674.

Flitney, A. P., & Abbott, D. (2002). An introduction to quantum game theory. Fluctuation and Noise Letters, 2(04), R175-R187.

Hilary, Jack D., (2019) Quantum Computing: An Applied Approach, Springer Nature Switzerland AG.

Iqbal, A., & Toor, A. H. Quantum mechanics gives stability to a Nash equilibrium. Physical Review A Phys Rev A, 65, 022306.

Jordan, J. D. (2007). Updating Optimal Decisions Using Game Theory and Exploring Risk Behavior Through Response Surface Methodology.

Kalogeras, D. (2013). The quantum theory in decision making. Journal of Computations y Modelling, 3(4), 61-81.

Koiliaris, K., & Xu, C. (2019). Faster pseudopolynomial time algorithms for subset sum. ACM Transactions on Algorithms (TALG), 15(3), 1-20.

Liffiton, M. H., & Sakallah, K. A. (2008). Algorithms for computing minimal unsatisfiable subsets of constraints. Journal of Automated Reasoning, 40(1), 1-33.

Moll, N., Barkoutsos, P., Bishop, L. S., Chow, J. M., Cross, A., Egger, D. J., . . . & Kandala, A. (2018). Quantum optimization using variational algorithms on near-term quantum devices. Quantum Science and Technology, 3(3), 030503.

(56) References Cited

OTHER PUBLICATIONS

Oliveira, D. S., & Ramos, R. V. (2007). Quantum bit string comparator: circuits and applications. Quantum Comput. Comput, 7(1), 17-26.

Paç, A. B. (2010). Row generation techniques for approximate solution of linear programming problems (Doctoral dissertation, bilkent university).

Preskill, John, Quantum Computing in the NISQ era and beyond, 2018, California Institute of Technology.

Rahmes, M., Wilder, K., Yates, H., & Fox, K. (2013). Near real time discovery and conversion of open source Information to a reward matrix. WMSCI 2013, 12.

Ruffinelli, D., & Barán, B. (2017). Linear nearest neighbor optimization in quantum circuits: a multiobjective perspective. Quantum Information Processing, 16(9), 220.

Takahashi, Y., Tani, S., & Kunihiro, N. (2009). Quantum addition circuits and unbounded fan-out. arXiv preprint arXiv:0910.2530.

Ulyanov, S. V., Litvintseva, L. V., Ulyanov, S. S., Takahashi, K., & Panfilov, A. L. (2004). Computational intelligence with quantum game's approach and robust decision-making in communication information uncertainty. In Proceedings of Internat. Conf. on Computational Intelligence (pp. 172-187).

Wayne, L. (2004). Winston (2004). Operations Research, Applications and Algorithms. Duxbury Press.

Wendin, G. (2017). Quantum information processing with superconducting circuits: a review. Reports on Progress in Physics, 80(10), 106001.

Wolff, M., Wirsching, G., Huber, M., Graben, P. B., Römer, R., & Schmitt, I. (2018). A Fock Space Toolbox and Some Applications in Computational Cognition. Unpublished. Retrieved from http://rgdoi.net/10.13140/RG.2.2.10025.70245.

Yukalov, V. I., & Somette, D. (2009). Processing information in quantum decision theory. Entropy, 11(4), 1073-1120.

Robert Rand, Jennifer Paykin, Steve Zdancewic. 14th International Conference on Quantum Physics and Logic (QPL). 2018. QWIRE Practice: Formal Verification of Quantum Circuits in Coq.

Robert Rand, Kesha Hietala, and Kartik Singhal. POPL 2020. Verified Quantum Computing.

Roch C, Phan T, Feld S, et al. A Quantum Annealing Algorithm for Finding Pure Nash Equilibria in Graphical Games. Computational Science—ICCS 2020. 2020;12142:488-501. Published May 25, 2020.

Piotrowski, Edward & Sladkowski, Jan. (2003). The next stage: quantum game theory.

Chiu Fan Lee and Neil F. Johnson (2002) "Let the Quantum Games Begin" Centre for Quantum Computation, Clarendon Laboratory, Oxford University Oct. 2, 2002.

E Farhi, J Goldstone, S Gutmann, A quantum approximate optimization algorithm (QAOA), arXiv preprint arXiv:1411.4028, 2014—arxiv.org.

Rahmes, Billhartz, Chester, Lau (2020) "Optimal Deep Learning Signal Classification with Wavelet Compressive Sensing" Interservice/Industry Training, Simulation, and Education Conference (I/ITSEC), Aug. 24, 2020.

Rahmes, Billhartz, Cocks (2020) "A Quantum Computing Algorithm for Subset Summing Optimization" Interservice/Industry Training, Simulation, and Education Conference (I/ITSEC), Sep. 24, 2020.

https://www.cei.se/quantum-computing-and-qc-assisted-communications.

M. Rahmes, R. Clouse, J. Virts, G. Yakimovicz, B. Rees and W. Talbert, "Cognitive mission planning and system orchestration," 2017 International Conference on Computing, Networking and Communications (ICNC), 2017, pp. 745-749.

Daniel Evans (2018) "Dissecting a Quantum Program", Seidenberg School of CSIS, Pace University, Pleasantville, New York, Proceedings of Student-Faculty Research Day, CSIS, Pace University, May 4, 2018.

* cited by examiner

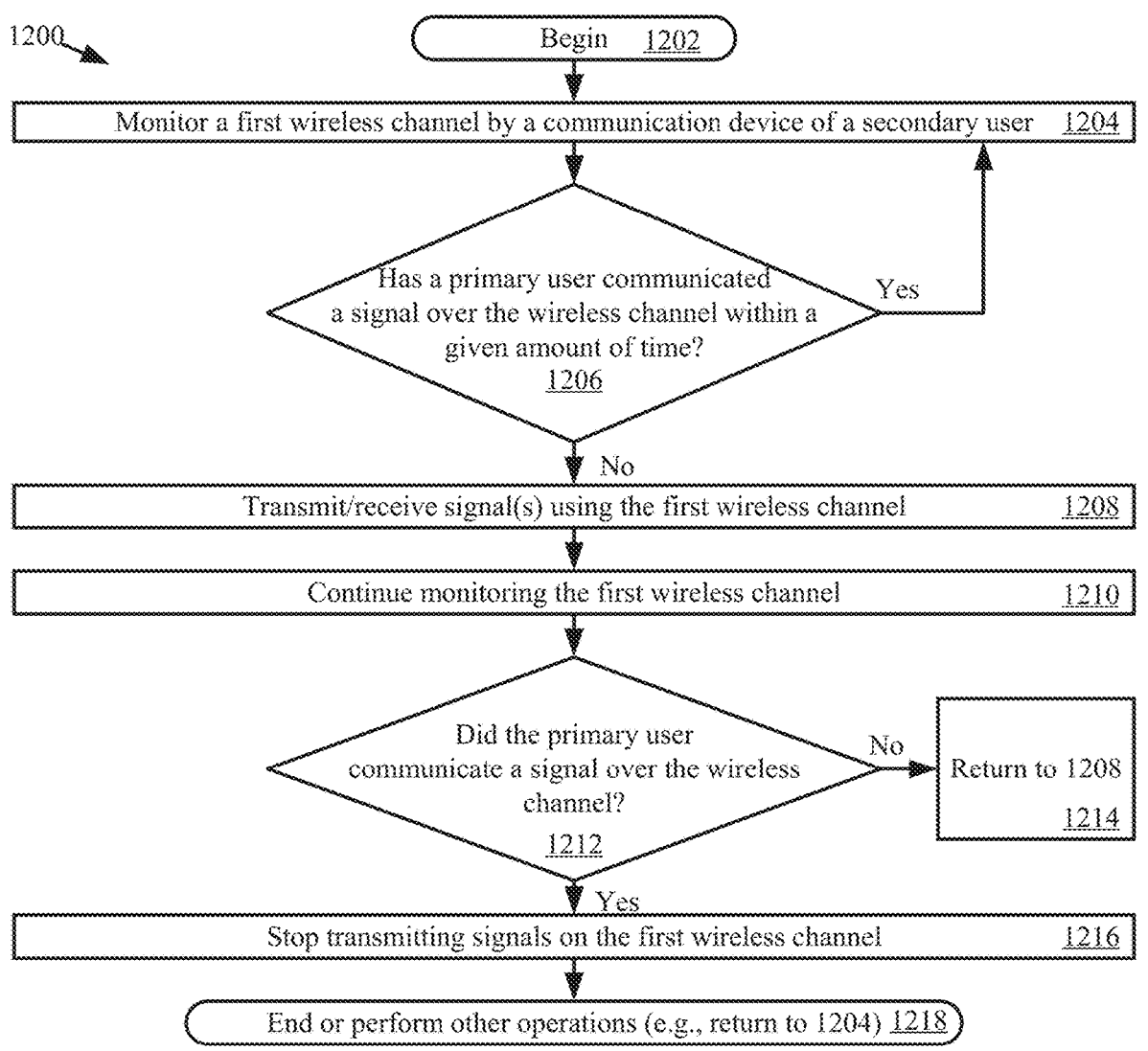

1200

Begin     1202

Monitor a first wireless channel by a communication device of a secondary user     1204

Has a primary user communicated a signal over the wireless channel within a given amount of time?
1206

Yes

No

Transmit/receive signal(s) using the first wireless channel     1208

Continue monitoring the first wireless channel     1210

Did the primary user communicate a signal over the wireless channel?
1212

No

Return to 1208

1214

Yes

Stop transmitting signals on the first wireless channel     1216

End or perform other operations (e.g., return to 1204) 1218

| Machine Learning Algorithm | Modulation Class | Confidence Score |
|---|---|---|
| $A_1$ | $M_1$ | $S_{1-1}$ |
| $A_1$ | $M_2$ | $S_{1-2}$ |
| $\vdots$ | $\vdots$ | $\vdots$ |
| $A_1$ | $M_{24}$ | $S_{1-24}$ |
| $A_2$ | $M_1$ | $S_{2-1}$ |
| $A_2$ | $M_2$ | $S_{2-2}$ |
| $\vdots$ | $\vdots$ | $\vdots$ |
| $A_2$ | $M_{24}$ | $S_{2-24}$ |
| $\vdots$ | $\vdots$ | $\vdots$ |
| $A_N$ | $M_1$ | $S_{N-1}$ |
| $A_N$ | $M_2$ | $S_{N-2}$ |
| $\vdots$ | $\vdots$ | $\vdots$ |
| $A_N$ | $M_{24}$ | $S_{N-24}$ |

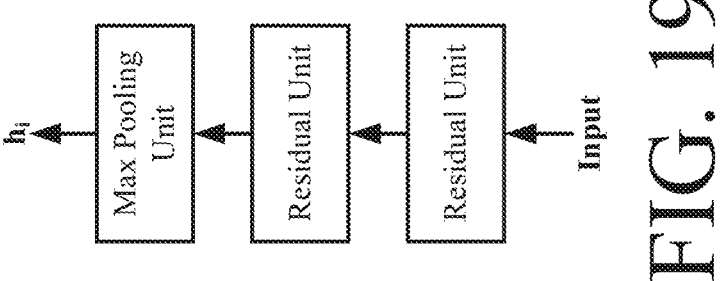
FIG. 19
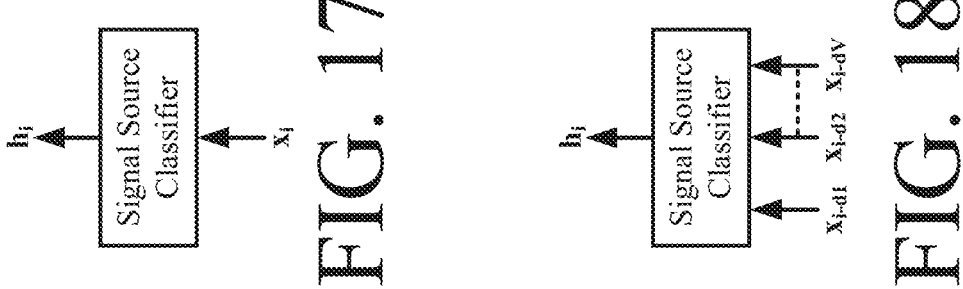
FIG. 17
FIG. 18

| Machine Learning Algorithm | Modulation Class | | | | |
|---|---|---|---|---|---|
| | $M_1$ | $M_2$ | | | $M_{24}$ |
| $A_1$ | $S_{1-1}$ | $S_{1-2}$ | | | $S_{1-24}$ |
| $A_2$ | --------- | --------- | | | ------- |
| --------- | | | | | |
| $A_N$ | $S_{N-1}$ | $S_{N-2}$ | | | $S_{N-24}$ |

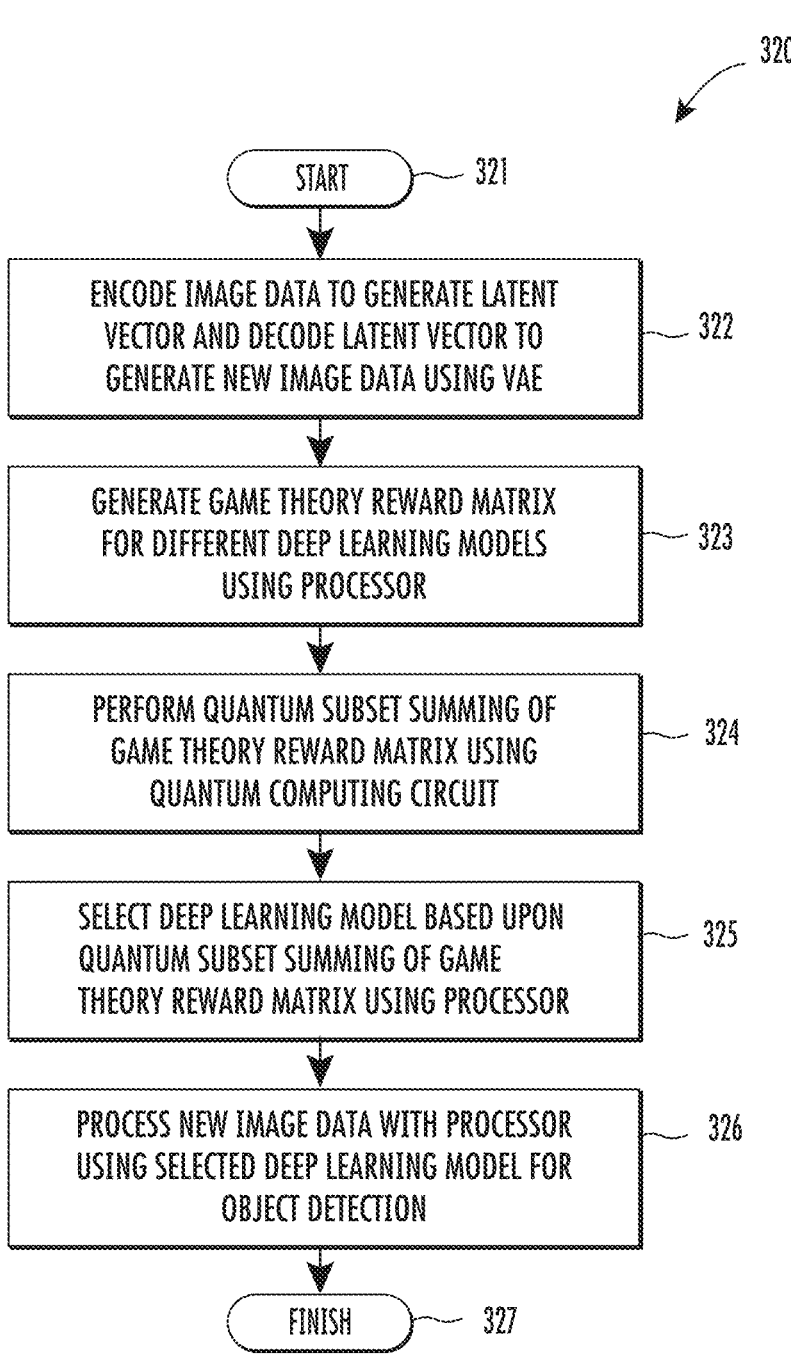

*320*

START — *321*

ENCODE IMAGE DATA TO GENERATE LATENT VECTOR AND DECODE LATENT VECTOR TO GENERATE NEW IMAGE DATA USING VAE — *322*

GENERATE GAME THEORY REWARD MATRIX FOR DIFFERENT DEEP LEARNING MODELS USING PROCESSOR — *323*

PERFORM QUANTUM SUBSET SUMMING OF GAME THEORY REWARD MATRIX USING QUANTUM COMPUTING CIRCUIT — *324*

SELECT DEEP LEARNING MODEL BASED UPON QUANTUM SUBSET SUMMING OF GAME THEORY REWARD MATRIX USING PROCESSOR — *325*

PROCESS NEW IMAGE DATA WITH PROCESSOR USING SELECTED DEEP LEARNING MODEL FOR OBJECT DETECTION — *326*

FINISH — *327*

FIG. 32

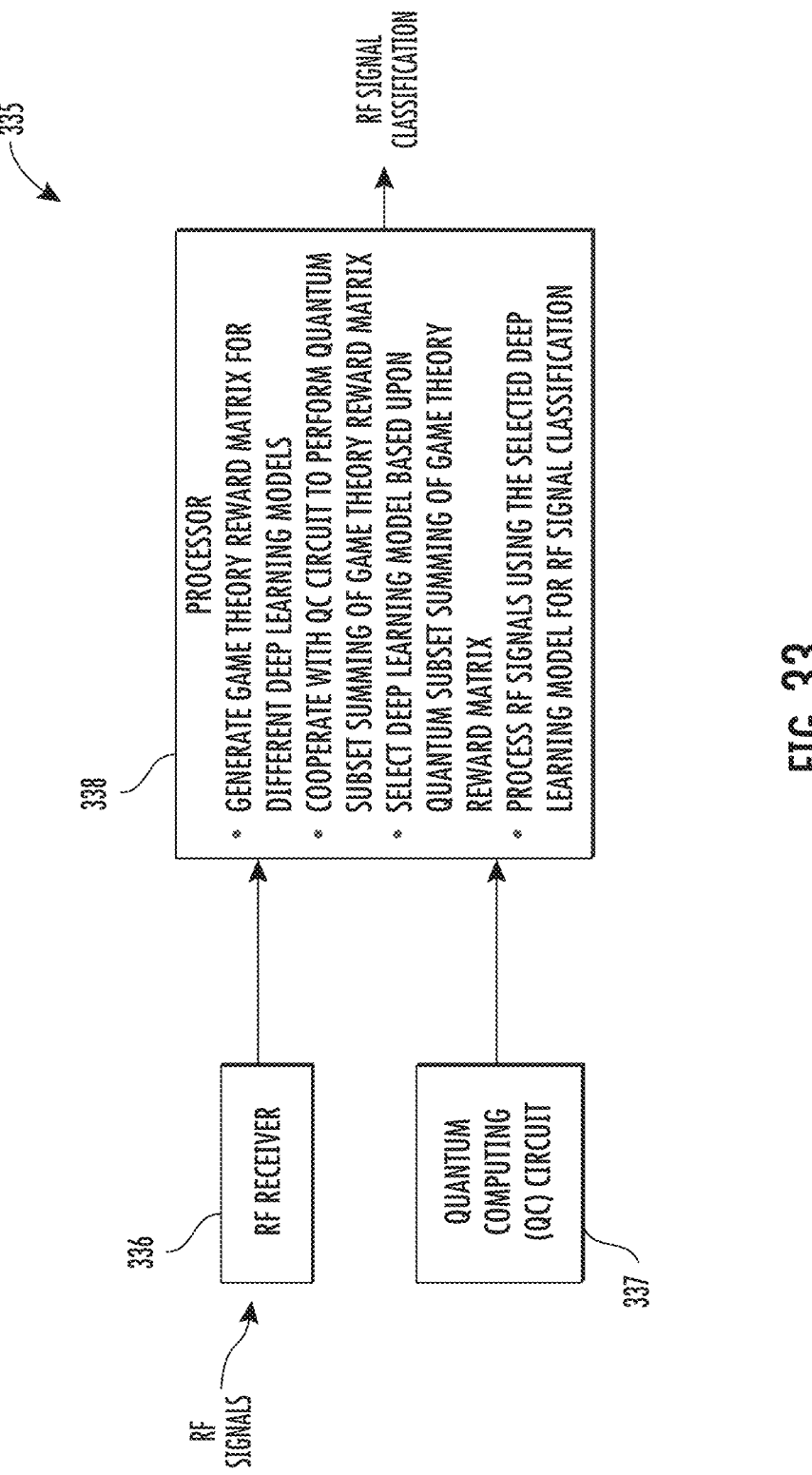

335

PROCESSOR

338

• GENERATE GAME THEORY REWARD MATRIX FOR DIFFERENT DEEP LEARNING MODELS
• COOPERATE WITH QC CIRCUIT TO PERFORM QUANTUM SUBSET SUMMING OF GAME THEORY REWARD MATRIX
• SELECT DEEP LEARNING MODEL BASED UPON QUANTUM SUBSET SUMMING OF GAME THEORY REWARD MATRIX
• PROCESS RF SIGNALS USING THE SELECTED DEEP LEARNING MODEL FOR RF SIGNAL CLASSIFICATION

RF SIGNAL CLASSIFICATION

336          RF RECEIVER

337          QUANTUM COMPUTING (QC) CIRCUIT

RF SIGNALS

FIG. 33

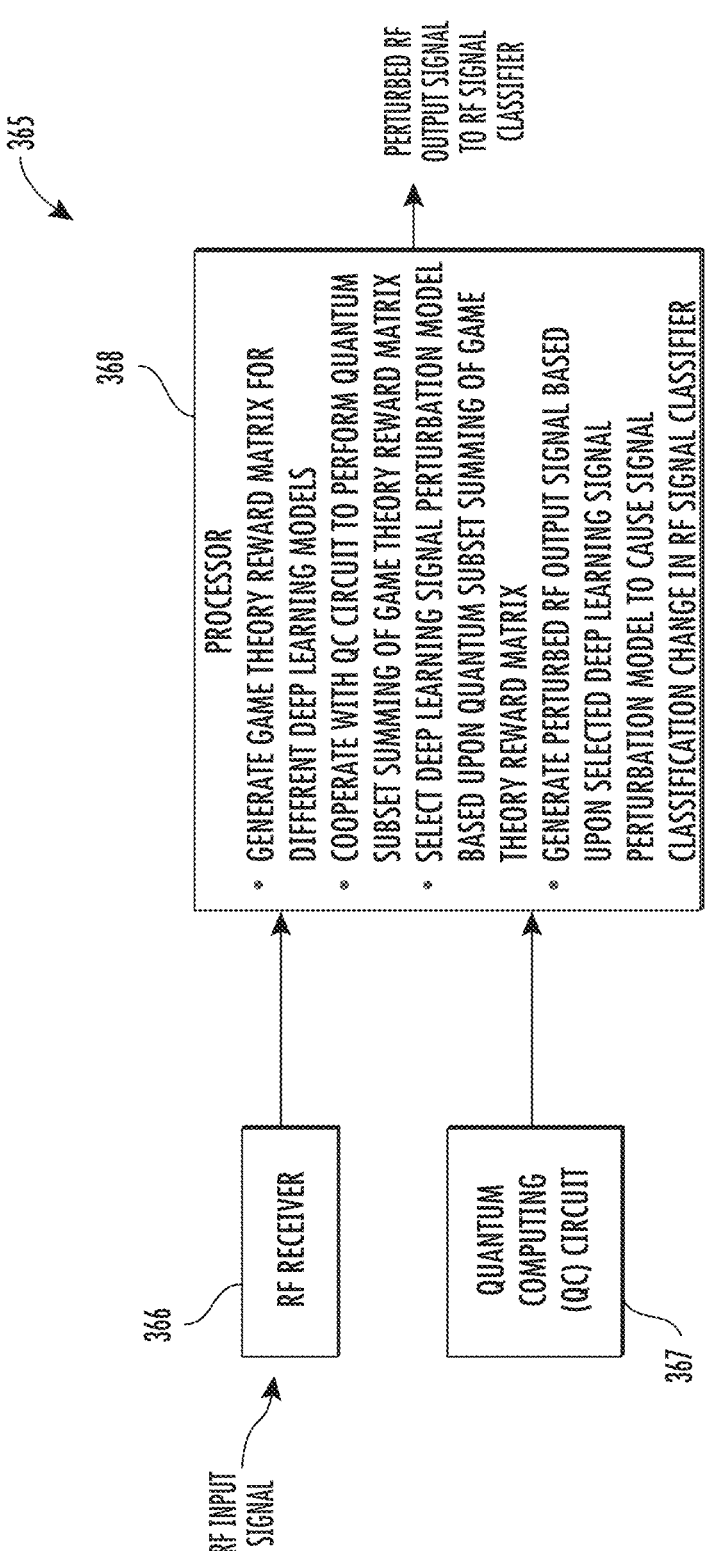

365

368

PROCESSOR

- GENERATE GAME THEORY REWARD MATRIX FOR DIFFERENT DEEP LEARNING MODELS
- COOPERATE WITH QC CIRCUIT TO PERFORM QUANTUM SUBSET SUMMING OF GAME THEORY REWARD MATRIX
- SELECT DEEP LEARNING SIGNAL PERTURBATION MODEL BASED UPON QUANTUM SUBSET SUMMING OF GAME THEORY REWARD MATRIX
- GENERATE PERTURBED RF OUTPUT SIGNAL BASED UPON SELECTED DEEP LEARNING SIGNAL PERTURBATION MODEL TO CAUSE SIGNAL CLASSIFICATION CHANGE IN RF SIGNAL CLASSIFIER

366

RF RECEIVER

367

QUANTUM COMPUTING (QC) CIRCUIT

RF INPUT SIGNAL

PERTURBED RF OUTPUT SIGNAL TO RF SIGNAL CLASSIFIER

FIG. 36

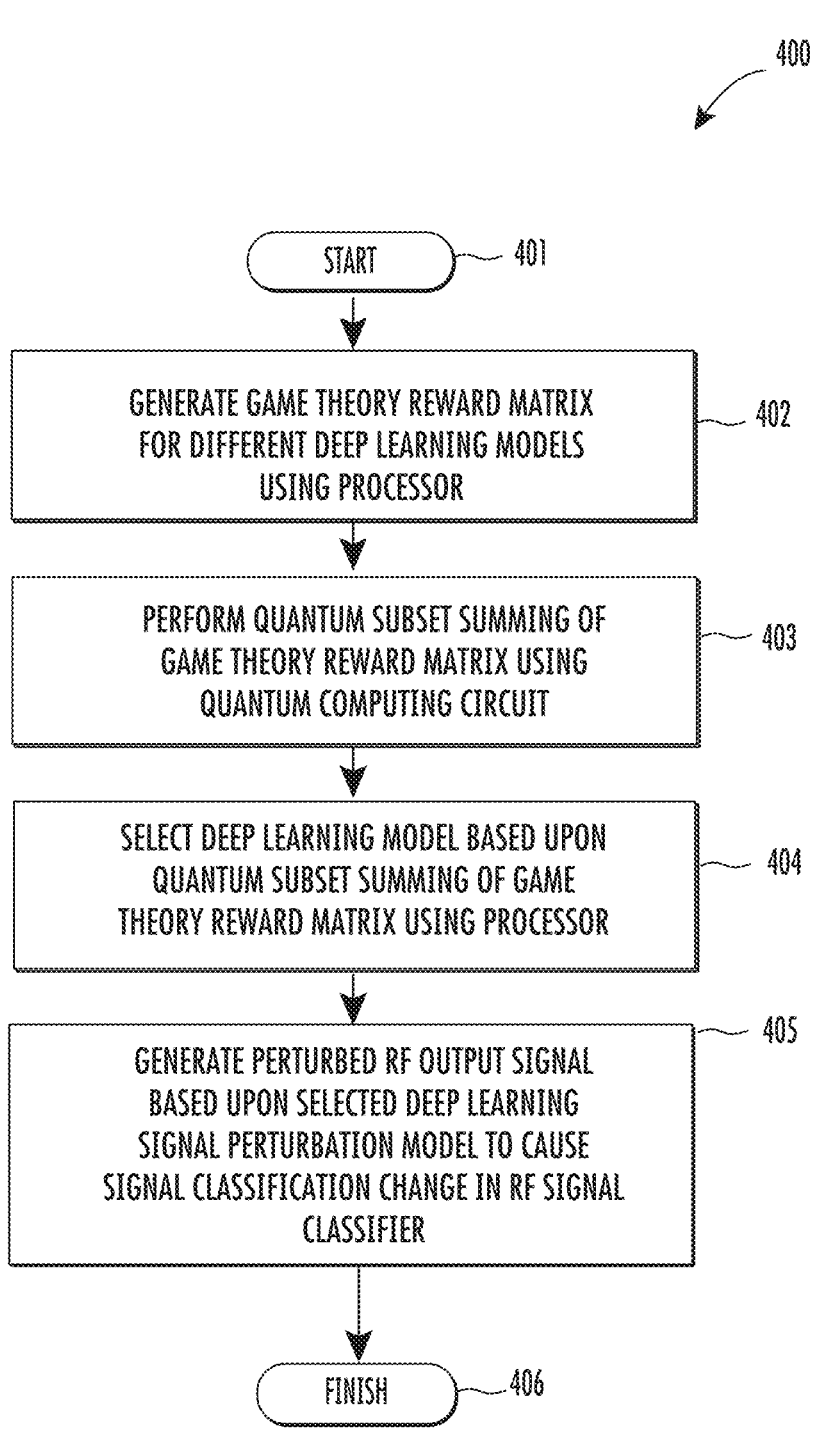

400

START — 401

GENERATE GAME THEORY REWARD MATRIX FOR DIFFERENT DEEP LEARNING MODELS USING PROCESSOR — 402

PERFORM QUANTUM SUBSET SUMMING OF GAME THEORY REWARD MATRIX USING QUANTUM COMPUTING CIRCUIT — 403

SELECT DEEP LEARNING MODEL BASED UPON QUANTUM SUBSET SUMMING OF GAME THEORY REWARD MATRIX USING PROCESSOR — 404

GENERATE PERTURBED RF OUTPUT SIGNAL BASED UPON SELECTED DEEP LEARNING SIGNAL PERTURBATION MODEL TO CAUSE SIGNAL CLASSIFICATION CHANGE IN RF SIGNAL CLASSIFIER — 405

FINISH — 406

| | HOP FREQUENCY METRIC 0 | ... | HOP FREQUENCY METRIC M-1 | WAVEFORM SELECTION METRIC 0 | ... | WAVEFORM SELECTION METRIC W-1 | RATE SELECTION METRIC 0 | ... | RATE SELECTION METRIC R-1 |
|---|---|---|---|---|---|---|---|---|---|
| FREQUENCY BIN 0 AND WAVEFORM 0 AND RATE 0 | $p_{00}^{(FH_0)}(0)$ | ... | $p_{00}^{(FH_{M-1})}(0)$ | $p_{00}^{(WS_0)}(0)$ | ... | $p_{00}^{(WS_{W-1})}(0)$ | $p_{00}^{(RS_0)}(0)$ | ... | $p_{00}^{(RS_{R-1})}(0)$ |
| ... | | ... | | | ... | | | ... | |
| FREQUENCY BIN N-1 AND WAVEFORM 0 AND RATE 0 | $p_{00}^{(FH_0)}(N-1)$ | ... | $p_{00}^{(FH_{M-1})}(N-1)$ | $p_{00}^{(WS_0)}(N-1)$ | ... | $p_{00}^{(WS_{W-1})}(N-1)$ | $p_{00}^{(RS_0)}(N-1)$ | ... | $p_{00}^{(RS_{R-1})}(N-1)$ |
| FREQUENCY BIN 0 AND WAVEFORM 1 AND RATE 0 | $p_{10}^{(FH_0)}(0)$ | | $p_{10}^{(FH_{M-1})}(0)$ | $p_{10}^{(WS_0)}(0)$ | | $p_{10}^{(WS_{W-1})}(0)$ | $p_{10}^{(RS_0)}(0)$ | | $p_{10}^{(RS_{R-1})}(0)$ |
| ... | | | | | | | | | |
| FREQUENCY BIN N-1 AND WAVEFORM 1 AND RATE 0 | $p_{10}^{(FH_0)}(N-1)$ | | $p_{10}^{(FH_{M-1})}(N-1)$ | $p_{10}^{(WS_0)}(N-1)$ | | $p_{10}^{(WS_{W-1})}(N-1)$ | $p_{10}^{(RS_0)}(N-1)$ | | $p_{10}^{(RS_{R-1})}(N-1)$ |
| FREQUENCY BIN 0 AND WAVEFORM 0 AND RATE 1 | $p_{01}^{(FH_0)}(0)$ | | $p_{01}^{(FH_{M-1})}(0)$ | $p_{01}^{(WS_0)}(0)$ | | $p_{01}^{(WS_{W-1})}(0)$ | $p_{01}^{(RS_0)}(0)$ | | $p_{01}^{(RS_{R-1})}(0)$ |
| ... | | | | | | | | | |
| FREQUENCY BIN N-1 AND WAVEFORM 0 AND RATE 1 | $p_{01}^{(FH_0)}(N-1)$ | | $p_{01}^{(FH_{M-1})}(N-1)$ | $p_{01}^{(WS_0)}(N-1)$ | | $p_{01}^{(WS_{W-1})}(N-1)$ | $p_{01}^{(RS_0)}(N-1)$ | | $p_{01}^{(RS_{R-1})}(N-1)$ |

FIG. 44

OBJECT DETECTION DEVICE INCORPORATING QUANTUM COMPUTING AND GAME THEORETIC OPTIMIZATION AND RELATED METHODS

RELATED APPLICATIONS

This application is a continuation-in-part of U.S. application Ser. No. 17/200,388 filed Mar. 12, 2021, which is hereby incorporated herein in its entirety by reference.

TECHNICAL FIELD

The present disclosure relates generally to quantum computing systems and associated algorithms. More particularly, the present disclosure relates to implementing systems and methods for quantum computing based subset summing for decision making.

BACKGROUND

Automated decision making for strategic scenarios is an area of continued interest. However, many implementations require processing of extremely large amounts of input data, which can be a challenge with classical computing approaches.

Quantum computing shows promise to help provide the enhanced processing capabilities needed for automated decision making in such scenarios. Quantum computers use the properties of quantum physics to store data and perform computations. Quantum computers include specialized hardware on which qubits are stored, controlled and/or manipulated in accordance with a given application. The term "qubit" is used in the field to refer to a unit of quantum information. The unit of information can also be called a quantum state. A single qubit is generally represented by a vector $a|0>+b|1>$, where a and b are complex coefficients and $|0>$ and $|1>$ are the basis vectors for the two-dimensional complex vector space of single qubits. At least partially due to the qubit structure, quantum computers use the properties of quantum physics to perform computation, enabling advantages that can be applied to certain problems that are impractical for conventional computing devices.

One example approach is set forth in U.S. Pat. Pub. No. 2022/0300843 to Rahmes et al., which is also from the present Applicant. This publication discloses systems and methods for operating a quantum processor. The method includes receiving a reward matrix at the quantum processor, with the reward matrix including a plurality of values that are in a given format and arranged in a plurality of rows and a plurality of columns. The method further includes converting, by the quantum processor, the given format of the plurality of values to a qubit format, and performing, by the quantum processor, subset summing operations to make a plurality of row selections based on different combinations of the values in the qubit format. The method also further includes using, by the quantum processor, the plurality of row selections to determine a normalized quantum probability for a selection of each row of the plurality of rows, and making, by the quantum processor, a decision based on the normalized quantum probabilities. Further, the method includes causing, by the quantum processor, operations of an electronic device to be controlled or changed based on the decision.

Despite the advantages of such systems, further developments in the utilization of quantum computing techniques may be desirable in certain applications.

SUMMARY

An object detection device may include a variational autoencoder (VAE) configured to encode image data to generate a latent vector, and decode the latent vector to generate new image data. The object detection device may also include a quantum computing circuit configured to perform quantum subset summing, and a processor. The processor may be configured to generate a game theory reward matrix for a plurality of different deep learning models, cooperate with the quantum computing circuit to perform quantum subset summing of the game theory reward matrix, select a deep learning model from the plurality thereof based upon the quantum subset summing of the game theory reward matrix, and process the new image data using the selected deep learning model for object detection.

In an example embodiment, the game theory reward matrix may include rows corresponding to the different deep learning models, and columns corresponding to predictive deep learning metrics for the different deep learning models. In some embodiments, the processor may be configured to construct a 3D latent space for the selected deep learning model, generate clusters of eigenvalues from the selected model for different object classes, and process the new image data using the selected deep learning model for object detection based upon the clusters of eigenvalues. In an example implementation, the quantum computing circuit may be configured to construct a Z-test for a test observation for each object class. More particularly, the processor may be configured to determine a P-value for each Z-test, and to determine a target object class based a maximum P-value, for example.

By way of example, the plurality of different deep learning models may include at least some of Adaptive Moment Estimation (ADAM), Stochastic Gradient Descent with Momentum (SGDM), and RMSProp deep learning models. In an example embodiment, the VAE may include an encoder configured to generate a mean vector and a standard deviation vector from the image data, and generate the latent vector from the mean vector and the standard deviation vector. Also by way of example, the image data may comprise geospatial image data.

A related object detection method may include encoding image data to generate a latent vector, and decoding the latent vector to generate new image data, using a variational autoencoder (VAE), generating a game theory reward matrix for a plurality of different deep learning models using a processor, and performing quantum subset summing of the game theory reward matrix using a quantum computing circuit. The method may further include selecting a deep learning model from the plurality thereof based upon the quantum subset summing of the game theory reward matrix using the processor, and processing the new image data with the processor using the selected deep learning model for object detection.

BRIEF DESCRIPTION OF THE DRAWINGS

FIG. 12 is a flow diagram of an illustrative method for operating the system of FIG. 10.

FIGS. 17-19 are schematic block diagrams of example machine learning algorithm architectures.

FIG. 20 is a table that is useful for understanding game theory.

FIG. 32 is a flow diagram illustrating example method aspects associated with the object detection device of FIG. 25.

FIG. 33 is a schematic block diagram of an RF signal classification device which incorporates quantum computing techniques in accordance with an example embodiment.

FIG. 36 is a schematic block diagram of a perturbation RF signal generator which incorporates quantum computing techniques in accordance with an example embodiment.

FIG. 40 is a flow diagram illustrating example method aspects associated with the perturbation RF signal generator of FIG. 36.

FIG. 44 is a table illustrating a reward matrix which may be used with the cognitive radio device of FIG. 41 in an example embodiment.

DETAILED DESCRIPTION

Figure 1:
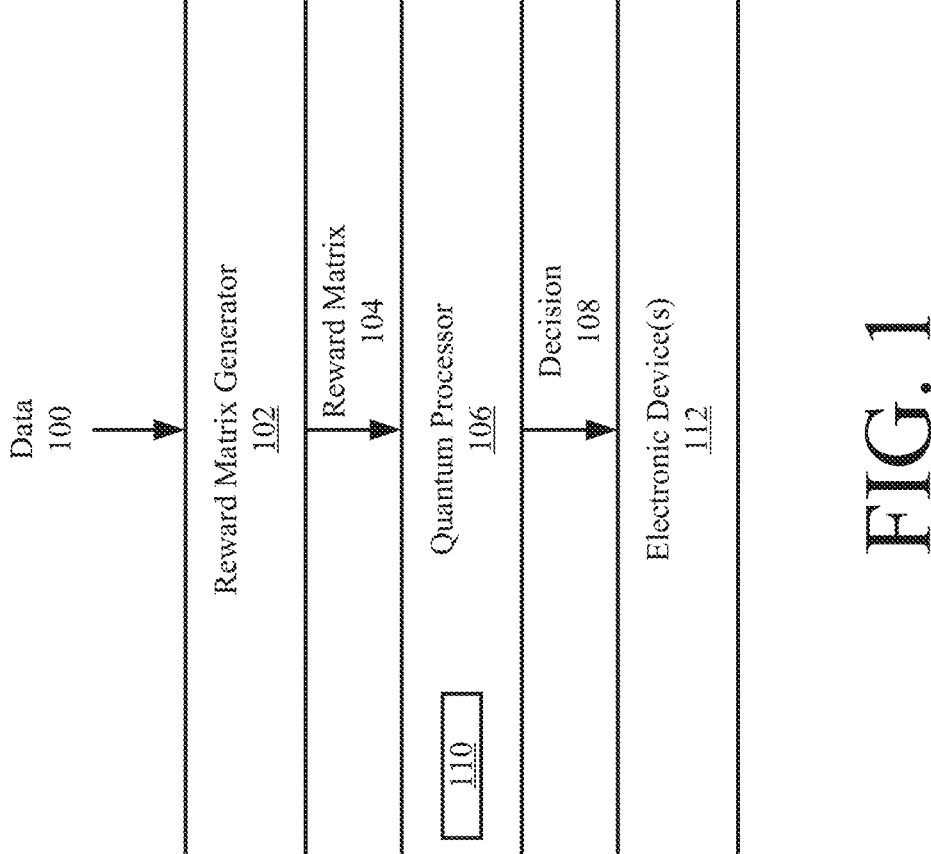
FIG. 1 is a schematic block diagram of an illustrative system implementing the present approach.

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

By way of background, quantum computers exist today that use the properties of quantum physics to store data and perform computations. Quantum computers comprise specialized hardware on which qubits are stored, controlled and/or manipulated in accordance with a given application. Quantum computers process certain problems faster as compared to conventional computing devices due to their use of qubits to represent multiple problem states in parallel. However, there is no quantum equivalent approach to the classical computing approaches to automated decision-making for strategic scenarios. These classical computing approaches are limited by memory, time and processing constraints. Thus, a quantum approach to automated decision-making for strategic scenarios has been derived which may provide accurate decisions in a faster amount of time as compared to the classical computing approaches for certain complex problems.

Accordingly, the present approach generally concerns system and methods for quantum computing based decision making. The systems and methods employ a quantum algorithm for optimized game theory analysis. The quantum algorithm implements a game theory analysis using a reward matrix and subset summing to make decisions in a relatively efficient and fast manner. The subset summing may be implemented using quantum adder circuits and quantum comparison circuits.

Conventionally, decision making based on a reward matrix has been achieved using linear programming in classical computers using binary bits. Linear programming is a fundamentally different and relatively slow approach as compared to the present quantum computing based approach. Linear programming has not been implemented in quantum computing devices. As such, an alternative subset summing technique has been derived which can be implemented in quantum computing devices for solving reward matrices. The particulars of the subset summing approach will become evident as the discussion progresses.

The present approach can be used in various applications. For example, the present approach can be used in (i) sensor control applications (e.g., to determine which action(s) should be taken or task(s) sensor(s) should be performing at any given time), (ii) vehicle or craft navigation applications (e.g., to determine which direction a ship should travel to avoid an obstacle), (iii) dynamic network applications (e.g., to determine which is the best plan for dynamic resource allocation), (iv) search and rescue applications (e.g., to determine which grid a drone or other sensor device should proceed to for efficient search and rescue), (v) unmanned vehicle control applications (e.g., to determine what is an optimal positioning of an unmanned vehicle to achieve communication linking), (vi) natural resource exploration applications (e.g., to determine which acoustic ray trace should be used for oil and gas exploration), (vii) image analysis applications (e.g., to determine which land use land cover tag should be used to label a pixel for image feature extraction), (viii) robot control applications (e.g., to determine which path is the most efficient for a robot to travel to a destination), (ix) observation applications (e.g., which machine learning algorithm or model in an ensemble should be used for a given observation—which frequency should a transmitter hop to avoid jamming or which modulation type is received), (x) network node or personnel management applications (e.g., to determined which network node or person is the most important or influential), (xi) situational awareness applications (e.g., to determine which emotion or personality is being displayed by a person), (xii) business applications (e.g., to determine which opportunity should a business pursue, and/or what training does each employee need to achieve a next level most efficiently), and/or (xiii) aircraft control applications (e.g., to determine what is an optimal aircraft for noise mitigation).

The present approach will be described herein in terms of application (ix) mentioned above (i.e., (ix) observation applications (e.g., which machine learning algorithm or model in an ensemble should be used for a given observation-which frequency should a transmitter hop to avoid jamming or which modulation type is received)). The present approach is not limited in this regard.

Illustrative Quantum Computing Implementation

Referring now to FIG. 1, there is provided an illustration that is useful for understanding the present approach. During operation, data 100 is provided to a reward matrix generator 102. The reward matrix generator 102 processes the data to generate a reward matrix 104. Methods for generating reward matrices are well known. Some known methods for generating reward matrices are based on attributes, objects, keywords, relevance, semantics, and linguistics of input data.

The reward matrix 104 is input into a quantum processor 106. The quantum processor 106 first performs operations to convert the given format (e.g., a binary/bit format) of the reward matrix 104 into a quantum/qubit format. Techniques for converting bits into qubits are known. The qubits are stored in quantum registers 110 of the quantum processor 106. Quantum registers are known, and techniques for storing qubits in quantum registers are known.

The quantum processor 106 uses the qubits to perform subset summing operations in which a plurality of row selections 108 are made based on different combinations of values in the reward matrix 104. Each row of the reward matrix 104 has a respective choice (or decision) associated therewith. These choices (or decisions) can include, but are not limited to, actions, tasks, directions, plans, grids, positions, acoustic ray traces, tags, paths, machine learning algorithms, network nodes, people, emotions/personalities, business opportunities, and/or vehicles (e.g., cars, trucks, and/or aircrafts). The particulars of the subset summing operations will become evident as the discussion progresses.

Next, the quantum processor 106 analyzes the row selections 108 resulting from the subset summing operations, and determines total counts for each row selection. For example, a first row of the reward matrix was selected 32 times, thus the total count for the first row is 32. A second row of the reward matrix was selected 59 times, thus the total count for the second row is 59. Similar analysis is performed for the third row. The present approach is not limited to the particulars of this example. A histogram of the total counts may then be generated. Quantum normalized probabilities are determined for the row selections. Normalization can be performed as typically done, or after subtracting a value equal to the number of combinations that have only a single choice considered. The quantum processor 106 makes decision(s) 108 based on the best quantum normalized probability(ies).

The quantum processor 106 also performs operations to cause operations of electronic device(s) 112 to be controlled in accordance with the decision(s) 108. Although the quantum processor 106 is shown as being external to the electronic device 112, the present approach is not limited in this regard. The quantum process can be part of, disposed inside or otherwise incorporated or integrated with the electronic device 112. The electronic device can include, but is not limited to, a sensor (e.g., an environmental sensor, a camera, a drone, a sound source for ray tracing), a network node, a computing device, a robot, a vehicle (e.g., manned, tele-operated, semi-autonomous, and/or autonomous) (e.g., a car, a truck, a plane, a drone, a boat, or a spacecraft), and/or a communication device (e.g., a phone, a radio, a satellite).

For example, a sensor (e.g., a camera, an unmanned vehicle (e.g., a drone), or a sound source for acoustic ray tracing) may be caused to (i) change position (e.g., field of view and/or antenna direction), location or path of travel, and/or (ii) perform a particular task (capture video, perform communications on a given channel, or ray tracing) at a particular time in accordance with decision(s) of the quantum processor. This can involve transitioning an operational state of the sensor from a first operational state (e.g., a power save state or an off state) to a second operational state (e.g., a measurement state or on state). A navigation parameter of a vehicle (e.g., a car, a ship, a plane, a drone) or a robot may be caused to change in accordance with the decision(s) of the quantum processor. The navigation parameter can include, but is not limited to, a speed, and/or a direction of travel. A network may be caused to dynamically change a resource allocation in accordance with the decision(s) of the quantum processor. An autonomous vehicle can be caused to use a particular object classification scheme (e.g., assign a particular object classification to a detected object or data point(s) in a LiDAR point cloud) or trajectory generation scheme (e.g., use particular object/vehicle trajectory definitions or rules) in accordance with the decision(s) of the quantum processor so as to optimize autonomous driving operations (e.g., accelerate, decelerate, stop, turn, etc.). A cognitive radio can be controlled to use a particular machine learning algorithm to facilitate optimized wireless communications (e.g., via channel selection and/or interference mitigation) in accordance with the decision(s) of the quantum processor. A computing device can be caused to take a particular remedial measure to address a malicious attack (e.g., via malware) thereon in accordance with the decision(s) of the quantum processor. The present approach is not limited to the particulars of these examples.

Figures 2, 3:
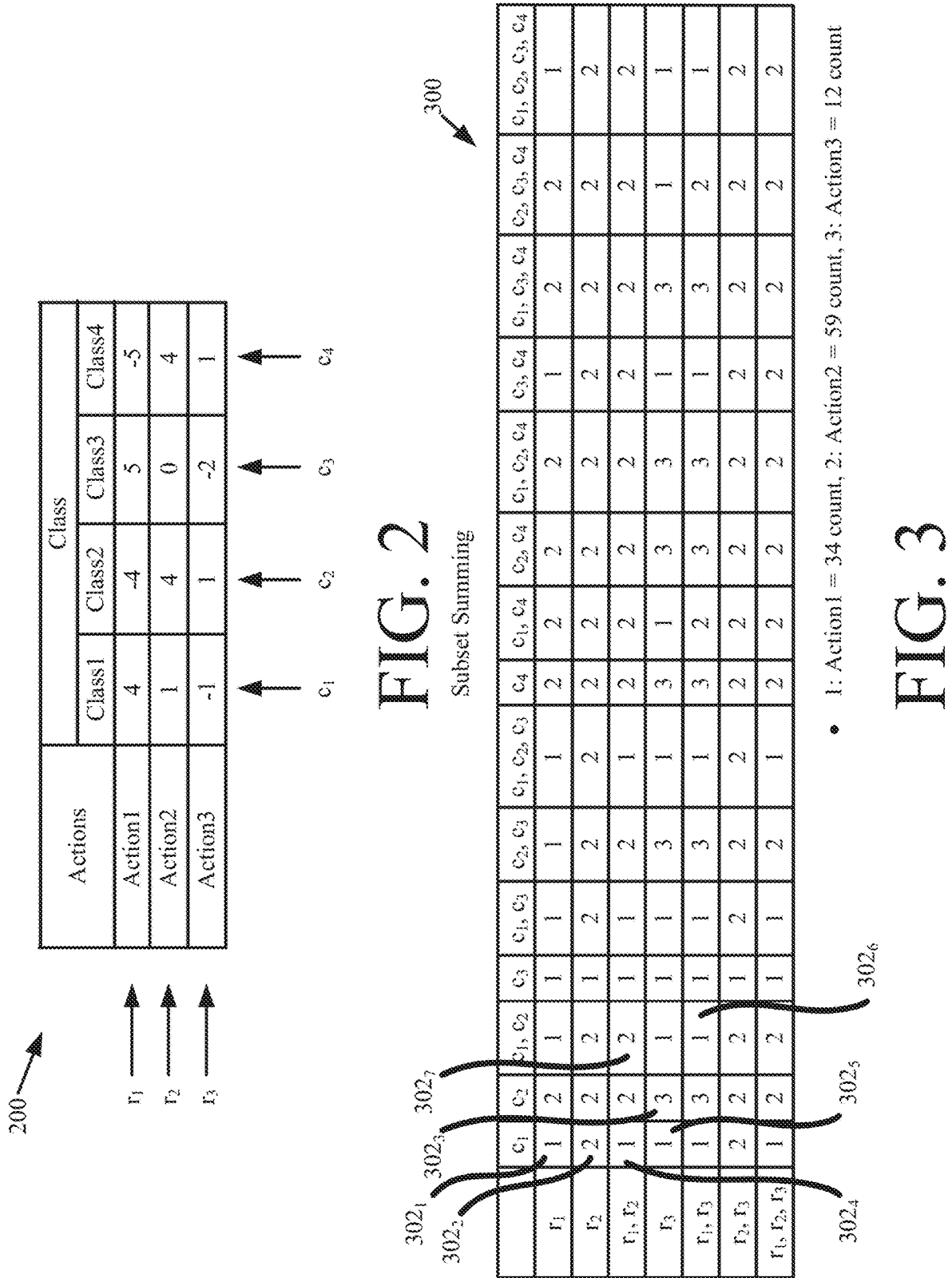
FIG. 2 is a table of an illustrative reward matrix.
FIG. 3 is a table that is useful for understanding subset summing operations of a quantum processor.

An illustrative reward matrix 200 is provided FIG. 2. Reward matrix 104 of FIG. 1 can be the same as or similar to reward matrix 200. As such, the discussion of reward matrix 200 is sufficient for understanding reward matrix 104 of FIG. 1.

Reward matrix 200 comprises a plurality of rows $r_n$ and a plurality of columns $c_n$. Each row has an action assigned thereto. For example, a first row $r_1$ has Action1 (e.g., fire mortar) assigned thereto. A second row $r_2$ has Action2 (e.g., advance) assigned thereto. A third row $r_3$ has Action3 (e.g., do nothing) assigned thereto. Each column has a class assigned thereto. For example, a first column $c_2$ has a Class1 (e.g., an enemy truck) assigned thereto. A second column $c_2$ has a Class2 (e.g., civilian truck) assigned thereto. A third column $c_3$ has a Class3 (e.g., enemy tank) assigned thereto. A fourth column $c_4$ has a Class4 (e.g., a friendly tank) assigned thereto. A value is provided in each cell which falls within a given range, for example, $-5$ to $5$.

A table 300 is provided in FIG. 3 that is useful for understanding an illustrative subset summing algorithm using the reward matrix 200 as an input. Table 300 shows subset summing results for different combinations of rows and columns in the reward matrix. Each subset summing result has a value between 1 and 3. A value of 1 indicates that a row $r_1$ and/or an Action1 is selected based on results from subset summing operation(s). A value of 2 indicates that a row $r_2$ and/or an Action2 is selected based on results from subset summing operation(s). A value of 3 indicates that a row $r_3$ and/or an Action3 is selected based on results of subset summing operation(s).

For example, a value of 1 is provided in a cell $302_1$ of table 300 since only one value in the reward matrix 200 is considered in a subset summing operation. The value of the reward matrix 200 is 4 because it resides in the cell which is associated with row $r_1$ and column $c_1$. The subset summing operation results in the selection of row $r_1$ and/or Action1 since 4 is a positive number and the only number under consideration. Therefore, a value of 1 is added to cell $302_1$ of table 300.

A value of 2 is provided in cell $302_2$ of table 300 since only one value in the reward matrix 200 is considered in a subset summing operation. The value of the reward matrix 200 is 1 because it is in the cell which is associated with row $r_2$ and column $c_1$. The subset summing operation results in the selection of row $r_2$ and/or Action2 since 1 is a positive number and the only number under consideration. Therefore, a value of 2 is added to cell $302_2$ of table 300.

A value of 3 is provided in cell $302_3$ of table 300 since only one value in the reward matrix 200 is considered in a subset summing operation. The value of the reward matrix 200 is 1 because it is in the cell which is associated with row $r_3$ and column $c_2$. The subset summing operation results in the selection of row $r_3$ and/or Action3 since 1 is a positive number and the only number under consideration. Therefore, a value of 3 is added to cell $302_3$ of table 300.

A value of 1 is in cell $302_4$ of table 300. In this case, two values in the reward matrix 200 are considered in a subset summing operation. The values of the reward matrix 200 include (i) 4 because it resides in the cell which is associated with row $r_1$ and column $c_1$, and (ii) 1 because it resides in the cell which is associated with row $r_2$ and column $c_1$. The two values are compared to each other to determine the largest value. Since 4 is greater than 1, row r; and/or Action1 is selected. Accordingly, a value of 1 is inserted into cell $302_4$ of table 300.

It should be noted that other values of reward matrix 200 are considered when a negative value is the only value under consideration. For example, a value of 1 is in cell $302_5$ of table 300 rather than a value of 3. This is because a value of $-1$ resides in the cell of reward matrix 200 that is associated with row $r_3$ and column $c_1$. Since this value is negative, other values in column $c_1$ of reward matrix 200 are considered. These other values include (i) 4 because it resides in the cell of the reward matrix 200 which is associated with row $r_1$ and column $c_1$, and (ii) 1 because it resides in the cell of the reward matrix 200 which is associated with row $r_2$ and column $c_1$. These two other values are compared to each other to determine the largest value. Since 4 is greater than 1, row $r_1$ and/or Action1 is selected. Accordingly, a value of 1 is inserted into cell $302_5$ of table 300.

When values in two or more columns and rows of reward matrix 200 are considered and a single cell of reward matrix 200 has the greatest value of the values under consideration, an action is selected that is associated with the cell having the greatest value. For example, a value of 1 is in cell $302_6$ of table 300. In this case, values in two columns $c_1$ and $c_2$ and two rows $r_1$ and $r_3$ of reward matrix 200 are considered. For row $r_1$, the values include 4 and $-4$. For row $r_3$, the values include $-1$ and 1. The four values are compared to each other to identify the greatest value. Here, the greatest value is 4. Since 4 is in a cell associated with Action1, row $r_1$ and/or Action1 is selected and a value of 1 is inserted into cell $302_6$ of table 300.

It should be noted that an addition operation may be performed for each row prior to performance of the comparison operation. For example, a value of 2 is in cell $302_7$ of table 300. In this case, values in two columns $c_1$ and $c_2$ and two rows $r_1$ and $r_2$ of reward matrix 200 are considered. For row $r_1$, the values include 4 and $-4$. For row $r_2$, the values include 1 and 4. Since both rows $r_1$ and $r_2$ include the greatest value of 4, an addition operation is performed for each row, i.e., $r_1 = 4 + -4 = 0$, $r_2 = 1 + 4 = 5$. Since 5 is greater than 0, row $r_2$ and/or Action1 is selected. Thus, a value of 2 is inserted into cell $302_7$ of table 300, rather than a value of 1.

Figure 4:
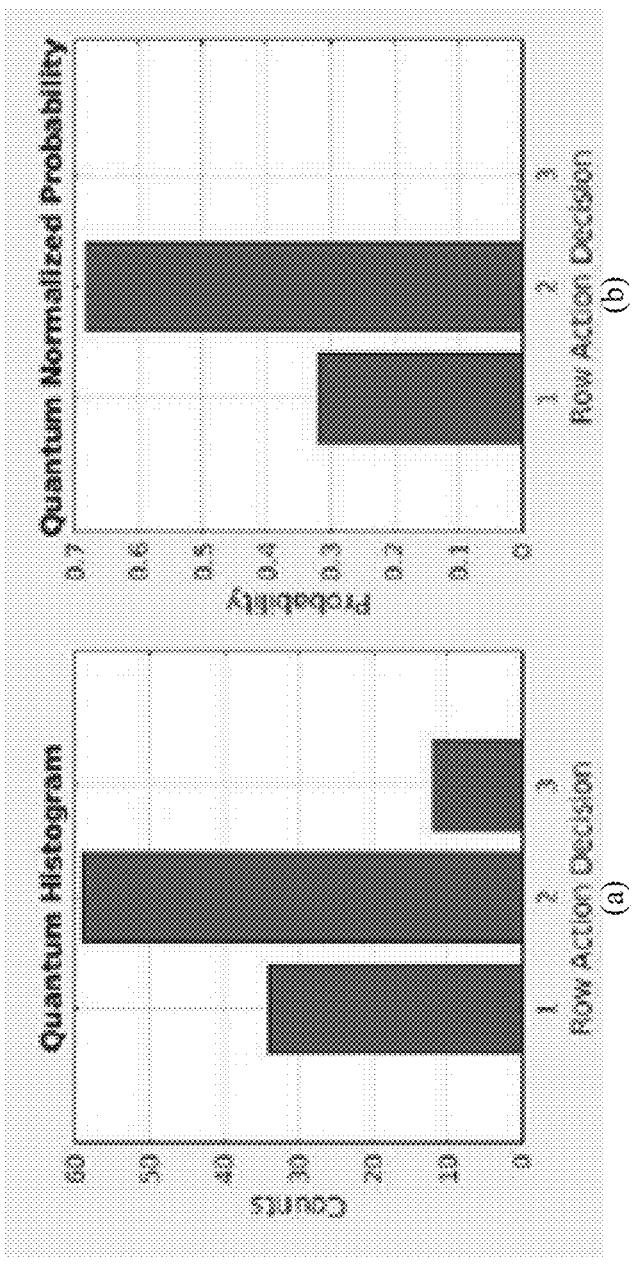
FIG. 4 provides graphs for a quantum histogram and quantum normalized probabilities.

Once table 300 is fully populated, a total count is determined for each value 1, 2 and 3 in table 300. For example, there are 34 occurrences of value 1 in table 300, thus the total count for 1 is 34. A total count for 2 is 59. A total count for 3 is 12. A quantum histogram for the total counts is provided in FIG. 4(a).

Quantum normalized probabilities for row decisions may also be determined. Techniques for determining quantum normalized probabilities are known. Normalization can be performed as typically done, or after subtracting a value equal to the number of combinations that have only a single choice considered. A graph showing the quantum normalized probability for each row action decision is provided in FIG. 4(b). FIG. 4(b) indicates that row $r_1$ and/or Action1 should be selected 31.884% of the time, row $r_2$ and/or Action2 should be selected 68.1168 of the time, and row $r_3$ and/or Action3 should be selected 0% of the time. The output of the subset summing operations is Action2 since it is associated with the best quantum normalized probability.

Quantum circuits have been constructed to support the addition and comparison of two binary numbers. These quantum circuits can be used to implement the above described subset summing algorithm. More specifically, the above described subset summing algorithm can be implemented using quantum comparator circuits and quantum adder circuits. The quantum comparator circuit can be used to implement conditional statements in quantum computation. Quantum algorithms can be used to find minimal and maximal values. The quantum adder circuit can be used to assembly complex data sets for comparison and processing. An illustrative quantum comparator circuit is provided in FIG. 5. An illustrative quantum adder circuit is provided in FIG. 6.

Figure 5:
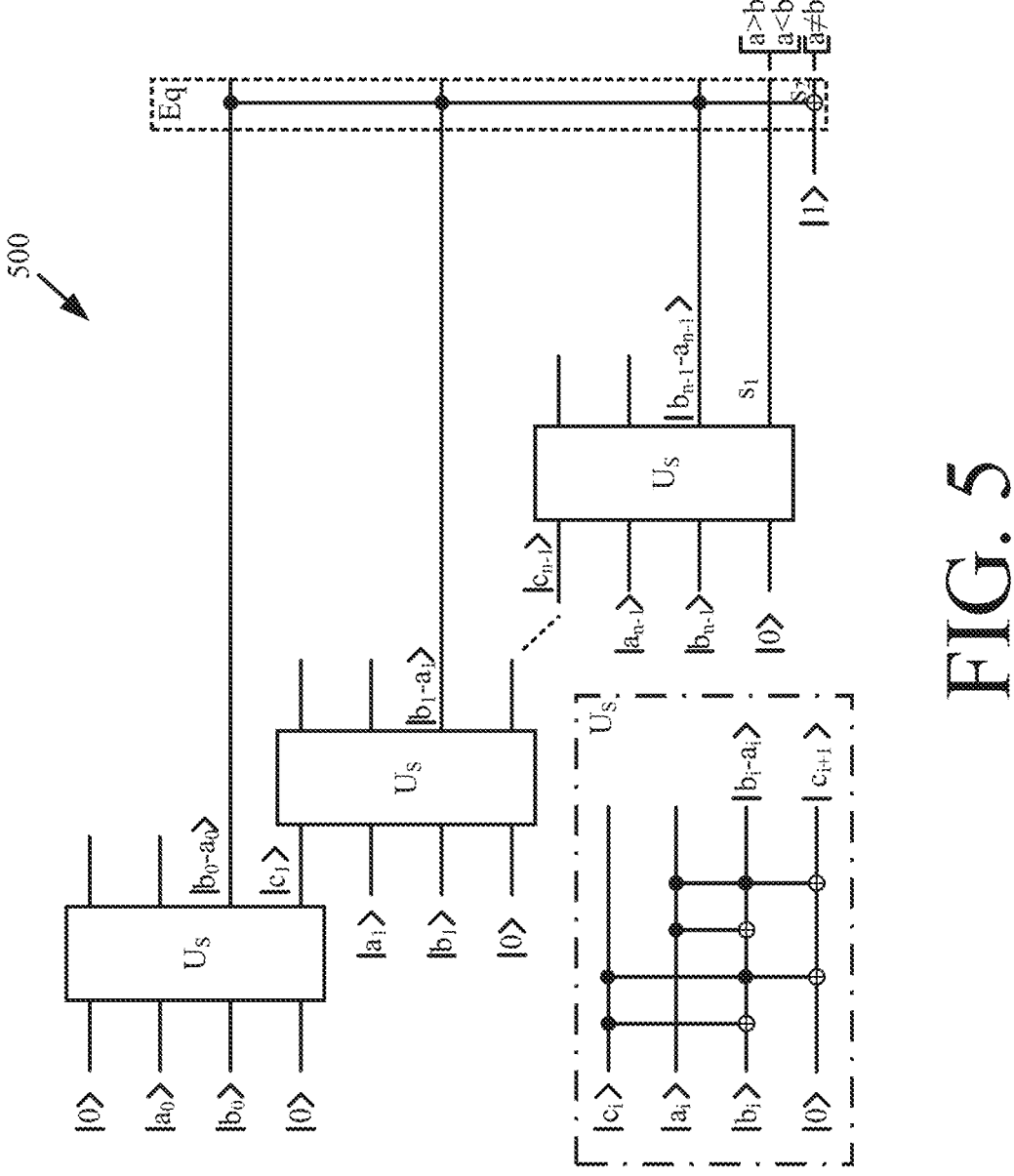
FIG. 5 is a schematic diagram of an example quantum comparator circuit.

As shown in FIG. 5, the quantum comparator circuit 500 comprises a quantum bit string comparator configured to compare two strings of qubits $a_n$ and $b_n$ using subtraction. Quantum comparator circuit 500 is known. Still, it should be understood that each string comprises n qubits representing a given number. Qubit string an can be written as $a_n = a_{n-1}, \ldots a_0$, where $a_0$ is the lowest order bit. Qubit string $b_n$ can be written as $b_n = b_{n-1}, \ldots, b_0$, where $b_0$ is the lowest order bit. The qubits are stored in quantum registers using quantum gate operators.

This comparison is performed to determine whether the qubit string $a_n$ is greater than, less than, or equal to the qubit string $b_n$. The comparison operation is achieved using a plurality of quantum subtraction circuits Us. Each quantum subtraction circuit is configured to subtract a quantum state $|a_i\rangle$ from a quantum state $|b_i\rangle$ via XOR ($\oplus$) operations, and pass the result to a quantum gate circuit Eq. A quantum state for a control bit c is also passed to a next quantum subtraction circuit for use in a next quantum subtraction operation. The last quantum subtraction circuit outputs a decision bit $s_1$. If the qubit string $a_n$ is greater than the qubits string $b_n$, then an output bit $s_1$ is set to a value of 1. If the qubit string $a_n$ is less than the qubits string $b_n$, then an output bit $s_1$ is set to a value of 0.

The quantum gate circuit Eq orders the subtraction results and uses the ordered subtraction results $|b_0 - a_0\rangle$, $|b_1 - a_1\rangle, \ldots, |b_{n-1} - a_{n-1}\rangle$ to determine whether the qubit string $a_n$ is equal to the qubits string bn. If so, an output bit $s_2$ is set to a value of 1. Otherwise, the output bit $s_2$ is set to a value of 0.

Figure 6:
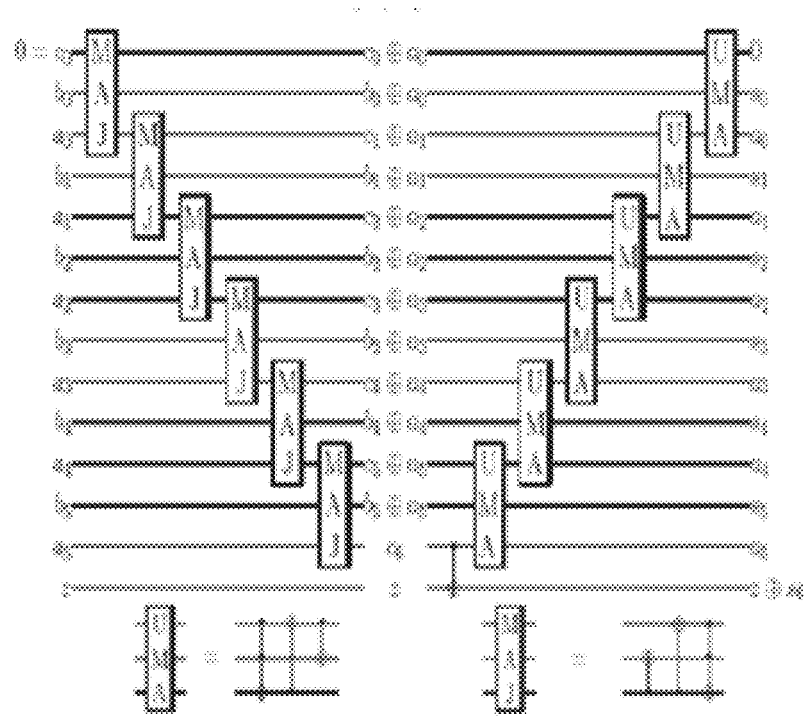
FIGS. 6 and 7 are schematic diagrams of example quantum adder circuits.
Figure 7:
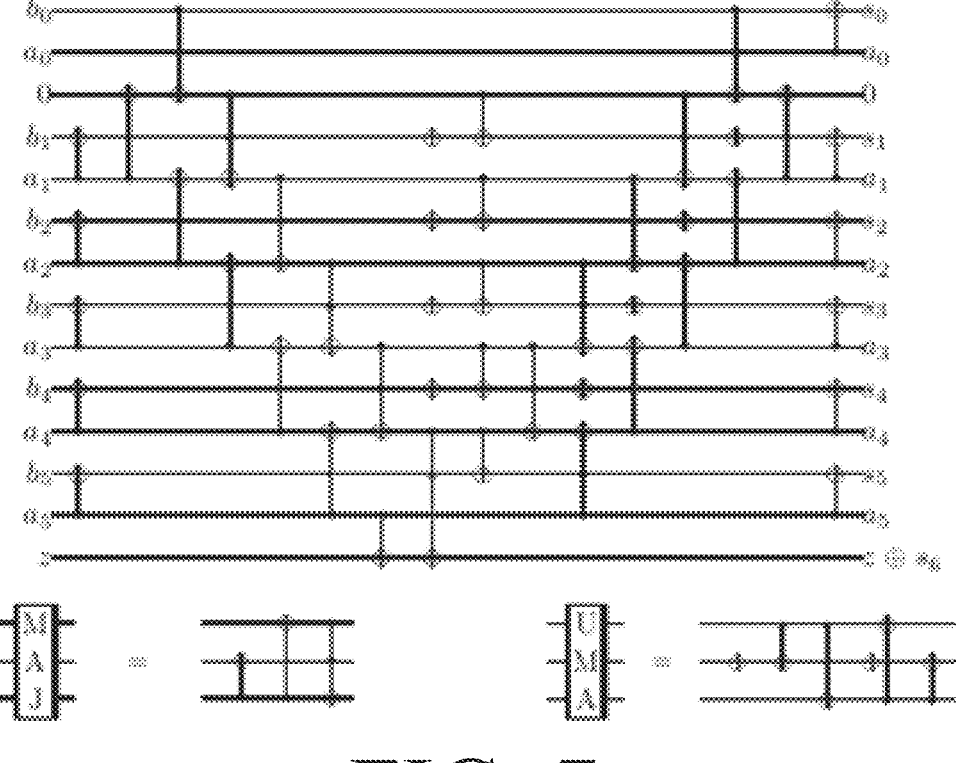

As shown in FIGS. 6 and 7, the quantum adder circuit 600, 700 comprises a quantum ripple-carry addition circuit configured to compute a sum of the two strings of qubits $a_n$ and $b_n$ together. The quantum ripple-carry addition circuits shown in FIGS. 6-7 are well known. The circuits of FIGS. 6 and 7 implement an in-place majority (MAJ) gate with two Conditioned-NOT (CNOT) gates and one Toffoli gate. The MAJ gate is a logic gate that implements the majority function via XOR ($\oplus$) operations. In this regard, the MAJ gate computes the majority of three bits in place. The MAJ gate outputs a high when the majority of the three input bits are high value, or outputs a low when the majority of the three input bits are low. The circuit of FIG. 6 implements a 2-CNOT version of the UnMajority and Add (UMA) gate, while the circuit of FIG. 7 implements a 3-CNOT version of the UMA gate. The UMA gate restores some of the majority computation, and captures the sum but in the b operand.

The qubit string an can be written as $a_n = a_{n-1}, \ldots, a_0$, where $a_0$ is the lowest order bit. Qubit string $b_n$ can be written as $b_n = b_{n-1}, \ldots, b_0$, where $b_0$ is the lowest order bit. Qubit string $a_n$ is stored in a memory location $A_n$, and qubit string $b_n$ is stored in a memory location $B_n$. $c_n$ represents a carry bit. The MAJ gate writes $c_{n+1}$ into $A_n$, and continues a computation using $c_{n+1}$. When done using $c_{n+1}$, the UMA gate is applied which restores $a_n$ to $A_n$ restores $c_n$ to $A_{n-1}$, and writes $S_n$ to $B_n$.

Both circuits of FIGS. 6 and 7 are shown for strings including 6 bits. The present approach is not limited in this regard. A person skilled in the art would understand that the circuits of FIGS. 6 and 7 can be modified for any number of bits n in strings $a_n$ and $b_n$.

Figure 8:
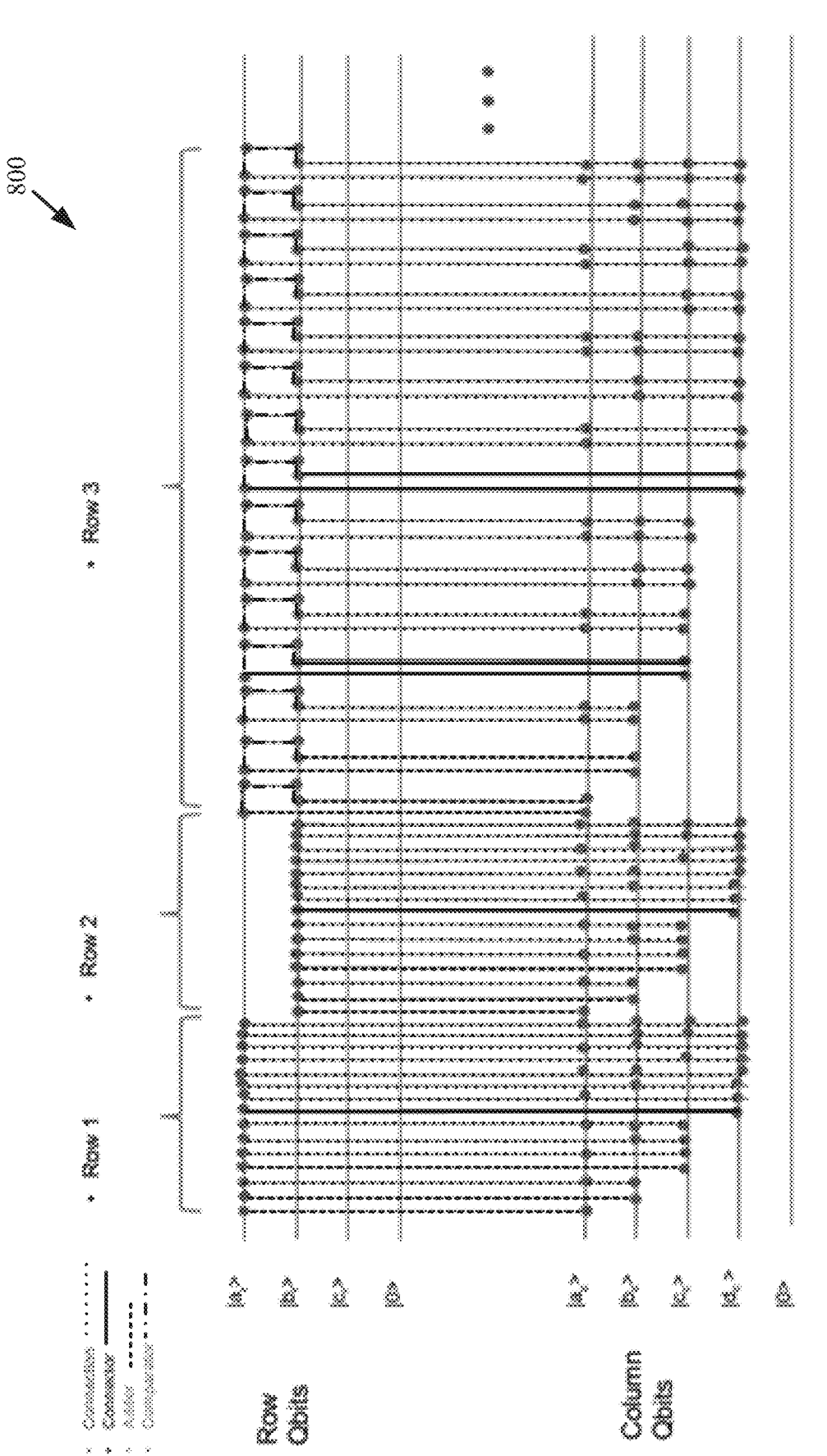
FIG. 8 is a schematic diagram of an illustrative quantum processor circuit.

An illustrative quantum processor 800 implementing the subset summing algorithm of the present approach is shown in FIG. 8. The quantum processor 106 of FIG. 1 can be the same as or similar to quantum processor 800. As such, the discussion of quantum processor 800 is sufficient for understanding quantum processor 106 of FIG. 1.

As shown in FIG. 8, quantum processor 800 comprises a plurality of quantum adder circuits and a plurality of quantum comparison circuits. The quantum adder circuits can include, but are not limited to, quantum adder circuit 600 of FIG. 6 and/or quantum adder circuit 700 of FIG. 7. The quantum comparison circuits can include, but are not limited to, quantum comparator circuit 500 of FIG. 5.

Figure 9:
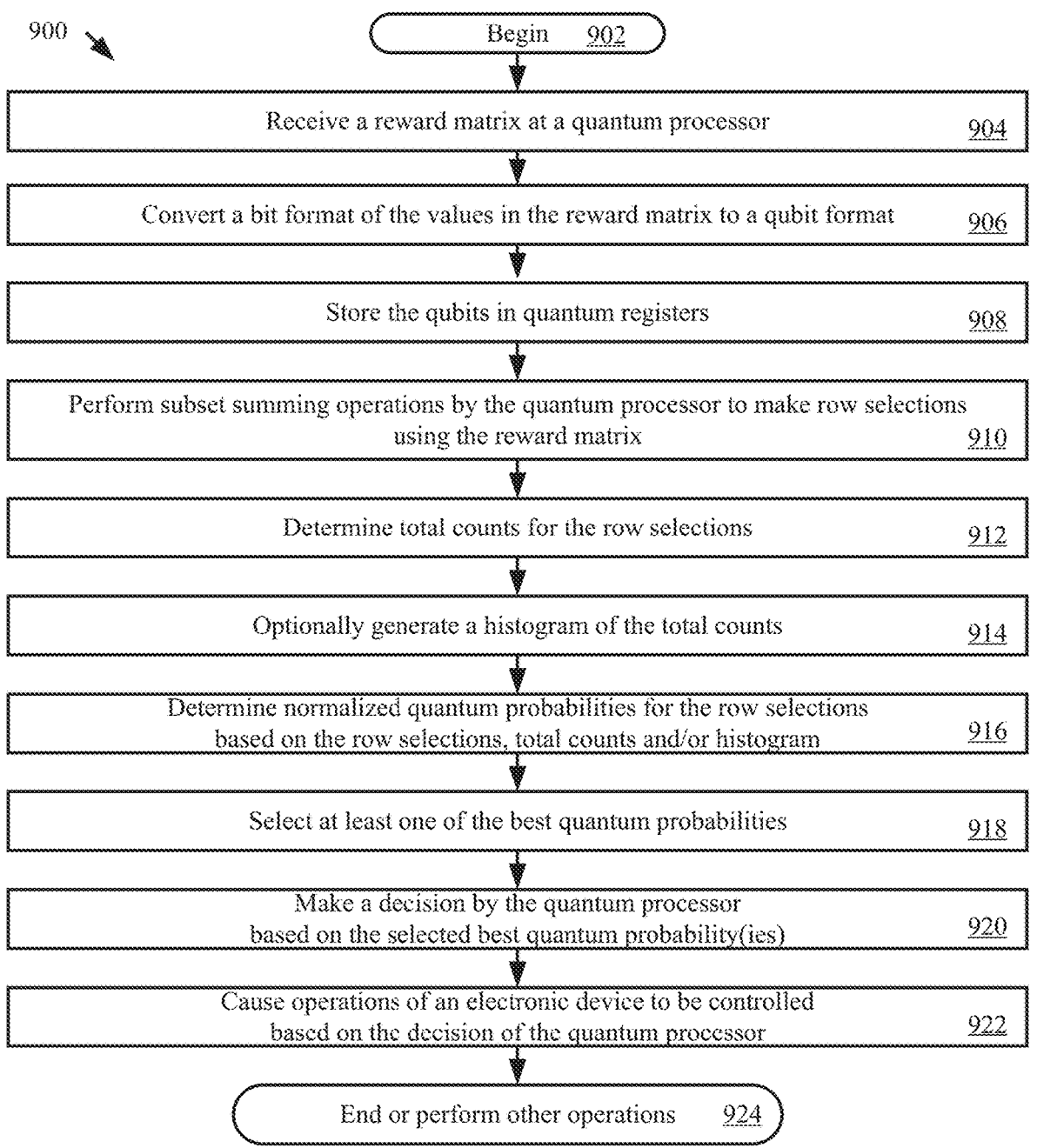
FIG. 9 is a flow diagram of an illustrative method for operating a quantum processor.

Referring now to FIG. 9, there is provided a flow diagram of an illustrative method 900 for operating a quantum processor (e.g., quantum processor 106 of FIG. 1 and/or 800 of FIG. 8. The method 900 begins with Block 902 and continues with Block 904 where a reward matrix (e.g., reward matrix 104 of FIGS. 1 and/or 200 of FIG. 2) is received at the quantum processor. The reward matrix comprises a plurality of values that are in a given format (e.g., a bit format) and arranged in a plurality of rows (e.g., rows $r_1$, $r_2$ and $r_3$ of FIG. 2) and a plurality of columns (e.g., columns $c_1$, $c_2$, $c_3$ and $c_4$ of FIG. 2). Each row of the reward matrix has a respective choice (or decision) associated therewith. The respective choice (or decision) can include, but is not limited to, a respective action of a plurality of actions, a respective task of a plurality of tasks, a respective direction of a plurality of directions, a respective plan of a plurality of plans, a respective grid of a plurality of grids, a respective position of a plurality of positions, a respective acoustic ray trace of a plurality of acoustic ray traces, a respective tag of a plurality of tags, a respective path of a plurality of paths, a respective machine learning algorithm of a plurality of machine learning algorithms, a respective network node of a plurality of network nodes, a respective person of a group, a respective emotion of a plurality of emotions, a respective personality of a plurality of personalities, a respective business opportunity of a plurality of business opportunities, and/or a respective vehicle of a plurality of vehicles.

In Block 906, the quantum processor performs operations to convert the given format (e.g., bit format) of the plurality of values to a qubit format. Methods for converting bits to qubits are known. Next in Block 908, the quantum process performs subset summing operations to make a plurality of row selections based on different combinations of the values in the qubit format. The subset summing operations can be the same or similar to those discussed above in relation to FIGS. 3-4.

The subset summing operations can be implemented by a plurality of quantum adder circuits and a plurality of quantum comparator circuits. The subset summing operations may comprise an operation in which at least one value of the reward matrix is considered and which results in a selection of the row of the reward matrix in which the value(s) reside(s). Additionally or alternatively, the subset summing operations may comprise: an operation in which at least two values of the reward matrix are considered and which results in a selection of the row of the reward matrix in which a largest value of the at least two values resides; an operation in which a single negative value of the reward matrix is considered and which results in a selection of the row of the reward matrix which is different than the row of the reward matrix in which the single negative value resides; an operation in which a plurality of values in at least two columns and at least two rows are considered, and which results in a selection of the row of the reward matrix associated with a largest value of the plurality of values in at least two columns and at least two rows; and/or an operation in which a plurality of values in at least two columns and at least two rows are considered, and which results in a selection of the row of the reward matrix associated with a largest sum of values in the at least two columns.

In Blocks 912-916, the quantum processor uses the plurality of row selections to determine a normalized quantum probability for a selection of each row of the plurality of rows. Blocks 912-916 involve: determining total counts for the row selections; optionally generating a histogram of the total counts; and determining normalized quantum probabilities for the row selections based on the row selections made in Block 910, total counts determined in Block 912 and/or histogram generated in Block 914. Methods for determining normalized quantum probabilities are known. In some scenarios, a normalized quantum probability is determined by dividing a total count for a given row by a total number of row selections (e.g., a total count for a row r1 is 32 and a total number of row selections is 105 so the normalized quantum probability=34/105=approximately 32%).

In Block 918, the quantum processor selects at least one of the best quantum probabilities from the normalized quantum probabilities determined in Block 916. The quantum processor makes a decision (e.g., decision 108 of FIG. 1) in Block 920 based on the selected best quantum probability(ies). In Block 922, the quantum processor causes operations of an electronic device (e.g., electronic device 112 of FIG. 1) to be controlled or changed based on the decision.

For example, the quantum processor causes the electronic device to transition operational states (e.g., from an off state to an on state, or vice versa), change position (e.g., change a field of view or change an antenna pointing direction), change location, change a navigation parameter (e.g., change a speed or direction of travel), perform a particular task (e.g., schedule an event), change a resource allocation, use a particular machine learning algorithm to optimize wireless communications, and/or use a particular object classification scheme or trajectory generation scheme to optimize autonomous driving operations (e.g., accelerate, decelerate, stop, turn, perform an emergency action, perform a caution action, etc.).

The implementing systems of method 900 may comprise a circuit (e.g., quantum registers, quantum adder circuits, and/or quantum comparator circuits), and/or a non-transitory computer-readable storage medium comprising programming instructions that are configured to cause the quantum processor to implement method 900.

Illustrative Use Case for Quantum Processor

Signal recognition and classification has been accomplished using feature-based, expert-system-driven (i.e., non-machine-learning) techniques. The feature-based, expert-system-driven techniques are relatively computationally slow and costly to implement. The present approach provides an alternative approach for signal recognition and classification that overcomes the drawbacks of conventional feature-based, expert-system-driven configurations.

The present approach employs a machine-learning based approach which provides a faster, less-expensive path to adding new signals to a list of recognized signals, offers better recognition performance at lower Signal-to-Noise Ratios (SNRs), and recognizes signals and sources thereof faster and with an improved accuracy as compared to that of the conventional feature-based, expert-system-driven configurations. In some scenarios, the machine-learning based approach uses expert systems and/or deep learning to facilitate signal recognition and classification. The deep learning can be implemented by one or more neural networks (e.g., Residual Neural Network(s) (ResNet(s)), and/or Convolutional Neural Network(s) (CNN(s))). The neural networks may be stacked to provide a plurality of layers of convolution. The neural networks are trained to automatically recognize and determine modulation types of received wireless communication signals from sub-sampled data. This training can be achieved, for example, using a dataset that includes information for signals having SNRs from −20 dB to +30 dB and being modulated in accordance with a plurality of analog and/or digital modulation schemes (e.g., phase shift keying, and/or amplitude shift keying).

The machine-learning based approach of the present approach can be implemented to provide a cognitive, automated system to optimize signal classification analyses by modulation choices from data with various SNRs (e.g., SNRs from −20 dB to +30 dB). Subsystems can include, but are not limited to, a tuner, a digitizer, a classifier, and/or an optimizer. Fast recognition and labeling of Radio Frequency (RF) signals in the vicinity is a needed function for Signal Intelligence (SIGINT) devices, spectrum interference monitoring, dynamic spectrum access, and/or mesh networking.

Artificial intelligence (AI) algorithms, machine-learning algorithms and/or game theoretic analysis is used to help solve the problem of signal classification through supervised classification. The game theory analysis provides a flexible framework to model strategies for improved decision-making optimization. Classification strategies may be based on different supervised gradient descent learning algorithms and/or different neural network structures. The players are networks, and the action is to choose the goodness-of-fit weighting of the network for optimal decision making. A game-theoretic perspective has been derived for addressing the problem of supervised classification that takes the best signal modulation prediction derived from supervised classification models. This is a game in the sense that the signals are "players" that participate in the game to determine their modulation type by choosing the best network model. Within this formulation, a reward matrix (weighted or non-weighted) is used for consistent classification factors that results in higher accuracy and precision compared to using individual machine learning algorithms or models alone.

The reward matrix comprises an M×C matrix, where M is the number of machine learned algorithms and C is the number of modulation classes. The reward matrix uses goodness-of-fit-predicted class scores or responses in the form of a matrix based on the number of signals and modulation classes. These goodness-of-fit-predicted class scores are used in a quantum computing program to optimally choose which machine learned algorithm to use per signal.

Figure 10:
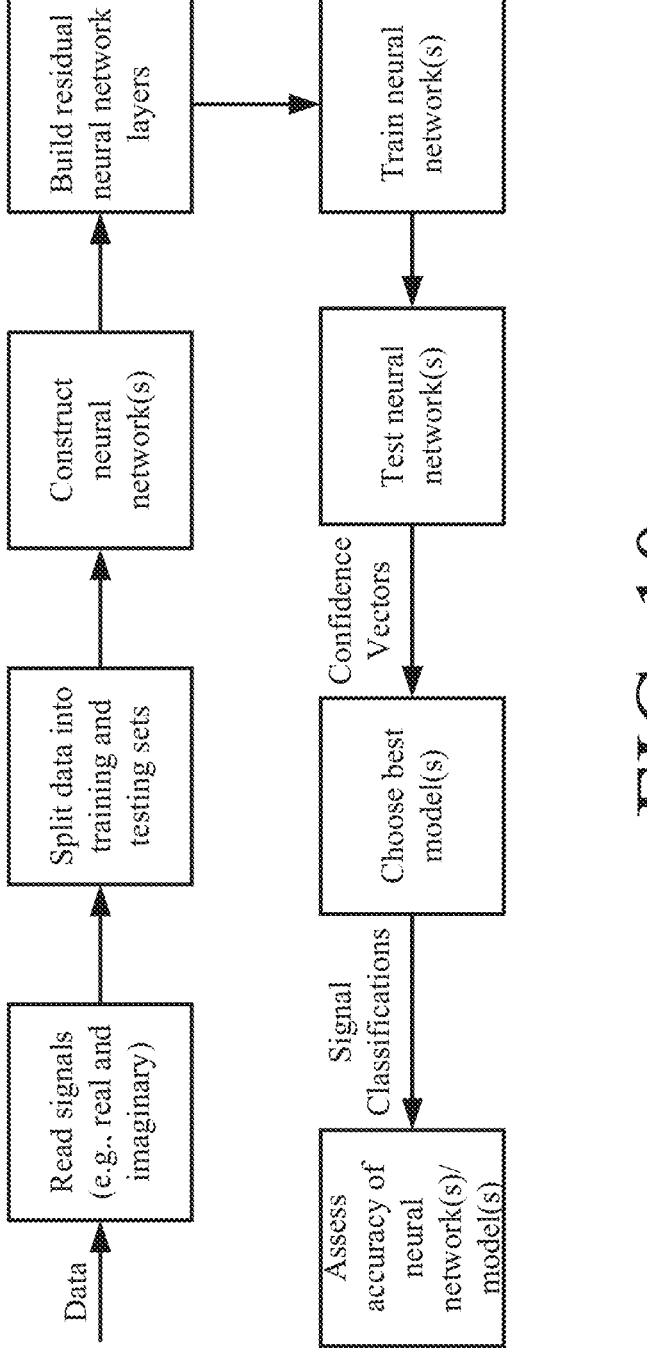
FIG. 10 is a flow diagram associated with an illustrative signal classification system.

FIG. 10 presents an overview of the signal classification system. The signal classification system is generally configured to generate machine learned models including sets of signal features/characteristics that can be used to recognize and classify signals and/or sources of signals. These sets of signal features/characteristics are stored in a datastore(s) and/or used by communication devices (e.g., cognitive radios) to determine, for example, whether wireless channels are available or unavailable.

The communication devices can include, but are not limited to, cognitive radios configured to recognize and classify radio signals by modulation type at various Signal-to-Noise Ratios (SNRs). Each of the cognitive devices comprises a cognitive sensor employing machine learning algorithms. In some scenarios, the machine learned algorithms include neural networks which are trained and tested using an extensive dataset including of 24 digital and analog modulations. The neural networks learn from the time domain amplitude and phase information of the modulation schemes present in the dataset. The machine learning algorithms facilitate making preliminary estimations of modulation types and/or signal sources based on machine learned signal feature/characteristic sets. Quantum computing optimization may be used to determine the best modulation classification based on prediction scores output from one or more machine learning algorithms.

Figure 11:
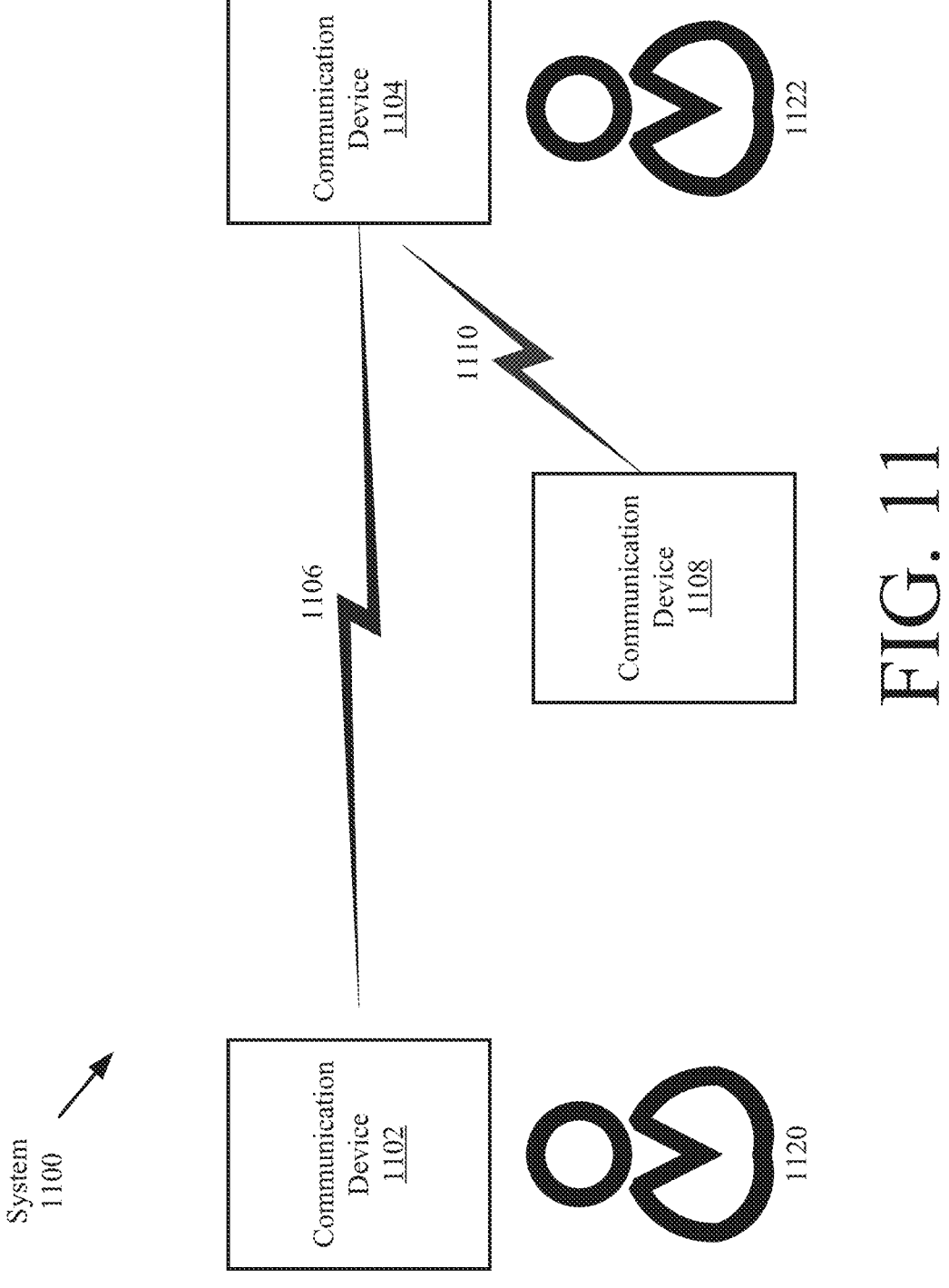
FIG. 11 is a schematic block diagram of an illustrative system configured to perform signal recognition and classification in accordance with the present approach.

Referring to FIG. 11, there is provided an illustration of an illustrative communications system 1100. Communications system 1100 is generally configured to allow communications amongst communication devices 1102, 1104, 1108 over wireless channels 1106, 1110 in a waveform spectrum. The communication devices can include, but are not limited to, cognitive radios. Each cognitive radio is configured to dynamically share the wireless channels 1106, 1110 to avoid user interference and congestion. The manner in which the communication devices perform dynamic spectrum sharing and/or dynamically transition between wireless channels will be described below in relation to FIG. 12.

A user 1120 of communication device 1102 is a primary user of wireless channel 1106. As such, the user 1120 has first rights to communicate information over wireless channel 1106 via communication device 1102 a given amount of time (e.g., X microseconds, where X is an integer). User 1120 licensed use of the wireless channel 1106 to another user 1122. User 1122 constitutes a secondary user. Accordingly, user 1122 is able to use the wireless channel 1106 to communicate information to/from communication device 1104 during the time in which the wireless channel is not being used by the primary user 1120 for wireless communications. Detection of the primary user by the secondary user may be critical to the cognitive radio environment. The present approach provides for making such detections by secondary users in a shorter amount of time as compared to conventional approaches, as will become evident from the discussion below.

During operations, the communication device 1104 monitors communications on wireless channel 1106 to sense spectrum availability, i.e., determine an availability of the wireless channel. The wireless channel 1106 is available when the primary user 1120 is not and has not transmitted a signal thereover for a given amount of time. The wireless channel 1106 is unavailable when the primary user 1120 is transmitting a signal thereover or has transmitted a signal thereover within a given amount of time. When a determination is made that the wireless channel 1106 is unavailable, the Communication device 1104 performs operations to transition to another wireless channel 1110. This channel transition may be achieved by changing an operational mode of the communication device 1104 and/or by changing channel parameter(s) of the communication device 1104. The communication device 1104 may transition back to wireless channel 1106 when a determination is made that the primary user 1120 is no longer using the same for communications.

Referring now to FIG. 12, there is provided a flow diagram of an illustrative method 1200 for operating a system (e.g., system 1100 of FIG. 11). Method 1200 begins with Block 1202 and continues with Block 1204 where a communication device (e.g., communication device 1102 of FIG. 11) of a secondary user (e.g., user 1122 of FIG. 11) monitors at least one first wireless channel (e.g., wireless channel 1106 of FIG. 11) for availability. This monitoring involves: receiving signals communicated over the first wireless channel(s); and processing the signals to determine whether a primary user (e.g., user 1120 of FIG. 11) is using the first wireless channel(s) for communications. If so [Block 1206: YES], then the wireless channel(s) is (are) considered unavailable. Accordingly, the communication device continues monitoring the first wireless channel(s). If not [Block 1206: NO], then the wireless channel(s) is (are) considered available. As such, the communication device may use the first wireless channel(s) for communicating signals as shown by Block 1208.

As shown by Block 1210, the communication device continues to monitor the first wireless channel(s). The communication device continues to use the wireless channel(s) for a given period of time or until the primary user once again starts using the same for communications, as shown by Blocks 1212-1214. When the communication device detects that the primary user is once again using the wireless channel(s) [Block 1212: YES], then the communication device stops transmitting signals on the first wireless channel(s) as shown by Block 1216. Subsequently, method 1200 ends at Block 1218, or other operations are performed (e.g., return to Block 1204).

Figure 13:
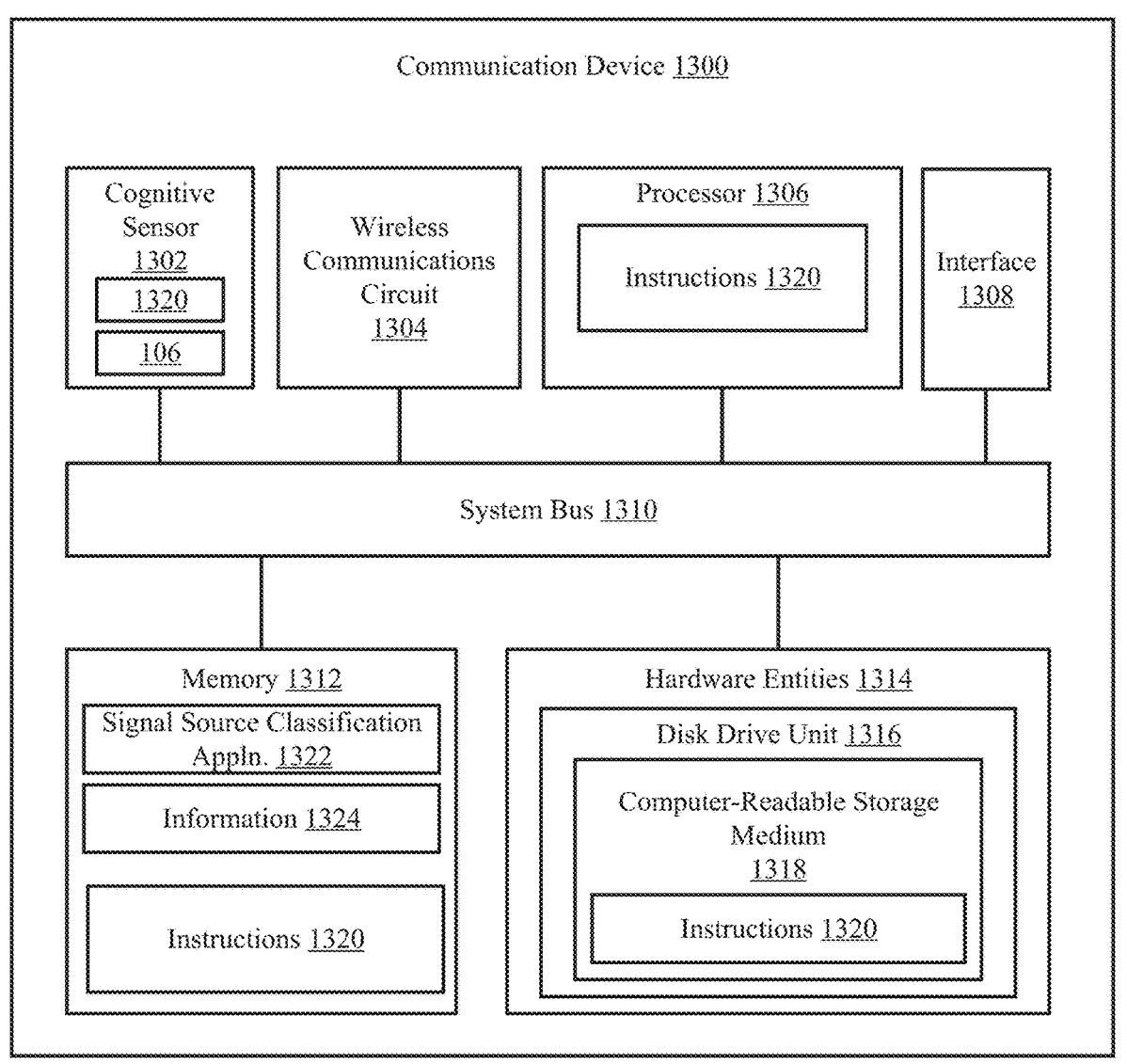
FIG. 13 is a schematic block diagram of an illustrative communication device.

A detailed block diagram of an illustrative architecture for a communication device is provided in FIG. 13. The communication devices 1102, 1104 and/or 1106 of FIG. 11 may be the same as or substantially similar to communication device 1300 of FIG. 13. As such, the discussion of communication device 1300 is sufficient for understanding communication devices 1102, 1104, 1106 of FIG. 11.

Communication device 1300 implements a machine learning algorithm to facilitate determinations as to an available/unavailable state of wireless channel(s) (e.g., wireless channel 1106 of FIG. 11). The communication device 1300 dynamically transitions communication operations between wireless channels based on the determined available/unavailable state(s) thereof. In this regard, the communication device 1300 includes a plurality of components shown in FIG. 13. The communication device 1300 may include more or less components than those shown in FIG. 13. However, the components shown are sufficient to disclose an example embodiment implementing the present approach. The hardware architecture of FIG. 13 represents one implementation of a representative communication device configured to enable dynamic use of wireless channels to avoid user interference and congestion. As such, the communication device 1300 of FIG. 13 implements at least a portion of the method(s) described herein.

The communication device 1300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 13, the communication device 1300 comprises a cognitive sensor 1302, a wireless communications circuit 1304, a processor 1306, an interface 1308, a system bus 1310, a memory 1312 connected to and accessible by other portions of communication device 1300 through system bus 1310, and hardware entities 1314 connected to system bus 1310. The interface 1308 provides a means for electrically connecting the communication device 1300 to other external circuits (e.g., a charging dock or device).

The cognitive sensor 1302 is generally configured to determine a source of a signal transmitted over a wireless channel. This determination is made via a signal source classification application 1322 using information 1324. Information 1324 comprises outputs generated by one or more machine learning algorithms. The machine learning algorithm(s) can employ supervised machine learning. Supervised machine learning algorithms are well known in the art. In some scenarios, the machine learning algorithm(s) include(s), but is (are) not limited to, a gradient decent learning algorithm, a Residual neural network (ResNet), a Convolutional Neural Network (CNN), a Recurrent Neural Network (RNN) (e.g., a Long Short-Term Memory (LSTM) neural network), and/or a deep learning algorithm. The machine learning process implemented by the present approach can be built using Commercial-Off-The-Shelf (COTS) tools (e.g., SAS available from SAS Institute Inc. of Cary, N.C.).

Each machine learning algorithm is provided one or more feature inputs for a received signal, and makes a decision as to a modulation classification for the received signal. In some scenarios, the machine learning algorithms include neural networks that produce outputs hi in accordance with the following mathematical equations.

$$h_i = L(w_i(x_i)) \tag{1}$$

$$h_i = L(w_i(x_i)) + w_2(x2) + \dots w_1(x_i)) \tag{2}$$

where $L(\ )$ represents a likelihood ratio function, $w_1$, $w_1, \dots, w_i$ each represent a weight, and $x_1, x_1, \dots, x_i$ represent signal features. The signal features can include, but are not limited to, a center frequency, a change in frequency over time, a phase, a change in phase over time, amplitude, an average amplitude over time, a data rate, and a wavelength. The output hi includes a set of confidence scores. Each confidence score indicates a likelihood that a signal was modulated using a respective type of modulation. The set of confidence scores are stored in any format selected in accordance with a given application.

Figure 14:
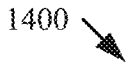
FIG. 14 is a table showing illustrative machine learning related information.

For example, as shown in FIG. 14, the confidence scores (e.g., $S_{1-1}, S_{1-2}, \dots, S_{1-24}, S_{2-1}, S_{2-2}, \dots, S_{2-24}, \dots, S_{N-1}$, $S_{N-2}, \dots, S_{N-24}$) are stored in a table format so as to be associated with identifiers for machine learning algorithms (e.g., A1 identifying a first neural network, A2 identifying a second neural network, . . . , A1 identifying an $N^{th}$ neural network) and identifiers for modulation classes (e.g., $M_1$ identifying a first modulation class, $M_2$ identifying a second modulation class, . . . , $M_{24}$ identifying a twenty-fourth modulation class). The modulation classes can include, but are not limited to, On-Off Keying (OOF), 4 Amplitude Shift Keying (ASK), Binary Phase Shift Keying (BPSK), Quadrature Phase Shift Keying (QPSK), 8 Phase Shift Keying (PSK), 16 Quadrature Amplitude Modulation (QAM), OQPSK, 16PSK, 32PSK, 16 Amplitude and Phase Shift Keying (APSK), 32 APSK, 64 APSK, 128 APSK, 16 QAM, 32 QAM, 64 QAM, 128 QAM, 256 QAM, Amplitude Modulation-Single Sideband-With Carrier (AM-SSB-WC), Amplitude Modulation-Single Sideband-Suppressed Carrier (AM-SSB-SC), Amplitude Modulation-Double Sideband-With Carrier (AM-DSB-WC), Amplitude Modulation-Double Sideband-Suppressed Carrier (AM-DSB-SC), Frequency Modulation (FM), and/or Gaussian Minimum Shift Keying (GMSK). Each confidence score can include, but is not limited to, a likelihood score and/or a goodness-of-fit-predicted score. The goodness-of-fit-predicted score may be calculated based on the number of signals (e.g., 2.5 million) and the number of modulation classes (e.g., 24). The goodness-of-fit-predicted score describes how well the machine learning algorithm and modulation class fit a set of signal observations. A measure of goodness-of-fit summarizes the discrepancy between observed values and the values expected under the machine learning algorithm in question. The goodness-of-fit-predicted score can be determined, for example, using a chi-squared distribution algorithm and/or a likelihood ratio algorithm. The present approach is not limited to the particulars of this example.

The cognitive sensor 1302 then performs operations to either (i) select the modulation class associated with the highest confidence score or (ii) select one of the modulation classes for the signal based on results of an optimization algorithm. The optimization algorithm can include, but is not limited to, a game theory based optimization algorithm. The game theory based optimization algorithm will be discussed in detail below.

Once the modulation class has been decided for the received signal, the cognitive sensor 1302 then makes a decision as to whether the source of the signal was a primary user of the wireless spectrum. This decision is made based on the modulation class, a bit rate and/or a center frequency of the signal. For example, a decision is made that the primary user is the source of a signal when the signal comprises a 1 Mb/s BPSK signal with a center frequency of 10 MHZ. The present approach is not limited in this regard.

At least some of the hardware entities 1314 perform actions involving access to and use of memory 1312, which can be a Random Access Memory (RAM), and/or a disk driver. Hardware entities 1314 can include a disk drive unit 1316 comprising a computer-readable storage medium 1318 on which is stored one or more sets of instructions 1320 (e.g., software code) configured to implement one or more of the methodologies, procedures, or functions described herein. The instructions 1320 can also reside, completely or at least partially, within the memory 1312, with the cognitive sensor 1320, and/or within the processor 1306 during execution thereof by the communication device 1300. The memory 1312, cognitive sensor 1320 and/or the processor 306 also can include machine-readable media. The term "machine-readable media", as used here, refers to a single medium or multiple media (e.g., a centralized or distributed database, and/or associated caches and servers) that store the one or more sets of instructions 1320. The term "machine-readable media", as used here, also refers to any medium that is capable of storing, encoding or carrying a set of instructions 1320 for execution by the processor 1306 and that cause the processor 306 to perform any one or more of the methodologies of the present disclosure.

Figure 15:
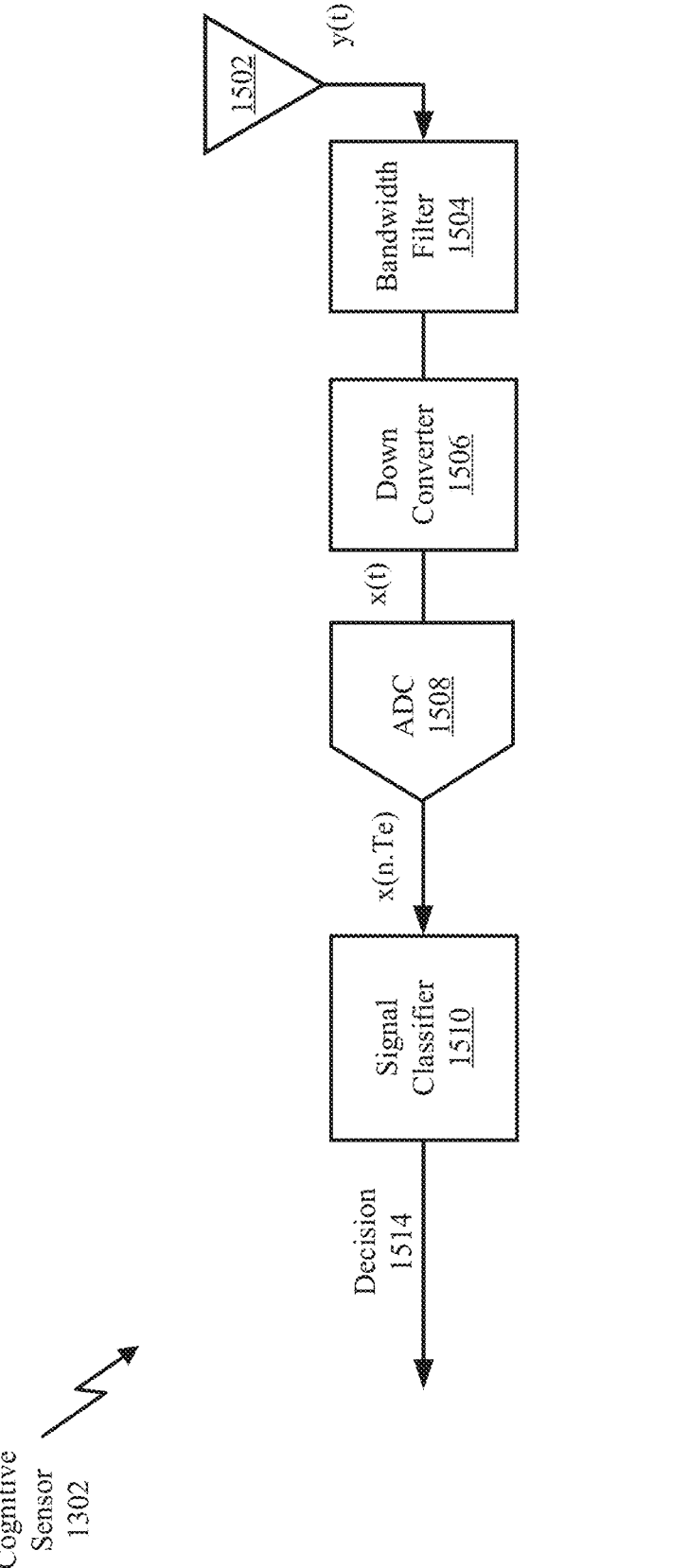
FIG. 15 is a block diagram of an illustrative cognitive sensor.
Figure 16:
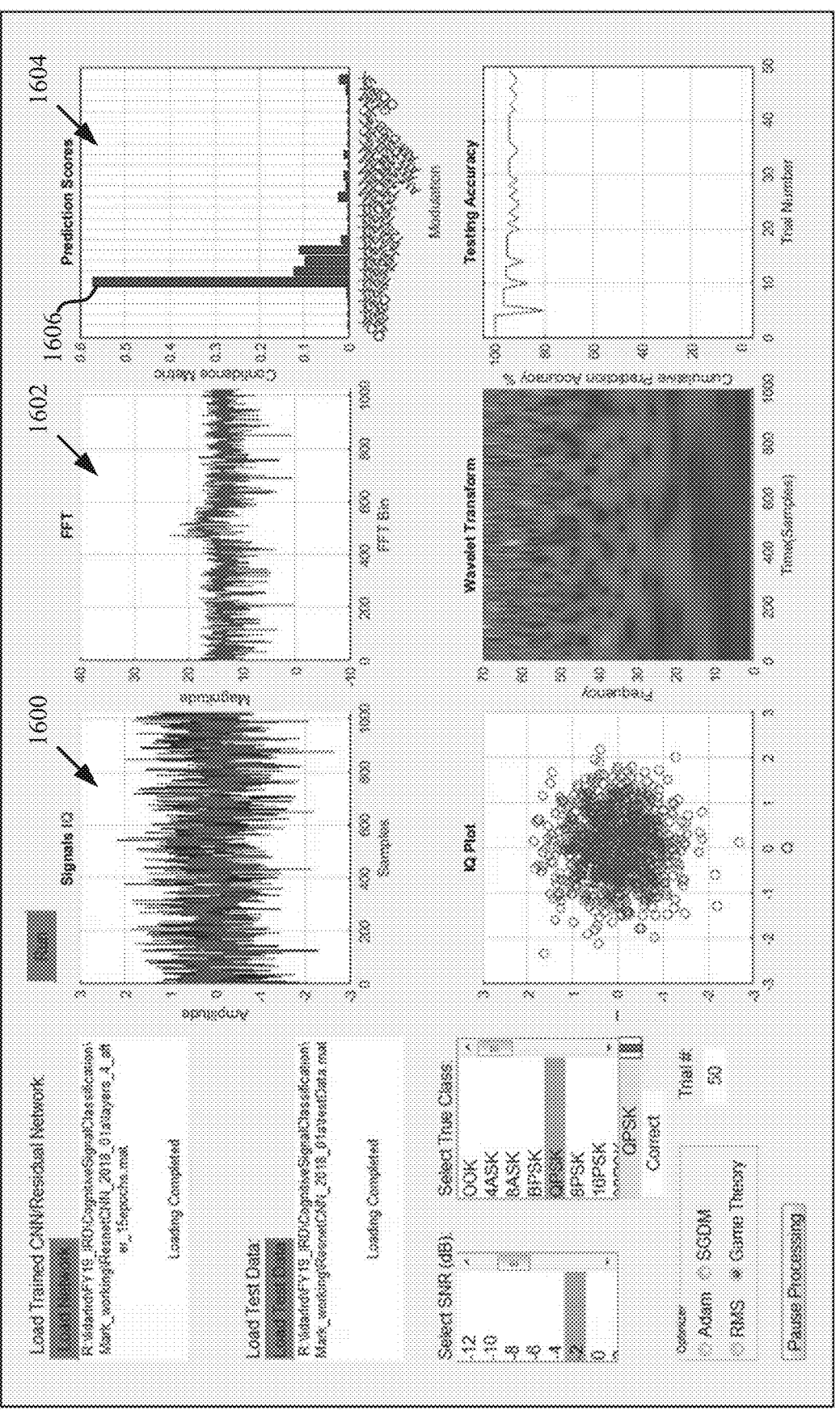
FIG. 16 provides graphs that are useful for understanding operations of the cognitive sensor shown in FIG. 15.

Referring now to FIG. 15, there is provided a more detailed diagram of the cognitive sensor 1302. As shown in FIG. 15, cognitive sensor 1302 is comprised of an antenna 1502, a bandwidth filter 1504, a down converter 1506, an Analog-to-Digital Converter (ADC) 1508, a machine learning algorithm selector 1510, and a signal classifier 1512. Antenna 1502 is configured to receive a radio signal y (t) transmitted from communication devices (e.g., communication device 1102, 1104 and/or 1108 of FIG. 11). An illustrative radio signal 1600 is shown in FIG. 16. The received radio signal y(t) is filtered on a bandwidth Bi by bandwidth filter 1504, and then down converted by down converter 1506. The down converted signal x(t) is passed to the input of the ADC 1508. ADC 1508 is configured to convert analog voltage values to digital values, and communicate the digital values x(n·Te) to the signal classifier 1510.

The signal classifier 1512 uses one or more machine learning algorithms to (i) detect the radio signal (t) in the presence of noise and (ii) make a decision 1514 as to the modulation classification that should be assigned thereto. For example, as shown in FIG. 16, a trained CNN/neural network is provided a Fast Fourier Transform input signal 1602, processes the input signal, and outputs prediction scores 1604 for a plurality of modulation classes. The signal is assigned a QPSK modulation class since it is associated with the highest predictions score 1606. The present approach is not limited to the particulars of this example. In other scenarios, an optimization algorithm is performed to select the modulation class to be assigned to the signal. The optimization algorithm can include, but is not limited to, a game theory based optimization algorithm, an Adam optimization algorithm, an a stochastic gradient decent optimization algorithm, and/or a root mean square optimization algorithm. It should be noted that the modulation class that is selected in accordance with the optimization algorithm may or may not be associated with the highest prediction/likelihood score.

Once the modulation classification has been decided for the signal, the signal classifier 1512 performs further operations to determine whether the primary user is the source of the signal. These operations can involve: obtaining the modulation class assigned to the signal; obtaining a bit rate and center frequency for the radio signal; and comparing the modulation class, bit rate and center frequency to pre-stored source information to determine if a match exists therebetween by a certain amount (e.g., the bit rates match by at least 70% and/or the center frequencies match by at least 508). If a match exists, then the signal classifier 1512 decides that the primary user is the source of the radio signal and is using the band BL. Otherwise, the signal classifier 1512 decides that someone other than the primary user is the source of the radio signal and trying to encroach on the band BL. If the radio signal y(t) is detected and the primary user is using the band By, then a decision is made that the band Bi is unavailable. Otherwise, a decision is made that the band Bi is available.

An illustrative architecture for a neural network implementing the present approach is provided in FIG. 17. As shown in FIG. 17, the neural network comprises a signal source classifier that performs one or more machine learning algorithms. Each machine learning algorithm uses an input $x_i$ and generates an output $h_i$. The input $x_i$ may be provided in a time domain (e.g., defines a waveform shape), a frequency domain, a phase domain and/or an amplitude domain. The output $h_i$ comprises a set of prediction/likelihood scores determined for a plurality of modulation classes. In some scenarios, the output $h_i$ is determined in accordance with the above provided mathematical equation (1) or (2).

Another illustrative architecture for a neural network implementing the present approach is provided in FIG. 18. As shown in FIG. 18, the neural network comprises a signal source classifier that performs one or more machine learning algorithms. The signal source classifier receives a plurality of inputs $x_{i-d1}$, $x_{i-d2}$, . . . , $x_{i-dv}$ and generates an output hi. The inputs may be provided in different domains. For example, input $x_{1-d1}$ is provided in a frequency domain (e.g., defining a change in frequency over time). Input $x_{i-d2}$ is provided in a phase domain (e.g., defining a change in phase over time), while input $x_{i-dv}$ is provided in an amplitude domain (e.g., defining an average amplitude over time) or other domain (e.g., a time domain). The inputs $x_{i-d2}$, . . . , $x_{i-dv}$ can be derived using various algorithms that include, but are not limited to, a Fourier transform algorithm, a power spectral density algorithm, a wavelet transform algorithm, and/or a spectrogram algorithm. Each machine learning algorithm uses a combination of the inputs to determine a set of prediction/likelihood scores. The inputs $x_{i-d1}$, $x_{i-d2}$; . . . , $x_{i-dv}$ may be weighted differently by the machine learning algorithms. The weights can be pre-defined, or dynamically determined based on characteristic(s) of the received waveform. The prediction/likelihood scores are then analyzed to determine a modulation class to be assigned to the radio signal. For example, the modulation class is assigned to the radio signal which is associated with the highest prediction/likelihood score or which is associated with a prediction/likelihood score selected in accordance with an optimization algorithm (e.g., a game theory algorithm).

The present approach is not limited to the neural network architectures shown in FIG. 17-18. For example, the neural network can include a plurality of residual units that perform the machine learning algorithm in a sequential manner as shown in FIG. 19.

As noted above, the modulation class may be selected based on results of a game theory analysis of the machine learned models. The following discussion explains an illustrative game theory optimization algorithm.

Typical optimization of a reward matrix in a one-sided, "game against nature" with a goal of determining the highest minimum gain is performed using novel quantum computing techniques. In most cases, an optimal result is obtained, but occasionally one or more constraints eliminate possible feasible solutions. In this case, a quantum subset summing approach can be used. The quantum subset summing computes the optimal solution by determining the highest gain decision after iteratively considering all subsets of the possible decision alternatives.

A game theory analysis can be understood by considering a tactical game. Values for the tactical game are presented in the following TABLE 1. The unitless values range from −5 to 5, which indicate the reward received performing a given action for a particular scenario. The actions for the player correlate in the rows in TABLE 1, while the potential scenarios correlate to the columns in TABLE 1. For example, the action of firing a mortar at an enemy truck yields a positive reward of 4, but firing a mortar on a civilian truck yields a negative reward of −4, i.e., a loss. The solution can be calculated from a linear program, with the results indicating that the best choice for the play is to advance rather than fire mortar or do nothing. In example with very large reward matrices, the enhancement technique of subset summing may also be applied. Since there are four scenarios in this example (enemy truck, civilian truck, enemy tank, or friendly tank), there are $2^4=16$ subsets of the four scenarios. One of these subsets considers none of the scenarios, which is impractical. So in practice, there are always $2^P-1$ subsets, where P is the number of columns (available scenarios) in a reward matrix. TABLE was reproduced from the following document: Jeremy Jordan, "Updating Optimal Decisions Using Game Theory and Exploring Risk Behavior Through Response Surface Methodology", US Air Force, Thesis, 2007.

TABLE 1

|  | Enemy Truck | Civilian Truck | Enemy Tank | Friendly Tank |
|---|---|---|---|---|
| Fire Mortar | 4 | −4 | 5 | −5 |
| Advance | 1 | 4 | 0 | 4 |
| Do Nothing | −1 | 1 | −2 | 1 |

The goal of linear programming is to maximize a function over a set constrained by linear inequalities and the following mathematical equations (3)-(9).

$$\max z = v + 0w_1 + 0w_2 + 0w_3 \tag{3}$$

$$\text{s.t. } v \le 4w_1 + 1w_2 + -1w_3 \tag{4}$$

$$v \le 4w_1 + 4w_2 + 1w_3 \tag{5}$$

$$v \le 5w_1 + 0w_2 + -2w_3 \tag{6}$$

$$v \le -5w_1 + 4w_2 + 1w_3 \tag{7}$$

$$\sum w_1 = 1 \tag{8}$$

$$w_i \ge 0 \, \forall \, i \tag{9}$$

where z represents the value of the game, or the objective function, v represents the value of the constraints, $w_i$ represents the optimal probability solution for choice 'Fire Mortar', $w_2$ represents the optimal probability solution for choice 'Advance', $w_3$ represents the optimal probability solution for choice 'Do Nothing', and i represents the index of decision choice. Using a simplex algorithm to solve the linear program yields mixed strategy [0.2857, . . . 0.7143, 0]. To maximize minimum gain, the player should fire a mortar approximately 29% of the time, advance 71% of the time, and do nothing none of the time.

In scenarios with very large reward matrices, the optional technique of subset summing may be applied. The subset summing algorithm reduces a constrained optimization problem to solving a series of simpler, reduced-dimension constrained optimization problems. Specifically, for a reward matrix consisting of P scenarios (columns), a set of $2^P-1$ new reward matrices are created by incorporating unique subsets of the scenarios. To illustrate the generation of the subsets to be considered, the following mathematical equation (10) shows an example of constraints from the example of TABLE 1 where each row in the equation corresponds to a row in the reward matrix A. Each new reduced reward matrix is formed by multiplying A element-wise by a binary matrix. Each of the $2^P-1$ binary matrices has a unique set of columns which are all-zero. The element-wise multiplication serves to mask out specific scenarios, leaving only specific combinations, or subsets, of the original scenarios to be considered. This operation increases the run time, but may be a necessary trade-off for improved accuracy. This method also ensures that the correct answer is found by computing the proper objective function. If, for example, A represents a reward matrix, then the solution for computing all combinations of rows is:

$$A. * \qquad \begin{bmatrix} 1 & 1 & 0 & 1 \\ 1 & 1 & 0 & 1 \\ 1 & 1 & 0 & 1 \end{bmatrix} \tag{10}$$

Figure 21:
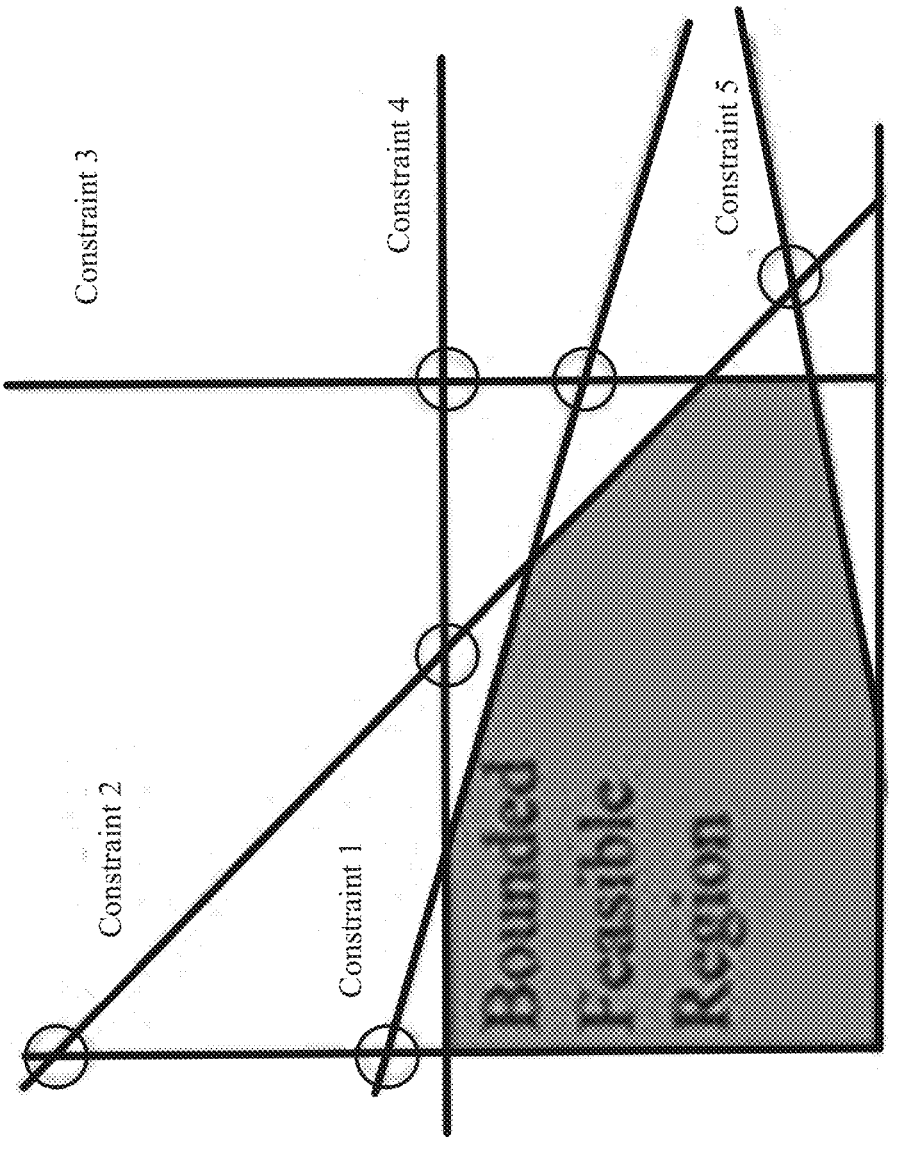
FIG. 21 is a graph that is useful for understanding game theory.

One reason for running all combinations of decisions, $2^P-1$, where P is the number of rows in a reward matrix, is that one or more constraints eliminate(s) possible feasible solutions, as shown in FIG. 21 with circles. A feasible region is a graphical solution space for the set of all possible points of an optimization problem that satisfy the problem's constraints. Information is treated as parameters rather than constraints, so that a decision can be made outside of traditional feasible regions. This is why the present approach works robustly with complex data for general decision-making applications. Note that FIG. 21 is a simplified representation that could have as many as P dimensions.

The above TABLE 1 can be modified in accordance with the present approach. For example, as shown in FIG. 20, each row of a table 2000 is associated with a respective machine learning algorithm of a plurality of machine learning algorithms, and each column is associated with a respective modulation class of a plurality of modulation classes. Each cell in the body of the table 2000 includes a likelihood score S. The likelihood scores can include, but are not limited to, goodness-of-fit-predicted scores calculated based on the number of signals and modulation classes. Each goodness-of-fit-predicted score describes how well the machine learned model and modulation class fit a set of observations. A measure of goodness-of-fit summarizes the discrepancy between observed values and the values expected under the machine learned model in question. The goodness-of-fit-predicted score can be determined, for example, using a chi-squared distribution algorithm and/or a likelihood ratio algorithm. The modulation classes can include, but are not limited to, frequency modulation, amplitude modulation, phase modulation, angle modulation, and/or line coding modulation.

The reward matrix illustrated by table 2000 can be constructed in accordance with any known technique and solved by a quantum processor (e.g., quantum processor 106 of FIG. 1). The quantum processor 106 can be implemented in a cognitive sensor (e.g., cognitive sensor 1302 of FIG. 13) of a communications device (e.g., communication device 1102, 1104 or 1108 of FIG. 11).

Figure 22:
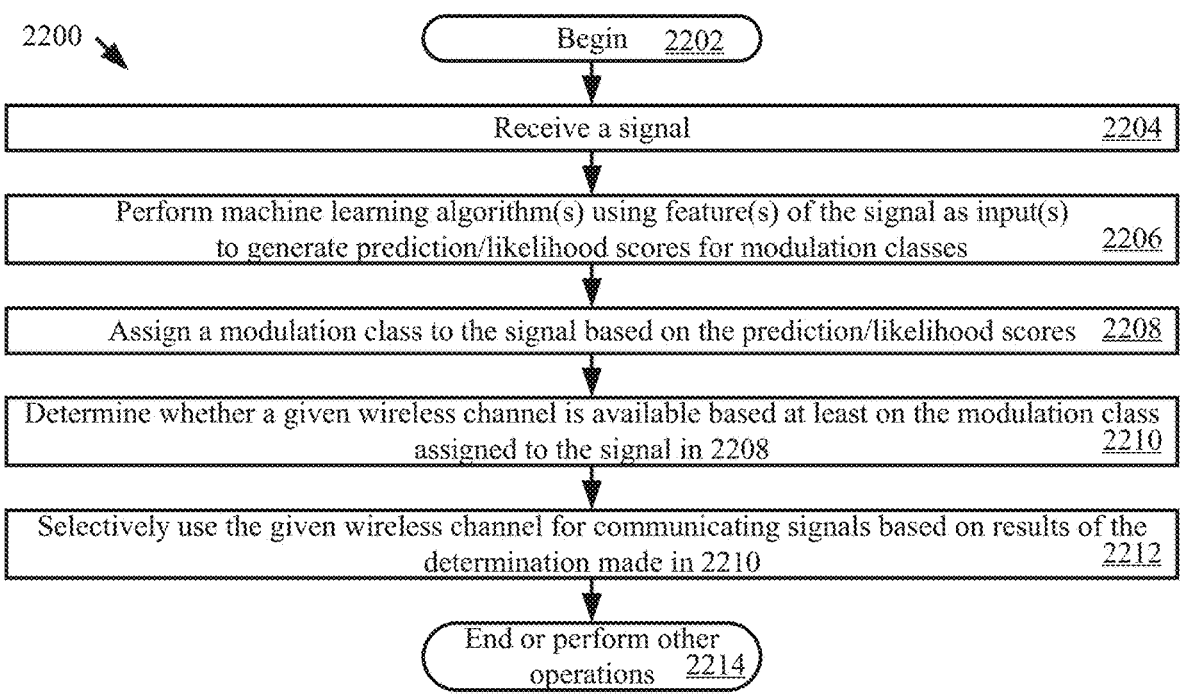
FIG. 22 is a flow diagram of an illustrative method for determining an availability of channel(s) in a wireless spectrum.

Referring now to FIG. 22, there is provided a flow diagram of an illustrative method 2200 for operating a communication device (e.g., communication device 1102, 1104 or 1108 of FIG. 11). Method 2200 begins with Block 2202 and continues with Block 2204 where the communication device receives a signal (e.g., signal 1600 of FIG. 16). In Block 2206, the communication device performs one or more machine learning algorithms (e.g., neural network(s)) using at least one feature of the signal (e.g., a frequency, phase, amplitude) as an input to generate a plurality of scores (e.g., goodness-of-fit-predicted scores). Each score represents a likelihood that the signal was modulated using a given modulation type of a plurality of different modulation types (e.g., ASK, PSK, QAM, and/or FM). A modulation class is assigned to the signal in Block 2208 based on the scores. For example, the signal is assigned a modulation class that is associated with the score having the greatest value. Alternatively, the signal is assigned a modulation class that is associated with a score that was selected based on results of an optimization algorithm (e.g., a game theory analysis).

Next in Block 2210, a determination is made by the communications device as to whether a given wireless channel (e.g., wireless channel 1106 or 1110 of FIG. 11) is available based on the modulation class assigned to the signal, a bit rate, and/or a center frequency of the signal. In some scenarios, a determination is made that the given wireless channel is unavailable when a decision is made that the primary user is not the source of the signal (e.g., based on the modulation class, bit rate of the signal and/or center frequency of the signal). A determination is made that the given wireless channel is unavailable when a decision is made that the primary user is not the source of the signal (e.g., based on the modulation class, bit rate of the signal and/or center frequency of the signal).

The communication device performs operations in Block 2212 to selectively use the given wireless channel for communicating signals based on results of the determination made in Block 2210. For example, the given wireless channel is used by a secondary user (e.g., user 1122 of FIG. 11) for communications when a decision is made that the same is available (e.g., when the primary user (e.g., user 1120 of FIG. 11) is not the source of the signal thereby indicating that the primary user is not using the same). In contrast, the secondary user stops using the given wireless channel for communications when a decision is made that the same is unavailable (e.g., when the primary user is the source of the signal thereby indicating that the primary user is using the same). Subsequently, method 2200 ends at Block 2214, or other operations are performed (e.g., return to Block 2204).

Figure 23:
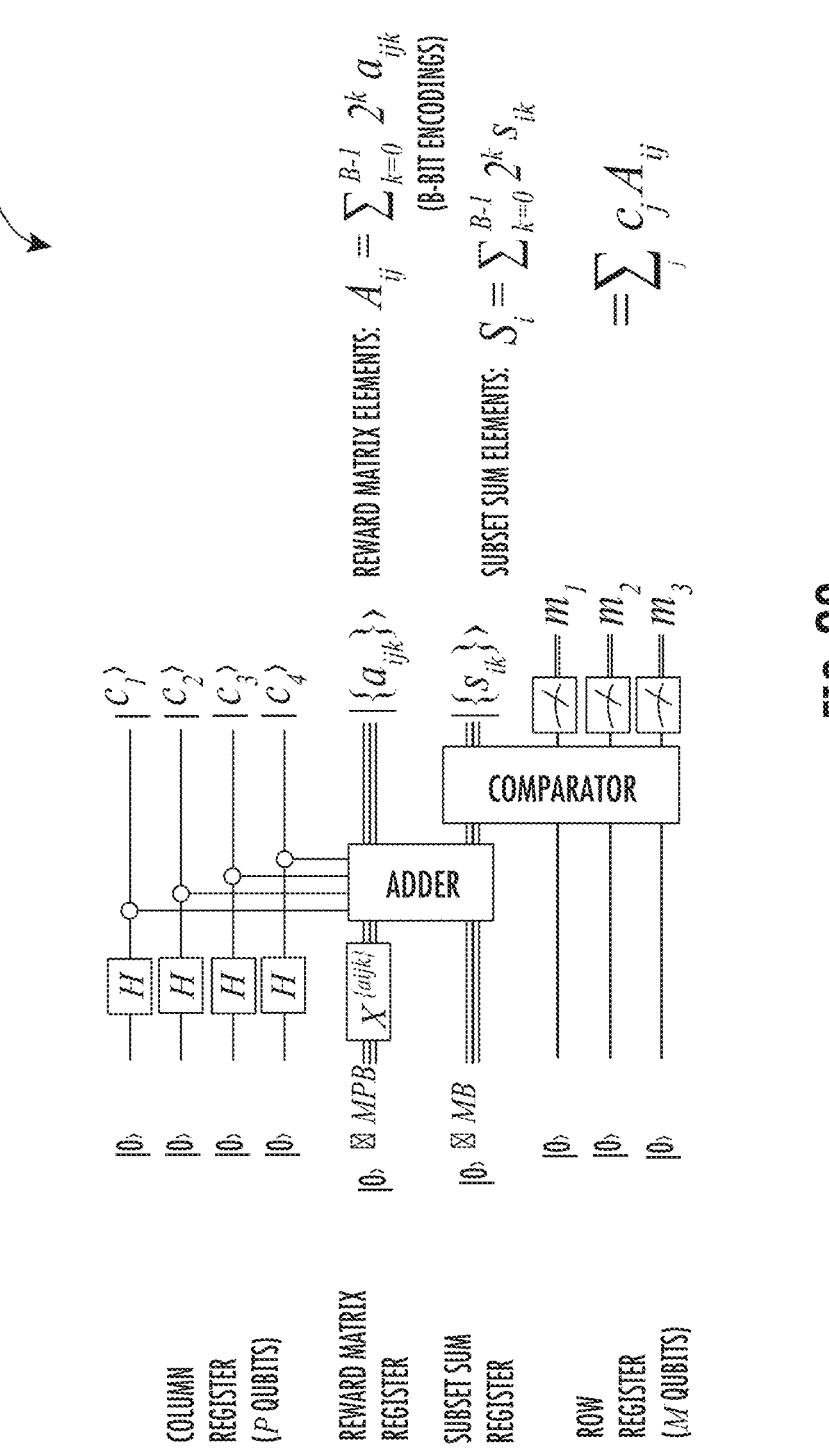
FIG. 23 is a schematic diagram of an example quantum subset summing approximation circuit.
Figure 24:
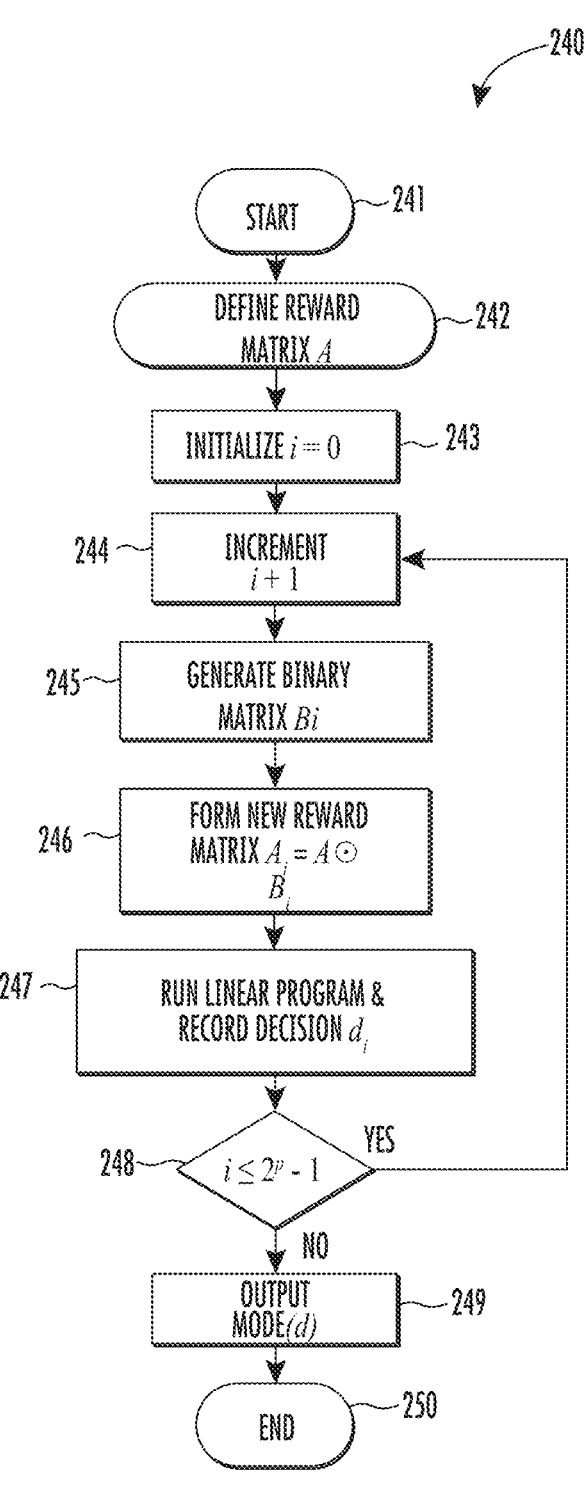
FIG. 24 is flow diagram illustrating a subset summing algorithm which may be used in an example embodiment.

Another example quantum subset summing approximation circuit 460 is illustrated in FIG. 23. An example subset summing algorithm is now described with reference to the flow diagram 240 of FIG. 24. Beginning at Block 241, a reward matrix A is defined (Block 242) which includes M rows (Decisions) and p columns (Scenarios), A loop→Set i=0 is initialized at Block 243, and a loop counter is incremented (i+1), at Block 244. For (M×p) binary matrix $B_i$ to mask out combination of Scenarios, at Block 245, a pointwise multiplication of elements $A_i=A\odot B_i$ is performed, and a linear program solved (Block 247) based upon input constraints and Subset Reward Matrix $A_i$, and output probability vector $x_i$, and $d_i$→decision is recorded which maximizes output probability vector $x_i$. If $i\leq 2^P-1$ (Block 248), the process returns to the increment step (Block 244), otherwise the loop is exited. The output mode chosen (most frequently-occurring) is in the form of a decision in vector $d_i$, at Block 249. The method of FIG. 24 illustratively concludes at Block 250.

Figure 25:
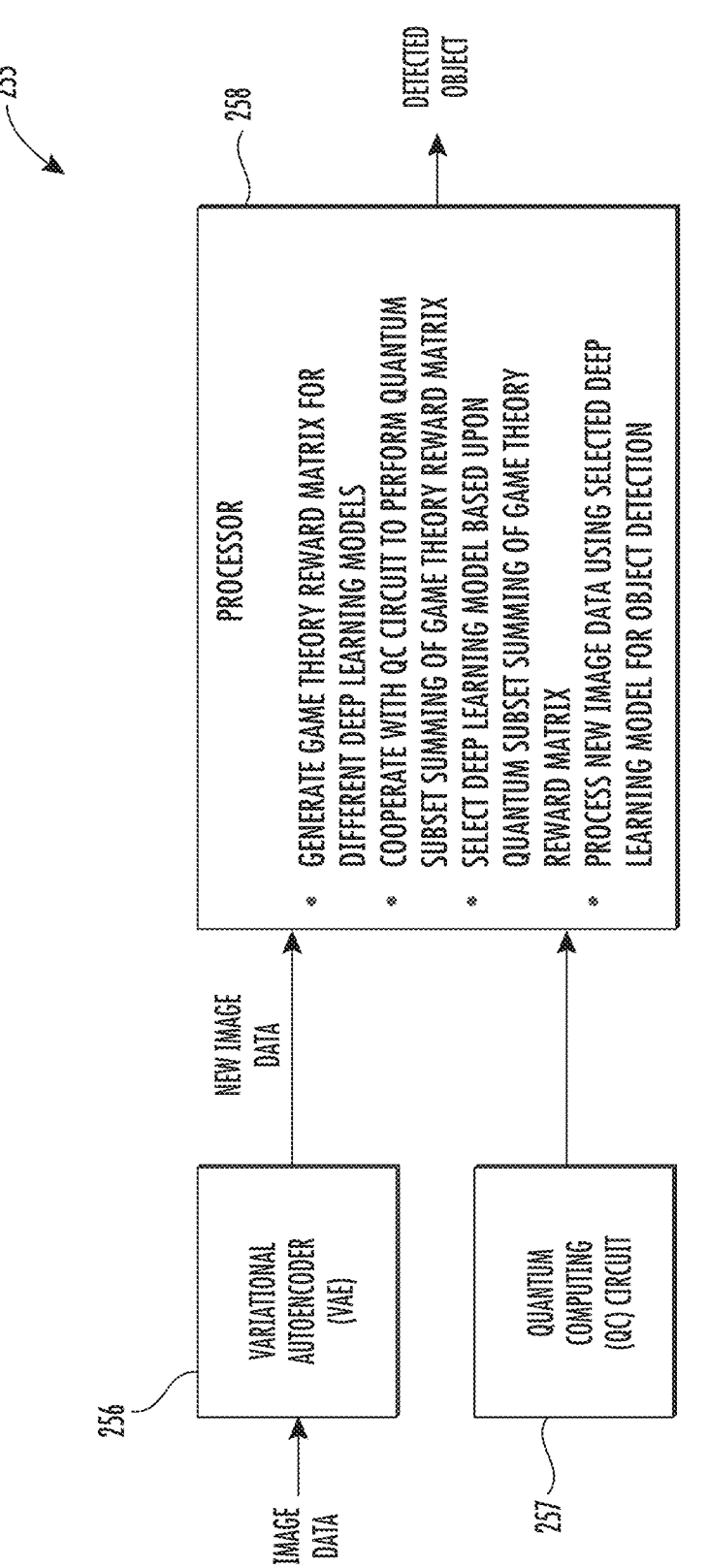
FIG. 25 is a schematic block diagram of an object detection device which incorporates quantum computing techniques in accordance with an example embodiment.

Turning now to FIG. 25, an example object detection device 255 illustratively includes a variational autoencoder (VAE) 256 configured to encode image data to generate a latent vector, and decode the latent vector to generate new image data. The object detection device also illustratively includes a quantum computing circuit 257 configured to perform quantum subset summing, as described further above, and a processor 258. The processor 258 is configured to generate a game theory reward matrix for a plurality of different deep learning models, cooperate with the quantum computing circuit 257 to perform quantum subset summing of the game theory reward matrix, select a deep learning model from the plurality thereof based upon the quantum subset summing of the game theory reward matrix, and process the new image data using the selected deep learning model for object detection, as will be discussed further below.

By way of background, predictive inferences may be created of what a scene should look like based on composite history. The prediction may be tailored across parameters (e.g., based on specific time period). Traditional change detection approaches typically just compare images from two discrete points in time. Prediction can also be based on determining the most likely value for pixels in images. Moreover, comparisons may be complicated as between a current image and a prediction that has both transient and persistent objects rendered.

Normalization for collection geometry may also be a consideration. 3D models may be used to generate views of a scene from multiple angles to match a new collection. Generative algorithms enable "fill in" of non-collected areas caused by collection geometry. Traditional change detection methods may impose similarity constraints on collection geometry.

Furthermore, cross-sensor processing increases persistence by reducing revisit time. More particularly, cross modality processing increases look frequency over an area of interest (AOI). In addition, cross modality correlation enables prediction based on most current AOI configuration regardless of collection mode, and cross modality processing may improve all weather capabilities.

In certain implementations, it may be desirable to detect objects of interest from multi-modality imagery. The present approach may apply a fully convolutional-deconvolutional network trained end-to-end with semantic segmentation to classify land use/land cover features, for example. Ensemble models may be applied by game theory optimization per pixel to advantageously improve the estimation of pixel height from various types of images to provide better 2D/3D maps. This approach may also support multi-spectral and panchromatic images, as well as support images with and without sensor information.

Various approaches are typically used for image classification. Image classification from deep learning networks is a relatively recent research topic. Typical approaches may use one of the following: matched filters; support vector machines; Bayesian analysis; or object features. The object detection device 255 may advantageously provide additional technical advantages through image semantic segmentation and classification information using deep learning, game theory optimization from ensemble of models, cross-modality imagery, and intellimatics techniques.

In some embodiments, a generative adversarial network (GAN) may be used to generate additional image data. Furthermore, discriminative algorithms may be used to classify input data, i.e., given the features of a data instance, they predict a label or category to which that data belongs. Moreover, the discriminative algorithms may be used to map features to labels, and may be tasked to be concerned solely with that correlation. Conceptually speaking, generative algorithms may be considered to do the opposite, e.g., instead of predicting a label given certain features, they attempt to predict features given a certain label. Generative algorithms may also be used as classifiers. One way to distinguish discriminative from generative approaches is that discriminative models learn the boundary between classes, whereas generative models model the distribution of individual classes.

The object detection device 255 advantageously provides for object detection in a way which would otherwise be challenging if not impossible using human decision-making with data from disparate sources. That is, the object detection device 255, may advantageously utilize the quantum subset summing approach described above to overcome limitations on human cognition and working knowledge and provide near-real-time or on-demand modes for improved analysis enabling more-accurate decisions in planning, resource allocation, and risk management, for example. That is, the object detection device 255 provides for object detection from different types of collected data that is automated, near-real-time, and graphical. More particularly, the processor 258 employs game theory to determine optimal strategies for decision-making and provides an automated situational awareness process that generates unstructured source data. A game theory reward matrix is created to solve for optimal tasking strategies. Moreover, the above-described quantum models are utilized for decision-making, which are described as probabilities, and the quantum decision theory relates to classical decision theory in terms of the expected utility.

The object detection device 255 may be implemented in conjunction with a multi-dimensional knowledge volume to provide a unique engine for producing orthorectified, intensity corrected, time-filtered inputs in three dimensions to a fully automated change-detection process. The relatively high collection cadence of available commercial image data provides an abundant supply of available samples for use in change-detection processing, especially when combined with an automated volumetric processing system. Typical data cubes developed for the GEOINT domain are essentially temporal or spectral sequences of two-dimensional spatial rasters. In an example implementation, the object detection device 255 may be used in conjunction with a volumetric processing system to extend this paradigm by using 2D spatial rasters to generate a highly accurate 3D model of the Earth's surface, which may be augmented with information and knowledge relationships between data layers in the cube.

Figure 26:
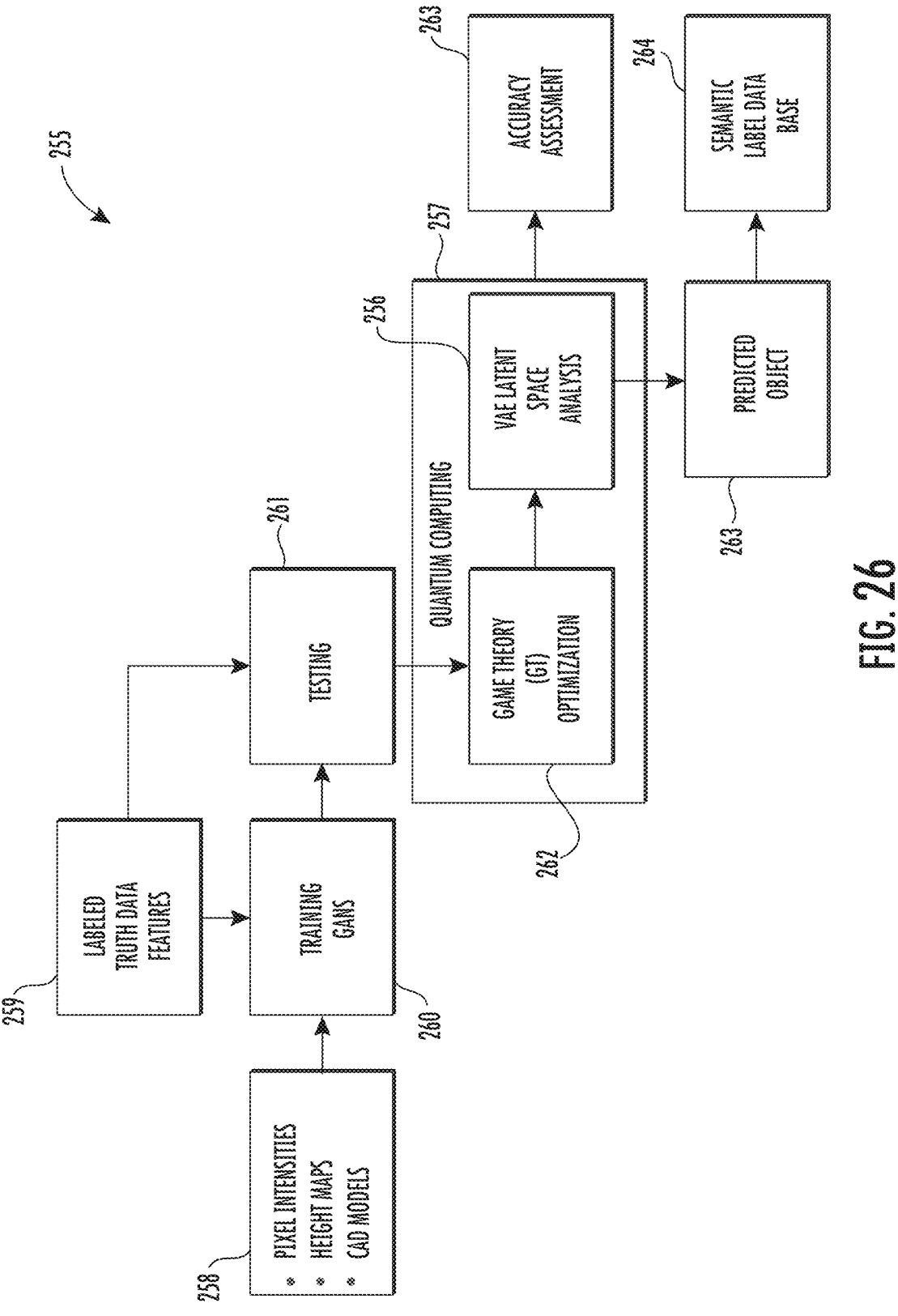
FIG. 26 is a schematic block diagram of an example implementation of the object detection device of FIG. 24.

Turning now to FIG. 26, in an example implementation the object detection device 255 receives inputs 258 (e.g., pixel intensities, high maps, CAD model data, etc.) and labeled truth data features 259 which are provided to GAN and testing modules 260, 261. The output of the testing module 261 is provided to the quantum computing circuit 257, which in the illustrated example includes a game theory optimization module 262. Also, the VAE 256 is implemented by the quantum computing circuit 257 in the present embodiment, which performs VAE latent space analysis. Outputs from the VAE 256 include accuracy assessment data 263 and predicted object data 263, which may in turn be provided to a semantic label database 264.

The quantum computing circuit 257 advantageously performs reward matrix subset summing using quantum adders and comparators to approximate the simplex algorithm in a linear program, as discussed further above. Furthermore, a statistical Z-test is also performed, in which the quantum computing circuit 257 also uses quantum adders and comparators to construct a Z-test to determine a test observation feature classification membership for each feature cluster in a 3D latent space of eigenvalues of a variational auto-encoder. Since each cluster may typically have at least 1000 observations to train a deep neural network, the quantum computing circuit 257 may employ sqrt (1000)~32 bins or more for each cluster's probability density function in a Z-test. By way of example, $32=2^5$ bins may be created using 5 qubits.

Furthermore, the quantum computing circuit 257 may utilize a latent space with Euclidean distance and transform the decision to a statistical distance. Each bin's histogram values are added from left to right, and observation values are compared to determine a P-value for the observation. One may use superposition to simultaneously calculate and compare a P-value with each cluster. The highest P-value would indicate the feature classification since a low P-Value is considered an outlier, and not a member of that feature class. The latent space analytics may require an iterative process for each sequential point in time. The quantum computing circuit 257 may accordingly employ quantum computing algorithms for enhanced performance and accurate results in numerous applications, such as in a fast-moving environment of flight operation changing geo-locations or electronic spectrum signals, as well as other applications where significant computational requirements in volumetric image processing are desired.

Figure 27:
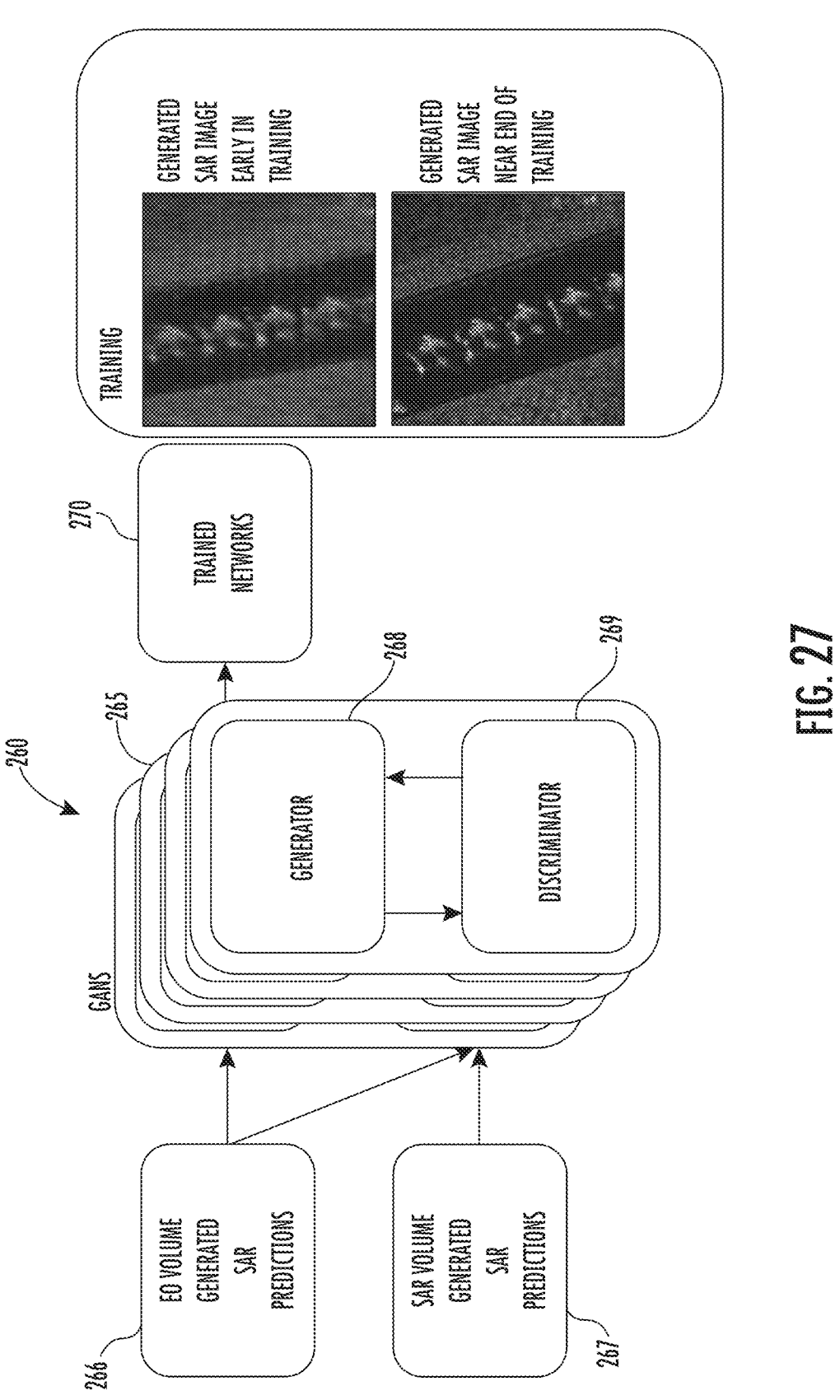
FIG. 27 is a schematic block diagram of an example implementation of the GANs module of FIG. 26.
Figures 28, 29:
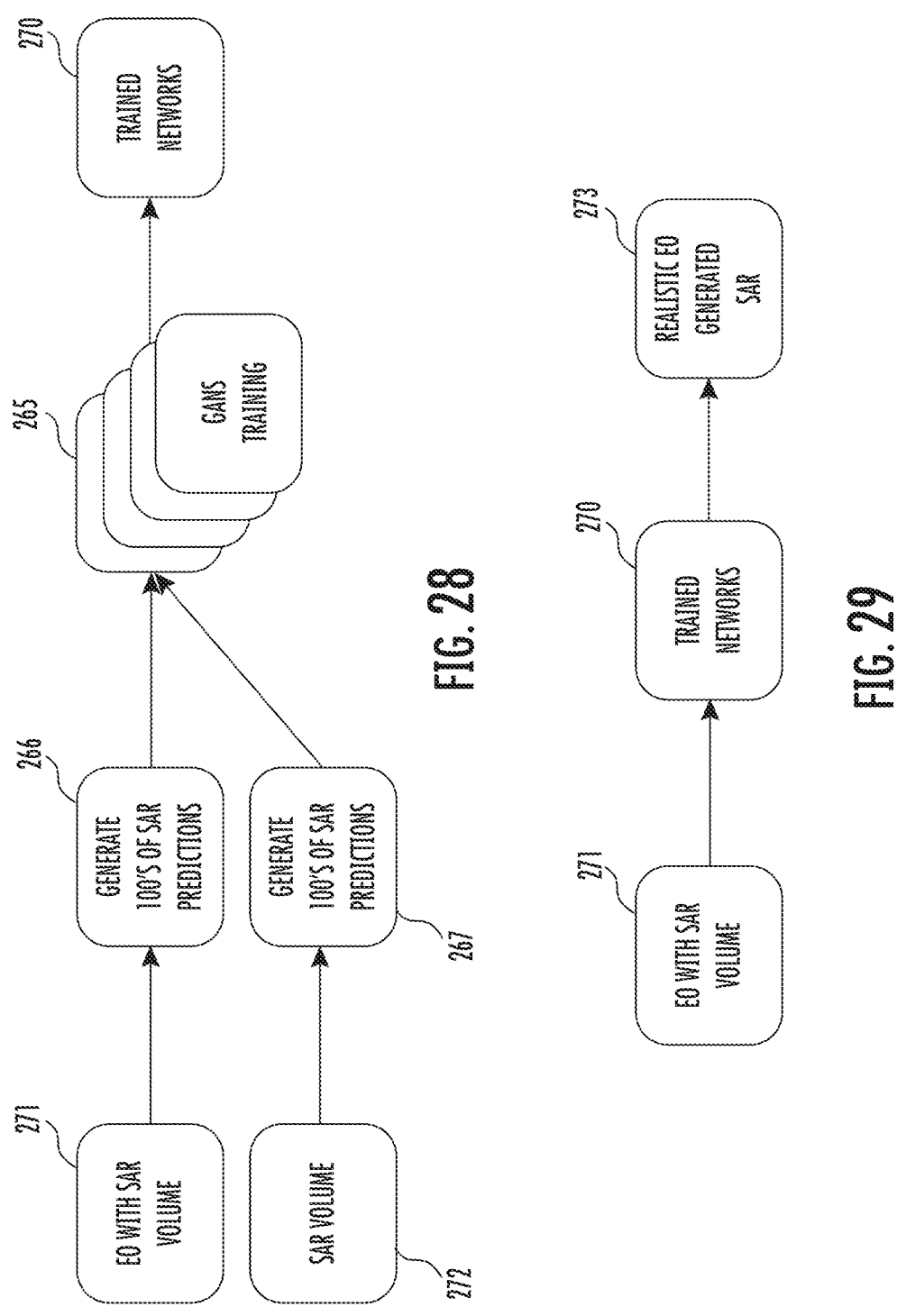
FIG. 28 is a schematic block diagram of a cooperative training process for the GAN module of FIG. 27.
FIG. 29 is schematic block diagram illustrating an example application of a trained GAN network of FIG. 28.

An example implementation of the GANs module 260 is provided in FIG. 27. The GANs module 260 implements a plurality of different GAN networks 265 trained with different EO volume generated synthetic aperture radar (SAR) predictions 266 and SAR volume generated SAR predictions 267. Each GAN network 265 illustratively includes a respective generator 268 and a discriminator 269. The GAN module 260 outputs a plurality of trained networks 270, as will be appreciated by those skilled in the art. An example cooperative training process is illustrated in FIG. 28, in which the SAR predictions 266, 267 are initially generated from an EO with SAR volume 271 and SAR volume 272, respectively. An example application of a trained GAN network 270 is shown in FIG. 29, in which the trainer network outputs a realistic EO generated SAR image 273.

In an example implementation, the object detection device 255 may be used in applications where a large amount of example target data is involved, or there is a need to generate data for AI training. In such cases, a computer aided design (CAD) target model may be extracted from an intellimatics volume using both the surface and voxel intensity to produce a faceted target model with sufficient fidelity to be utilized in automatic target recognition (ATR) data generation. This approach may enable tracking of common and unique targets. More particularly, automated CAD generation provides for extraction of both common and unique targets from the volume. Furthermore, the generation of target signatures given a small amount of collections allows for a unique target ATR (e.g., association for "tracklets"), as well as the ability to track unique targets amongst an area of interest (AOI) scene. This advantageously helps address a technical problem of 3D model errors through the use of iterative prediction on sub-patches to adjust the volume. This may be beneficial in terms of a better probability of detection, lower probability of false alarm, and better volumes (3D models), for example.

By way of example, an intellimatics volume may include images projected into voxel space with multiple surfaces extracted over time. A CAD extraction algorithm may use Topo3 generated surfaces and voxel intensity to determine target presence and thin the outline. An intellimatics volume CAD extraction may involve "thinning" a Topo3 surface with target silhouette to produce a higher quality CAD, mesh triangulated and LOD optimized for simulation.

Figure 30:
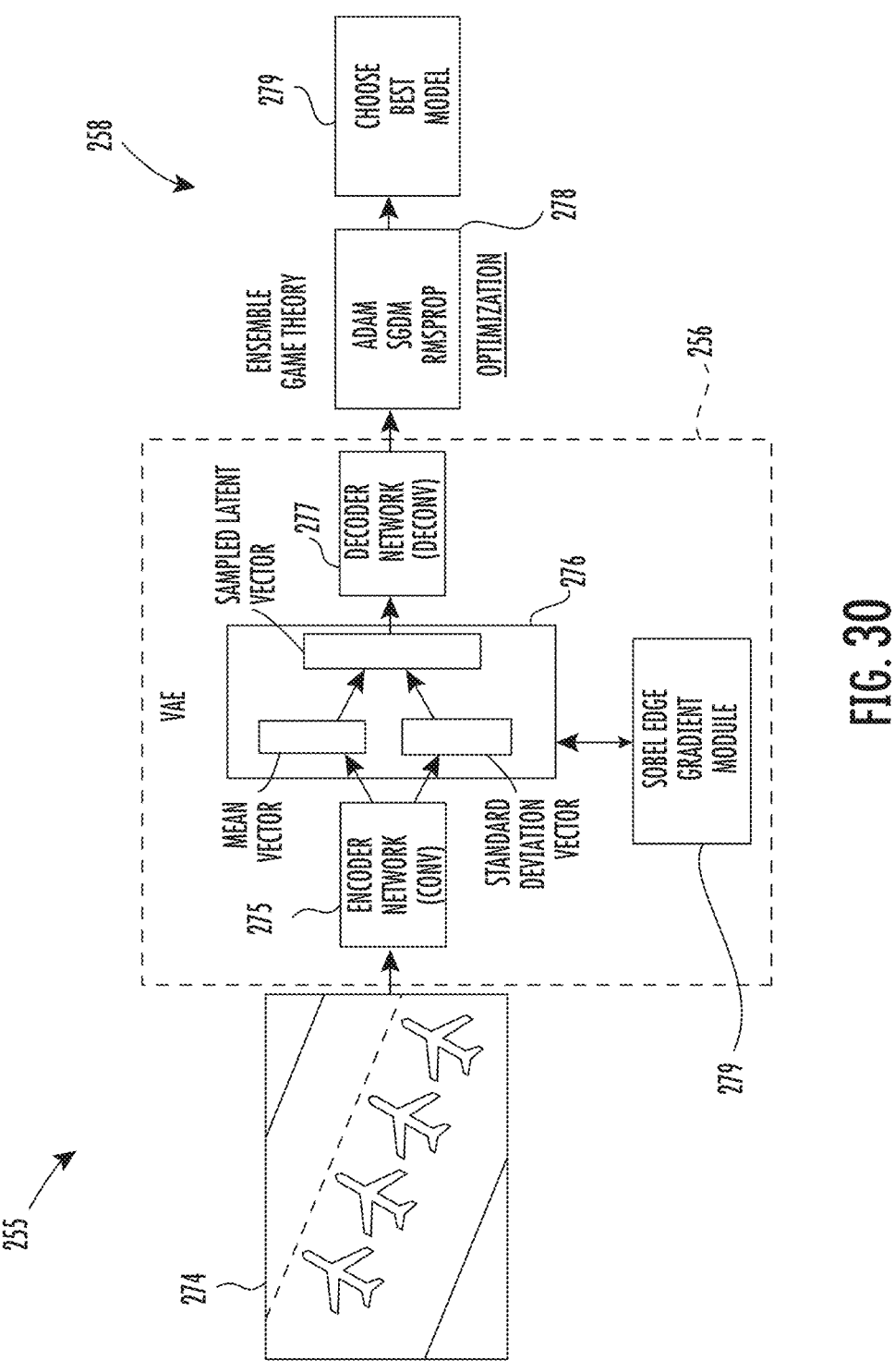
FIG. 30 is a schematic block diagram of an example implementation of the object detection device of FIG. 25.
Figure 31:
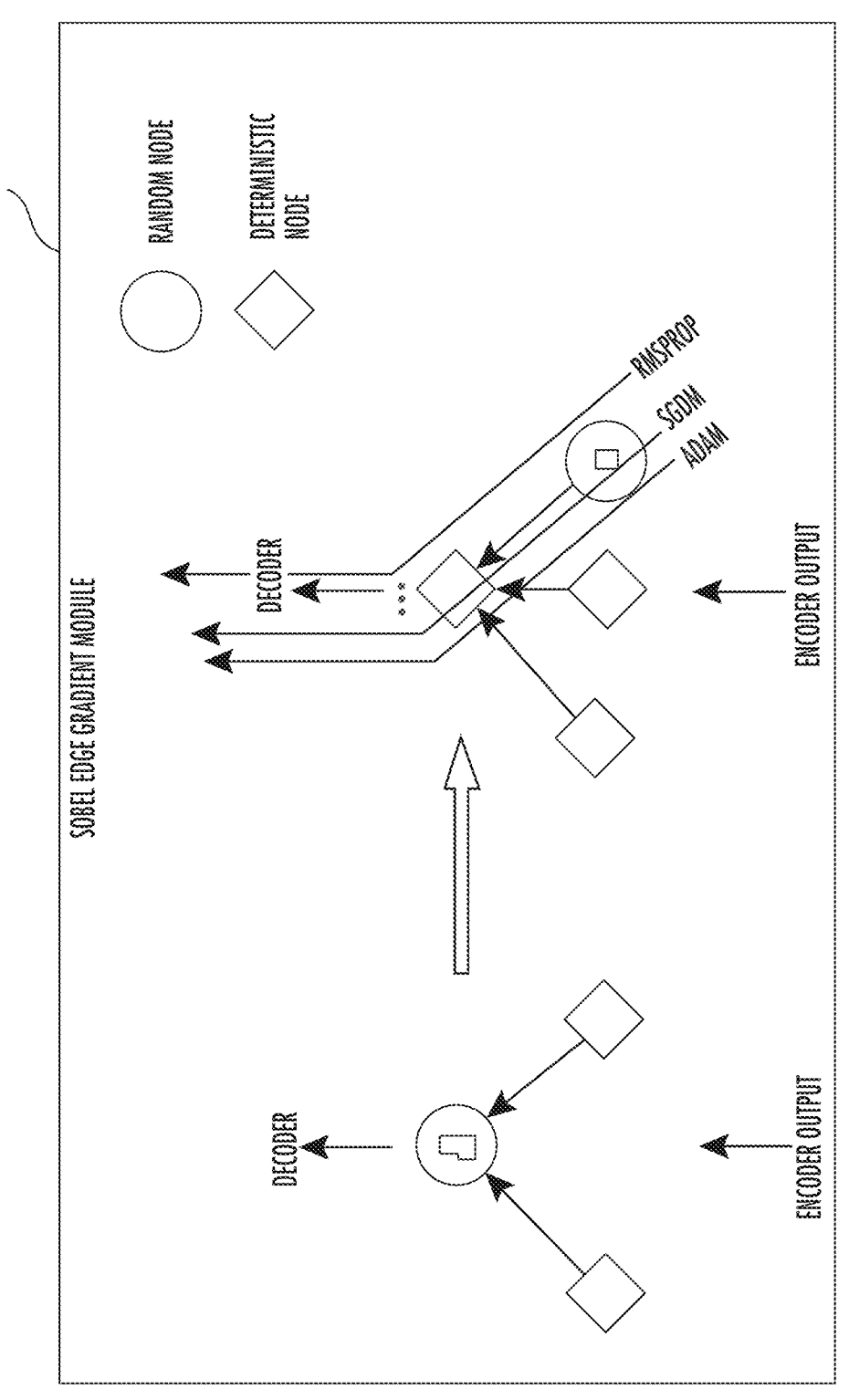
FIG. 31 is an example Sobel edge gradient module which may be used with the change detection device of FIG. 30.

Referring additionally to FIGS. 30 and 31, an example implementation of the object detection device 255 is now described. The VAE 256 illustratively includes an encoder 275 which learns to compress an input image(s) 274 into an encoded representation of a normal distribution in latent space provided by a neural network 276 (e.g., a convolutional neural network, CNN). A decoder 277 learns to reconstruct the original data from the encoded representation to be as close to the original input as possible. The latent space is the layer that contains the compressed representation of the input data.

The VAE 256 differs from regular autoencoders in that it does not use the encoding-decoding process simply to reconstruct an input. Instead, the VAE 256 imposes a probability distribution on the latent space and learns the distribution so that the distribution of the outputs from the decoder 277 matches that of the observed data. The VAE 256 assumes that the source data has some sort of underlying probability distribution (such as Gaussian) and then attempts to find the parameters of the distribution.

The object detection device 255 advantageously provides an effective way to generate synthetic data for training machine learning (ML) applications, such as image change detection. In particular, this may be done while maintaining the underlying statistical properties of the original dataset, it may be applicable to sensitive datasets where traditional data masking falls short of protecting the data, and it may provide faster methods of generating synthetic training data for ML applications.

By way of background, a VAE is a generative system and serves a similar purpose as a GAN. One main use of a VAE is to generate new data that is related to the original source data by sampling from the learned distribution. Utilizing the learned distribution provides a way of generating synthetic data that is reflective of naturally occurring variations, rather than simply replicating existing data samples. This new synthetic data may be utilized for additional training and testing analysis. Moreover, a VAE may be considered a generative model which may randomly generate new samples based on the learned distribution. However, unlike traditional generative models that require strong assumptions regarding data structures and long inference times, a VAE makes weak assumptions of the data which also leads to faster training.

The VAE 265 forces input images onto an n-dimensional probability distribution (e.g., a 20-dimensional Gaussian in the present example), learns the associated parameters (e.g., the means and variances for a Gaussian distribution), and describes the data seen on image pixels with the resulting distribution. Synthetic data samples may be randomly generated from a probability distribution in latent space once the associated parameter value vectors are calculated.

The object detection device 255 may utilize a two-step process to generate synthetic data samples by (1) using the VAE 256 to learn the statistical properties of the original dataset(s) sampled from the Operational Design Domain (ODD); and (2) using the processor 258 as an optimizer for sampling the learned distribution and applying algorithmic transformations (e.g., rotations, reflections and attenuation) that enable building of richer datasets to support the ML model verification and validation (V&V) process. More particularly, this approach provides an enhanced VAE-based process flow to learn the distribution and associated statistical properties of the original dataset (ideally the distribution of data in the ODD). Input data is provided, which in the present example includes a geospatial image 274.

The image data 274 can represent any aspect or aspects of one or more devices and/or processes of a distributed system of interest. In the example of geospatial imagery, the data may take the form of a voxel representation including a descriptor stack of parameters such as pixel intensity, collection parameters, visibility, occlusion, solar angle, time existence, persistence, etc.

The VAE 256 further illustratively includes an optional image gradient Sobel edge detector 279 (see FIG. 31), which is used for pre-processing. This helps the deep learning CNN models to learn more quickly and with more accuracy. The encoder 275 forces the input data (images 274) onto the multidimensional probability distribution. In accordance with one example implementation, a 20-dimensional Gaussian distribution may be used, although other distributions and dimensions may be utilized in different embodiments. The VAE 256 learns the means and variances of the data, and the resulting distribution describes the data.

The encoder 275 generates a compressed representation of the input data utilizing various weights and biases. Weights are the parameters within the neural network 276 that transform input data within the network's hidden layers. Generally speaking, the neural network 276 is made up of a series of nodes. Within each node is a set of inputs, weight, and a bias value. As an input enters the node, it gets multiplied by a weight value, and the resulting output is either observed or passed to the next layer in the neural network 276. The weights of the neural network 276 may be included within the hidden layers of the network. Within the neural network 276, an input layer may take the input signals and pass them to the next layer. Next, the neural network 276 includes a series of hidden layers which apply transformations to the input data. It is within the nodes of the hidden layers that the weights are applied. For example, a single node may take the input data and multiply it by an assigned weight value, then add a bias before passing the data to the next layer. The final layer of the neural network 276 is known as the output layer. The output layer often tunes the inputs from the hidden layers to produce the desired numbers in a specified range.

Weights and bias values are both learnable parameters inside the neural network 276. The neural network 276 may randomize both the weight and bias values before learning initially begins. As training continues, both parameters may be adjusted toward the desired values and the correct output. The two parameters differ in the extent of their influence upon the input data. At its simplest, bias represents how far off the predictions are from their intended value. Biases make up the difference between the function's output and its intended output. A low bias suggests that the neural network 276 is making more assumptions about the form of the output, whereas a high bias value makes less assumptions about the form of the output. Weights, on the other hand, can be thought of as the strength of the connection. Weight affects the amount of influence a change in the input will have upon the output. A low weight value will have no change on the input, and alternatively a larger weight value will more significantly change the output.

The compressed representation of the input data is called the hidden vector. The mean and variance from the hidden vector are sampled and learned by the neural network 276. Principal component analysis (PCA) of the hidden vector allows for the visualization of n-dimensional point clusters, e.g., 3-D point clusters, in latent space. To make calculations more numerically stable, the range of possible values may be increased by making the network learn from the logarithm of the variances. Two vectors may be defined: one for the means, and one for the logarithm of the variances. Then, these two vectors may be used to create the distribution from which to sample.

More particularly, the neural network 276 takes mean and the variance encodings generated after passing the test images through the encoder network 275 and performs PCA on the matrix containing the encodings for each of the images. Furthermore, the neural network 276 visualizes the latent space defined by the means and the variances in the three dimensions characterized by the three first principal components, and initializes new encodings sampled from a normal distribution and outputs the images generated when these encodings pass through the decoder network 277.

The decoder 277 generates synthetic output data. The processor 258 functions as an optimizer which uses an ensemble of solvers 278 with a game theoretic implementation to create an output image with the least image reconstruction error. In the illustrated example, the processor 258 further includes a selection module 279 to choose the best model from the outputs of the ensemble of solvers 278.

More particularly, the selection module 279 may compute a gradient of loss function from the synthetic output data, and pick the best update based upon the ensemble of solvers 279. More particularly, the optimization process may be iterated via reparameterization to handle sampling of the hidden vector during backpropagation (an algorithm for training neural networks). In the illustrated example, the ensemble of models 278 is generated using the three different solvers, namely an Adaptive Moment Estimation (ADAM) solver, a Stochastic Gradient Descent with Momentum (SGDM) solver, and a Root Mean Squared Propagation (RMSProp) solver, although different solvers tion, and Kullback-Leibler or KL loss) may be used in a game theoretic implementation to determine the optimal model to use per test sample. The loss is used to compute the gradients of the solvers.

In an example implementation, the VAE 256 may implement a loss step, in which it passes the encoding generated by the sampling step through the decoder network 277 and determines the loss, which is then used to compute the gradients. The loss in VAEs, also called the evidence lower bound (ELBO) loss, is defined as a sum of two separate loss terms: reconstruction loss+Kullback-Leibler (KL) loss or divergence. More particularly, reconstruction loss measures how close the decoder output is to the original input by using the mean-squared error (MSE). KL divergence measures the difference between two probability distributions. Minimizing the KL loss in this case means ensuring that the learned means and variances are as close as possible to those of the target (normal) distribution. The practical effect of including the KL loss term is to pack clusters learned due to reconstruction loss tightly around the center of the latent space, forming a continuous space from which to sample.

Example code for the encoder network 275 may be as follows:

```
encoderLG = layerGraph([

● imageInputLayer(imageSize,'Name','input_encoder','Normalization','none')
● convolution2dLayer(3,4,'Padding','same','Name','conv_1')
● batchNormalizationLayer('Name','BN_1')
● reluLayer('Name','relu_1')
● maxPooling2dLayer(1,'Stride',1, 'Name','max1')
● convolution2dLayer(3,8,'Padding','same','Stride',2, 'Name','conv_2')
● batchNormalizationLayer('Name','BN_2')
● reluLayer('Name','relu_2')
● maxPooling2dLayer(1,'Stride', 1, 'Name','max2')
● convolution2dLayer(3,16,'Padding','same','Stride',2,'Name','conv_3')
● batchNormalizationLayer('Name','BN_3')
● reluLayer('Name','relu_3')
● maxPooling2dLayer(1,'Stride', 1, 'Name','max3')
● convolution2dLayer(3,32,'Padding','same','Stride',2,'Name','conv_4')
● batchNormalizationLayer('Name','BN_4')
● reluLayer('Name','relu_4')
● maxPooling2dLayer(1,'Stride', 1, 'Name','max4')
● convolution2dLayer(3,64,'Padding','same','Stride',2,'Name','conv_5')
● batchNormalizationLayer('Name','BN_5')
● reluLayer('Name','relu_5')
● maxPooling2dLayer(1,'Stride', 1, 'Name','max5')
● convolution2dLayer(3,128,'Padding','same','Stride',2,'Name','conv_6')
● batchNormalizationLayer('Name','BN_6')
● reluLayer('Name','relu_6')
● fullyConnectedLayer(2*latentDim,'Name','fc')]);
``` may be used in different embodiments. The values from the loss function (evidence lower bound or ELBO, reconstruc- Furthermore, code for the decoder network 277 may be as follows:

```
decoderLG = layerGraph([ imageInputLayer([1 1 latentDim],'Name','i','Normalization','none')
transposedConv2dLayer(3, 64, 'Cropping', 'same', 'Stride', 2, 'Name', 'transpose1')
reluLayer('Name','relu1')
transposedConv2dLayer(3, 32, 'Cropping', 'same', 'Stride', 2, 'Name', 'transpose2')
reluLayer('Name','relu2')
transposedConv2dLayer(3, 16, 'Cropping', 'same', 'Stride', 2, 'Name', 'transpose3')
reluLayer('Name','relu3')
transposedConv2dLayer(3, 8, 'Cropping', 'same', 'Stride', 2, 'Name', 'transpose4')
reluLayer('Name','relu4')
transposedConv2dLayer(3, 4, 'Cropping', 'same', 'Stride', 2, 'Name', 'transpose5')
reluLayer('Name','relu5')
transposedConv2dLayer(3, 2, 'Cropping', 'same', 'Stride', 2, 'Name', 'transpose6')
```

-continued

--- decoderLG = layerGraph([

--- reluLayer('Name','relu6')
transposedConv2dLayer(3, 1, 'Cropping', 'same', 'Stride', 2, 'Name', 'transpose7')
]);

---

The processor 258 creates a reward matrix, with pixel values and different solvers. The reward matrix may be an M×C matrix, where M is the number of models in the ensemble and C is the number of classes. In the example implementation, one model is used for each solver, for a total of three models, namely ADAM, SGDM, and RMSProp. The processor 258 solves the matrix for each pixel and the reward matrix uses reconstruction and KL loss scores, or responses based on number of pixel values to determine a goodness of fit. Scores in a linear program may be used to optimally choose which deep learning model to use per pixel. The matrix is constructed and solved with a linear program such as an interior-point algorithm, e.g., the primal-dual method, which may be feasible for convergence. A primal standard form may be used to calculate optimal tasks and characteristics as follows:

$$\text{maximize } f(x) \text{ s.t.}$$
$$Ax \le b$$
$$x \ge 0$$

One technical advantage of the above-noted configuration is that, because VAEs compare the reconstructed inputs against the inputs and not against the categorical labels, it is not necessary to use the training labels in the data set. To make calculations more numerically stable, the object detection device 255 may increase the range of possible values by making the network learn from the logarithm of the variances. Two vectors may be defined: one for the means and one for the logarithm of the variances. These two vectors may then be used to create the distribution to sample from.

Another technical advantage of the above-described quantum computing-based decision making platform is that quantum subset summing computing a reward matrix is highly advantageous to the near real-time requirements of object detection. More particularly, this allows a particular problem set that would typically not be possible (running numerous simulations and being able to determine which is the best) to instead offload that optimization to a quantum computing circuit 257 that can quickly solve it and return this information in near real-time to make the best decision. Since training machine learning models is a process that takes a relatively long time to complete, any time savings during the decision tree is a significant technical advantage. Quantum subset summing is well suited for optimizing the best decision from a reward matrix in this tree.

A related object detection method is now described with reference to the flow diagram 320 of FIG. 32. The method begins (Block 321) with encoding image data to generate a latent vector, and decoding the latent vector to generate new image data, using the VAE 256, at Block 322. The method further illustratively includes generating a game theory reward matrix for a plurality of different deep learning models using the processor 258, at Block 323, and performing quantum subset summing of the game theory reward matrix using the quantum computing circuit 257, at Block 324. The method also illustratively includes selecting a deep learning model from the plurality thereof based upon the quantum subset summing of the game theory reward matrix using the processor 258, at Block 325, and processing the new image data with the processor using the selected deep learning model for object detection, at Block 326. The method of FIG. 32 illustratively concludes at Block 327.

Turning now to FIG. 33, a radio frequency (RF) signal classification device 335 which utilizes quantum computing operations similar to those described above for RF signal classification. More particularly, the RF signal classification device 33 illustratively includes an RF receiver 336 configured to receive RF signals, a quantum computing circuit 337 similar to those discussed above that configured to perform quantum subset summing, and a processor 338. The processor 338 is configured to generate a game theory reward matrix for a plurality of different deep learning models, cooperate with the quantum computing circuit 337 to perform quantum subset summing of the game theory reward matrix, select a deep learning model from the plurality thereof based upon the quantum subset summing of the game theory reward matrix, and process the RF signals using the selected deep learning model for RF signal classification.

More particularly, the RF signal classification device 335 utilizes quantum computing for an optimization approach for deep learning signal modulation classification to provide a cognitive system for recognizing and classifying radio signals by modulation type at various signal-to-noise ratios (SNRs). The QC circuit 337 performs quantum subset summing on the reward matrix to choose which deep learning model is optimal. The rows in the reward matrix correspond to the models from which to rapidly make the decision. The columns correspond to the predictive deep learning metrics for each observation. A 3D latent space is constructed for the optimal model, and for each modulation class (real and adversarial) a cluster of eigenvalues may be generated from the optimal model. Quantum computing is used to simultaneously construct a Z-test for an observation for each modulation class cluster, and a P-value for each Z-test is calculated so that a max P-value may be determined to decide a target signal class.

By way of background, various approaches are typically used for RF signal classification. Generally speaking, these involve some form of system training and testing, which uses an extensive dataset including digital and analog modulations. In a supervised gradient learning approach, models are trained to recognize features of various modulation types by using different supervised gradient-learning algorithms (e.g., ResNet-based classification). Another example approach uses a learned feature set, which when applied to unseen signals models an estimated modulation type based on a learned feature set. An example of a learned feature set approach is a classifier network trained on a vector of scalar statistical signal processing metrics/scores. Still another approach is a linear programming optimization, which may be used to determine the best model from small ensemble of trained models. An example of this approach is a modulation classification via game-theoretic ensembling of ResNets.

With regard to network robustness, classifier robustness involves maintaining/preserving classification performance against input samples with small variability/perturbation from training set. For example, this may include robustness to natural variability of input samples, as well as adversarial deception. In some instances, a training set may be augmented by increasing the size of the training dataset to incorporate perturbed samples that cause errors. Distillation techniques are used to train secondary network(s) from soft labels generated by the original network. The distillation temperature is an offline analysis which may help determine optimal temperature for distillation techniques.

Figure 34:
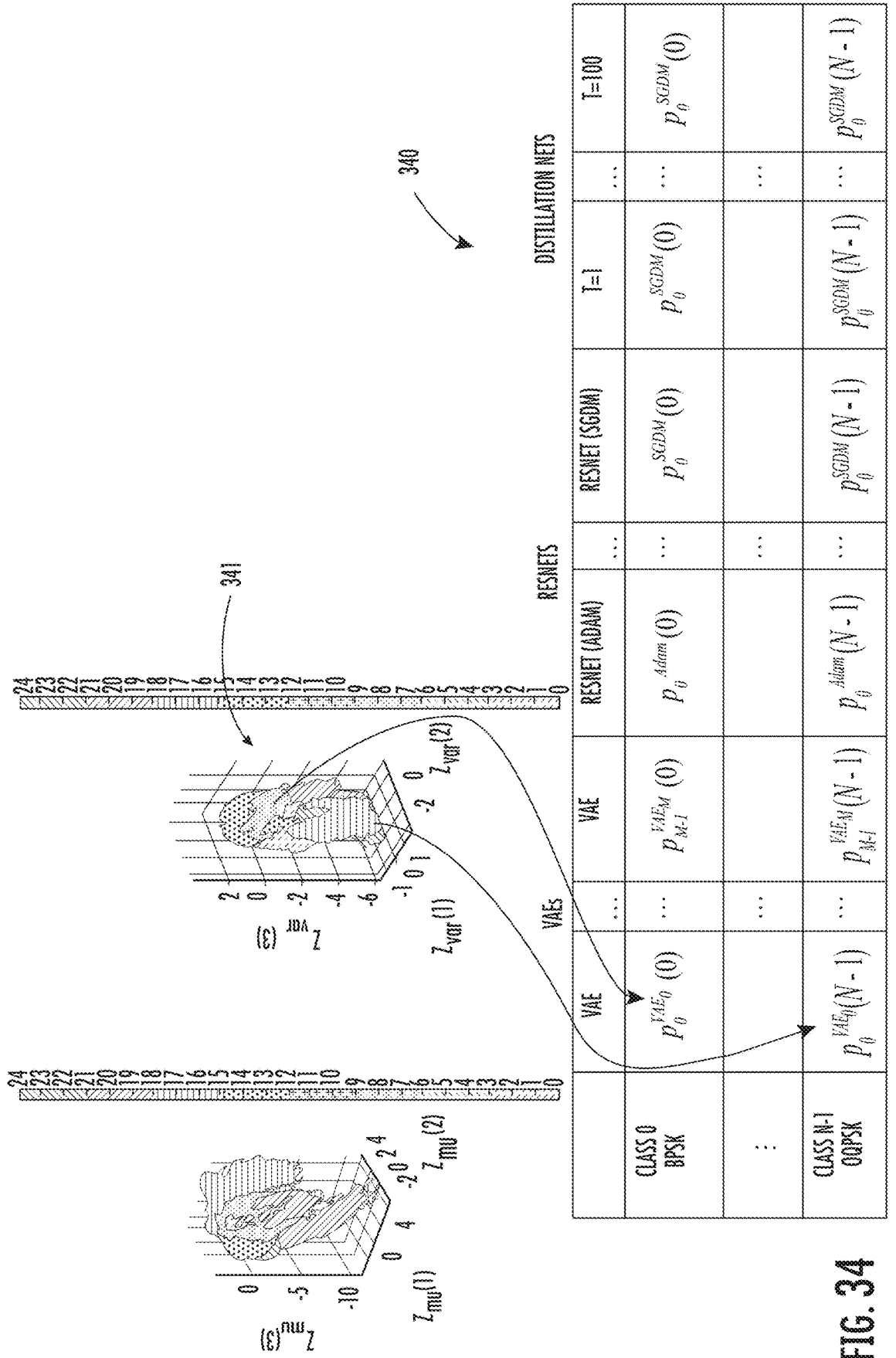
FIG. 34 is graph of Z-score clusters and associated reward matrix table in accordance with an example implementation.

The RF signal classification device 335 advantageously provides data fusion for robust signal classification with optimal game-theoretic decision making. More particularly, the RF signal classification device 33 fuses heterogeneous metrics for signal classification into reward matrix quantum linear programming with subset summing over large reward matrix, as discussed above. In an example embodiment, the decisions are defined by rows of reward matrix signal classes, and columns of the reward matrix are populated with classification probabilities from multiple algorithms. An example reward matrix 340 is shown in FIG. 34. Here, the algorithms represented in the columns include VAE cluster Z-scores, ResNet modulation/waveform classification, and distilled modulation/waveform classification networks with varying distillation temperatures, although other algorithms may be used in different embodiments. The RF signal classification device 335 further advantageously performs quantum linear programming with subset summing to yield optimal mixed strategy for signal classification.

RF signal classification device 335 generates the reward matrix by assigning "decisions", in that it "decides" that observed signal belongs to one of N classes. Moreover, it outputs soft decisions as probability values, e.g., CogEW ResNet outputs 24×1 vector of probabilities for each modulation class. In this example, one row may be added to the reward matrix 340 for each output class.

The present approach advantageously fuses heterogeneous classifiers by adding a new column for each vector of output class probabilities. These may include deep neural network classifiers, e.g., modulation classifier ResNet (CogEW) with twenty-four modulation classes=>twenty four output probabilities. Moreover, it may produce one new vector for each model trained by a different optimizer, e.g., ADAM, SGDM, RMSProp, etc. Moreover, a VAE may be utilized to form clusters of Z-scores inside VAE latent space for each signal class, and the measured Z-scores transformed for inclusion in each cluster to vector of probabilities, as illustrated in FIG. 34.

With respect to distillation networks, an original classifier (e.g., ResNet) may be trained on one-hot labels. Furthermore, a separate network(s) may be trained using soft (probabilistic) outputs of the original network. The "distillation temperature" may be varied to control extraction of information from probabilistic outputs, and flatten/sharpen the probability distribution. The output from numerous networks trained over a wide range of distillation temperatures are fused together in the reward matrix 340, and there may be no need for offline analysis of optimal temperatures for differing scenarios. This approach may also be used to fuse a wide range of temperatures.

The quantum circuit 337 may be similar to those described further above. Several observations may be tested to see which specific cluster a signal belongs to. In one example implementation, Fisher's Least Significant Difference (or Fisher's LSD) method may be used, in which pairwise t-tests are used to determine a test observation feature classification membership for each feature cluster in a 3D latent space of eigenvalues of a variational auto-encoder. If there are twenty-four different clusters to check then there are 24*23/2=276 pairs to check iteratively. This makes quantum computing an attractive alternative for this application.

The quantum circuit 337 performs quantum linear programming with subset summing on the reward matrix 340 to yield a mixed strategy output. This includes output vector of probabilities, and gives optimal probability for classifying input samples to each of the N available classes. Because processing is done by the quantum circuit 337, the reward matrix 340 may be large, e.g., with a modulation classifier ≥24 modulation classes (rows of matrix). Moreover, the number of columns may be equal to the number of different classifier algorithms, and multiple neural networks may be trained with different optimizers. The distillation networks may be small relative to the main classifier, and numerous small networks may be trained and fused over a wide range of "temperatures". Each column of the reward matrix 340 may equate to a constraint in the optimization problem. More particularly, subset summing will consider possibilities in which poor constraints are eliminated. For p columns, the linear program is solved $2^P-1$ times. The quantum computing circuit 337 may also iterate over $2^r-1$ iterations, where r=number of rows. The quantum computing circuit 337 advantageously circumvents an exponential scaling number of iterations by evaluating all column combinations in superposition, and is well suited for real-time applications of RF signal classification.

The RF signal classification device 335 provides a number of technical advantages. More particularly, it provides enhanced signal classification using different supervised learning algorithms, taking the best of the best per observation. Moreover, the incorporation of game theory and quantum computing allows for rapid decisions as to which machine learning model is optimal to use per observation. Furthermore, enhanced signal classification may be performed using multiple LSTM and CNN channels, and it provides an approach for optimally determining new signals by modulation classification from an ensemble of models.

In addition, the quantum computing circuit 337 enables a significant increase in speed for subset summing. The subset summing is supported by quantum adders and comparator circuits, and noted above, and quantum algorithms may be used for the game theory implementation. The RF signal classification device 335 allows for ease of integration of quantum game theory concepts (different from classical game theory) in a quantum computing/algorithm-based decision-making platform.

Furthermore, quantum subset summing computing a reward matrix is highly advantageous to the near real-time requirements of RF signal classification. It allows a particular problem set that would typically not be possible (running that many simulations and be able to decide what is the best) to instead offload that optimization to a quantum computer that can quickly solve it and return this information back in near real-time to make the best decision. Since training machine learning models is already a process that takes a long time to complete, any time savings during the decision tree is highly important. Quantum subset summing is well suited for optimizing the best decision from a reward matrix in this tree.

Figure 35:
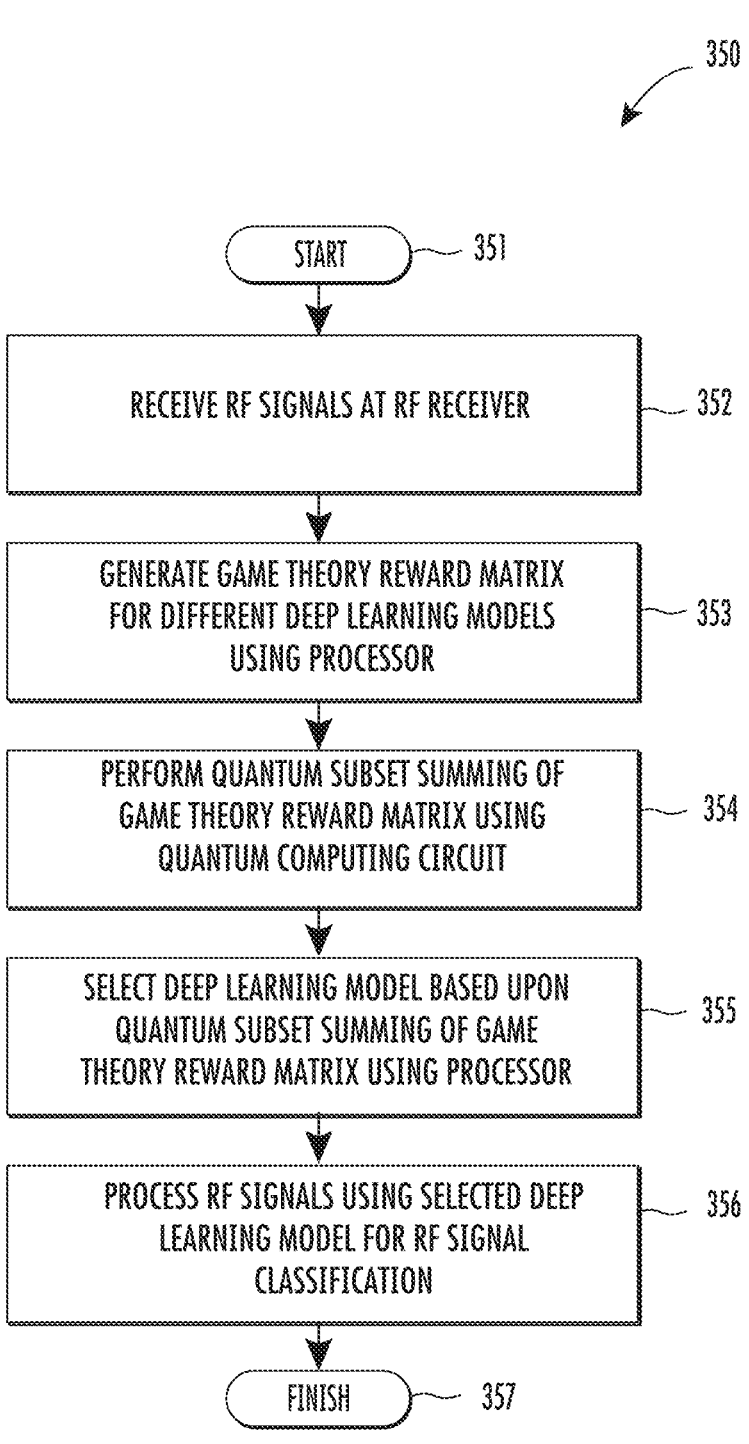
FIG. 35 is a flow diagram illustrating example method aspects associated with the RF signal classification device of FIG. 33.

A related RF signal classification method is now described with reference to the flow diagram 350 of FIG. 35. The method begins (Block 351) with receiving RF signals at the RF receiver 336, at Block 352, and using the processor 338 to generate a game theory reward matrix for a plurality of different deep learning models, at Block 353. The processor further cooperates with the quantum computing circuit 337 to perform quantum subset summing of the game theory reward matrix, at Block 354, select a deep learning model from the plurality thereof based upon the quantum subset summing of the game theory reward matrix (Block 355), and processes the RF signals using the selected deep learning model for RF signal classification, at Block 356. The method of FIG. 35 illustratively concludes at Block 357.

Turning now to FIG. 36, a perturbation RF signal generator 365 is provided which utilizes the above-described quantum computing techniques to generate a perturbed RF output signal to cause a signal classification change by an RF signal classifier. The perturbation RF signal generator 365 illustratively includes a quantum computing circuit 367 configured to perform quantum subset summing, and RF receiver 366, and a processor 368. The processor 368 may be configured to generate a game theory reward matrix for a plurality of different deep learning signal perturbation models, cooperate with the quantum computing circuit 367 to perform quantum subset summing of the game theory reward matrix, select a deep learning signal perturbation model from the plurality thereof based upon the quantum subset summing of the game theory reward matrix, and generate the perturbed RF output signal based upon the selected deep learning signal perturbation model to cause the signal classification change in the RF signal classifier, as will be discussed further below.

The perturbation RF signal generator 365 advantageously applies a quantum algorithm approach for applications such as optimal adversarial signal deception attack prevention. The above-described quantum subset summing is used on the reward matrix to choose which deep learning model is optimal. The rows in the reward matrix correspond to the models from which to rapidly make the decision. The columns correspond to the predictive deep learning metrics for each observation. A 3D latent space may be constructed for the optimal model. For each modulation class (real and adversarial), a cluster of eigenvalues may be generated from the optimal model. Quantum computing may be used to simultaneously construct a P-value for each Z-test and choose the max P-value to decide the target class.

By way of background, supervised learning-enabled artificial intelligence (AI)/machine learning (ML) classifiers are typically only trained to discriminate between inputs belonging to different classes, dependent on the quantity and quality of the training data that is provided. Once deployed, in-situ input signals may exhibit slight variations not represented by the training/validation data, either due to natural variability in the subject or due to intentional adversarial deception. Generating new training samples in the field may be practically infeasible, and synthetic generation with established models may not account for examples to which the classifier is vulnerable. However, the perturbation RF signal generator 365 advantageously provides a technical approach by perturbing available signals which attack classifier vulnerabilities via game theory-enhanced techniques of adversarial deception. Large volumes of perturbed signals may be quickly generated to test full classifier robustness through quantum neural network processing.

More particularly, the perturbation RF signal generator 365 may be used to probe the robustness of a signal classifier via quantum-enabled adversarial deception, and provide game theoretic-enhanced black box adversarial deception. A quantum neural network implementation is used to target pairwise combinations of Class A=>Target Class B, and analyze the effectiveness of deceiving an AI/ML classifier under test. In an example implementation, the perturbation RF signal generator 365 identifies a signal set from each class to modify via adversarial deception. Next, each signal is perturbed, targeting every other possible target class. The perturbation may be via differently trained quantum neural network models, and a game-theoretic optimal selection of the perturbed waveform is determined. Furthermore, the set of perturbed signals is tested against a classifier, in which performance of classification/mis-classification is recorded with the perturbed dataset, and any vulnerabilities of the AI/ML classifier are determined. In addition, latent space representations related to discovered vulnerabilities may be analyzed, such as with a game-theoretic optimal VAE latent space analysis and explainable AI (XAI). The quantum-enabled adversarial deception approach may thoroughly test robustness of different AI/ML classifiers to provide enhanced security and reliability.

Figure 37:
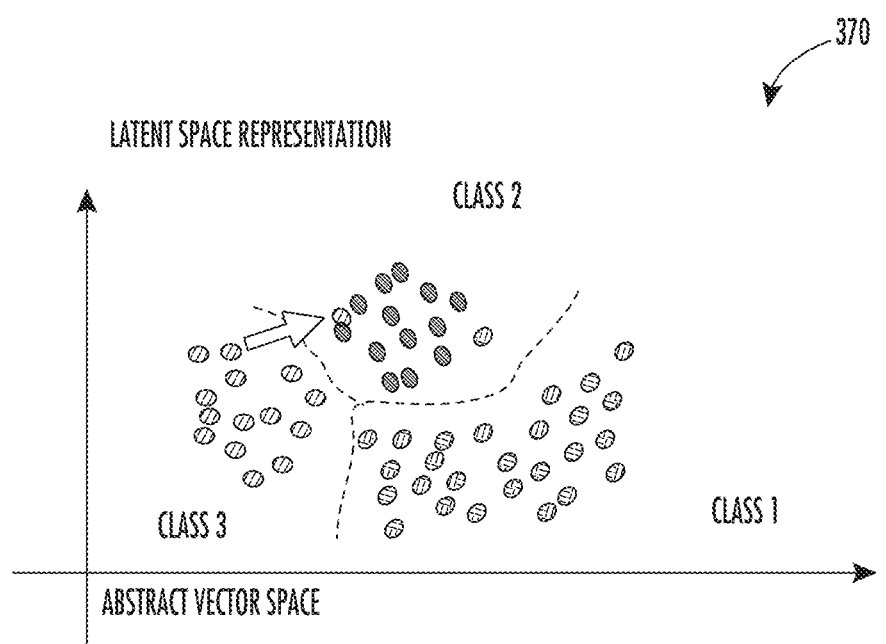
FIG. 37 is a graph of input signal points in latent space illustrating operation of the perturbation RF signal generator in accordance with an example implementation.
Figure 38:
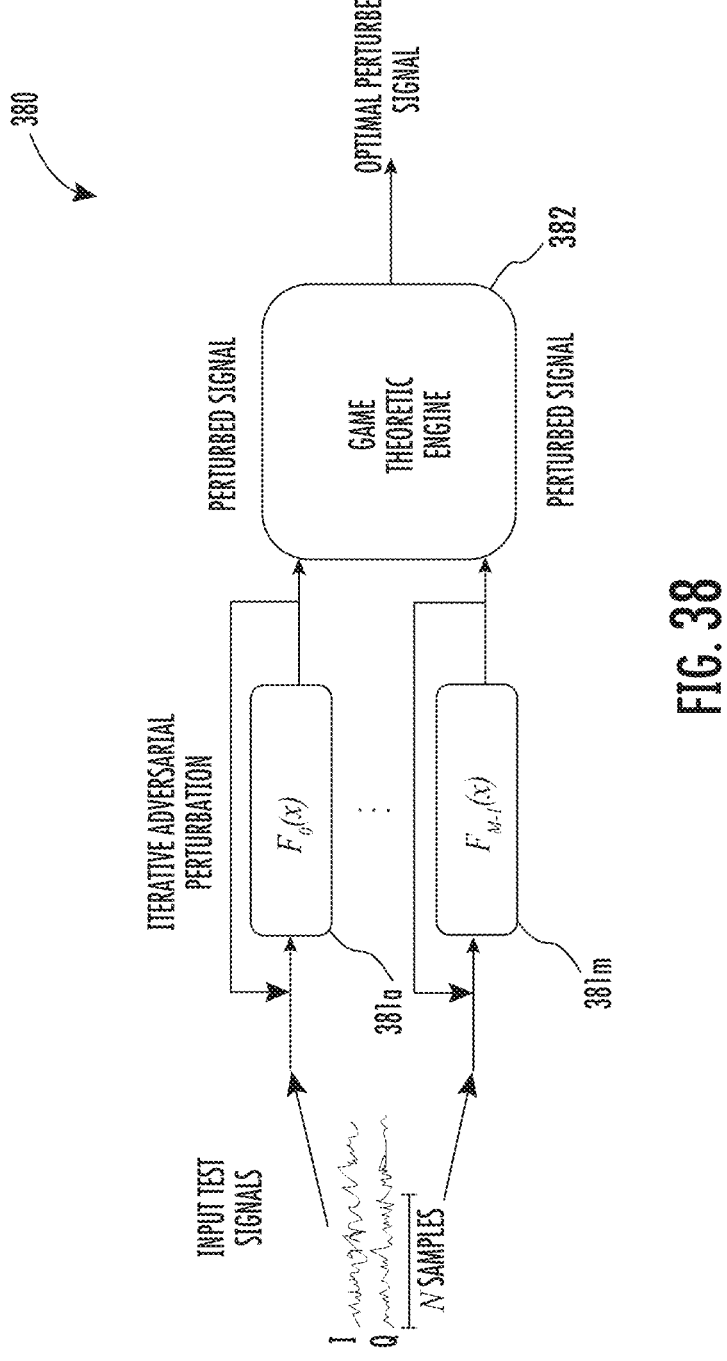
FIG. 38 is a schematic block diagram of quantum neural network which may be implemented in the perturbation RF signal generator of FIG. 36.

Referring additionally to FIGS. 37 and 38, a latent space representation is shown in the graph 370 for a plurality of gradients which quantify the effect that specific input signal features have on classification tasks by iteratively making minor perturbations to an input signal vector weighted by gradients with maximal impact. Example approaches for causing the perturbations include Fast Gradient Sign Method (FGSM), Carlini and Wagner, Jacobian-based Saliency Map Attack, etc. The perturbation RF signal generator 365 attempts to "push" the input signal (inside latent space) across decision boundaries, as illustrated by the arrow in FIG. 37.

Different approaches may be used depending upon whether the source of the adversarial signal is realizable as quantum neural network (a white box) or not (a black box). In a white box attack strategy, the perturbation RF signal generator 365 instantiates the classifier under test as a quantum neural network 380 (FIG. 38), and uses M different perturbation techniques 381a-381m to modify a signal of class A to appear like the target class B. The perturbed signal which first achieves the target confidence level in Class B is selected by a game theoretic engine 382, using the techniques discussed above. In a black box attack strategy, if the classifier under test is not practically realizable as a quantum neural network, then a black box attack strategy is used in which the classifier under test is treated as a black box (also referred to as an "Oracle" herein), and a transfer to a realizable quantum neural network is performed.

Figure 39:
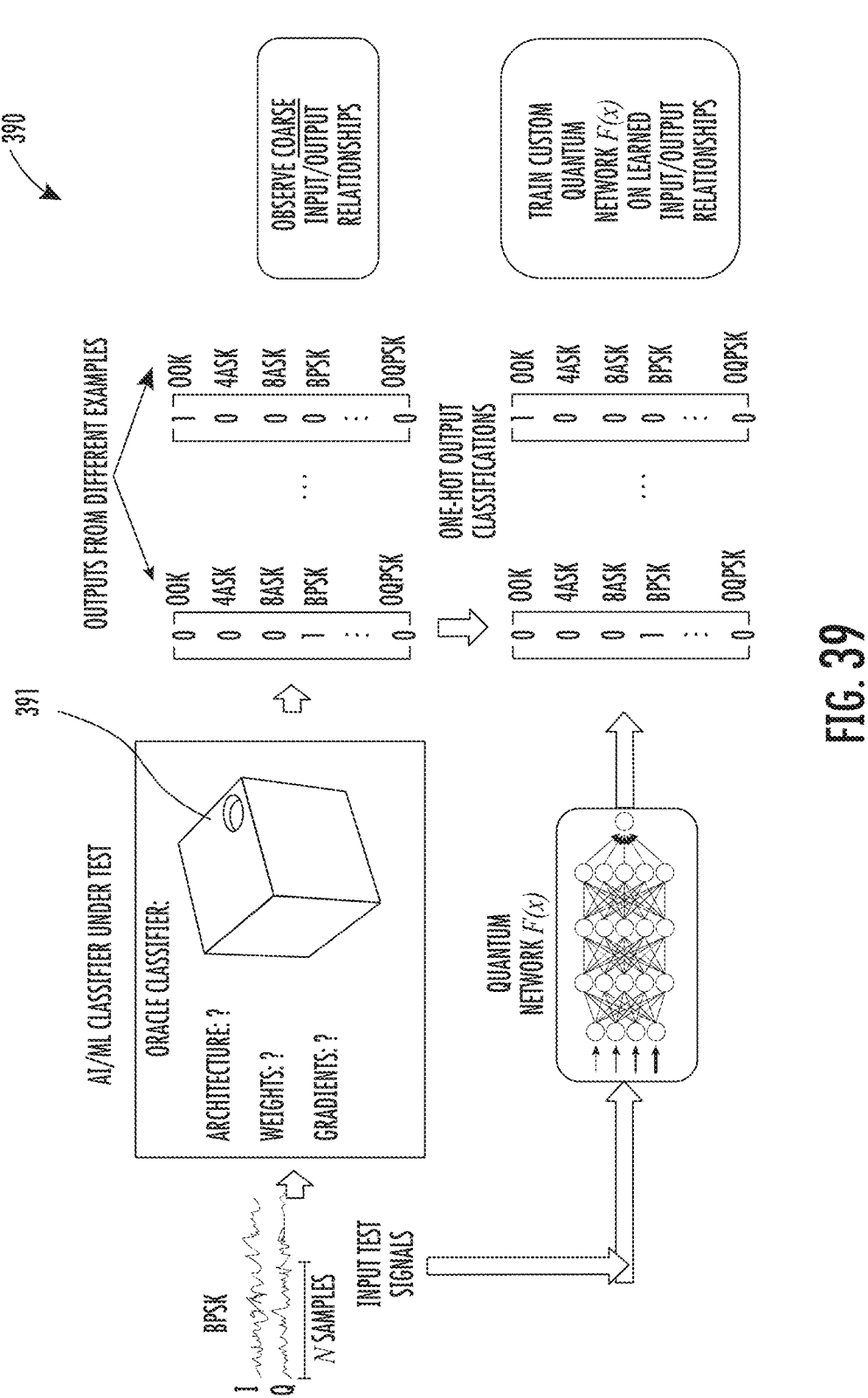
FIG. 39 is a schematic diagram illustrating an example black box modulation classification approach which may be implemented in the perturbation RF signal generator of FIG. 36.

An example modulation classification for the black box approach is shown in the schematic diagram 390 of FIG. 39. With respect to transferability, decision region boundaries transfer from the Oracle 391 to the quantum neural network as shown. The process may begin with the desired signal (I/Q samples) of a given modulation. Next, a target modulation is selected, e.g., want 16 QAM signal to appear like QPSK. The above-noted white-box techniques may first be applied to accentuate input features that are associated with QPSK in the adversarial network. The quantum neural network 380 may generate perturbed signals for all pairwise combinations of the starting class and target class. Ensembling may then be performed, which involves training M multiple custom networks with different optimizers and/or gradient-based attack techniques 381a-381m. An identical architecture may be used for all of the models in the ensemble with similar decision regions, but with different weights/biases applied to each model to account for potentially different-shaped decision regions in the Oracle 391. The results are optimally combined by the game theoretic engine 382 to select the perturbed signal. The results is an improved probability of successfully deceiving the Oracle 391 through a game-theoretic optimal ensemble of networks.

The classifier under test (e.g., Oracle 391) is probed with all of the perturbed signal sets to identify vulnerabilities (e.g., a high deception success rate). This approach provides explainable AI to explore fundamental cause behind vulnerabilities, and to employ visualization techniques to analyze perturbed data versus native data with respect to network decision regions (e.g., t-SNE applied to SoftMax layer). Furthermore, the use of game-theoretic optimal VAEs allows for the analysis of clustering for modified signals versus clustering of native (trained) data, as discussed further above with reference to FIG. 30, for example.

A related method for generating a perturbed RF output signal to cause a signal classification change by an RF signal classifier is now described with reference to the flow diagram 400 of FIG. 40. The method begins (Block 401) with using the processor 368 to generate a game theory reward matrix for a plurality of different deep learning signal perturbation models, at Block 402, and cooperating with the quantum computing circuit 367 to perform quantum subset summing of the game theory reward matrix, at Block 403. The method further illustratively includes selecting a deep learning signal perturbation model 404 from the plurality thereof based upon the quantum subset summing of the game theory reward matrix, at Block 404, and generating the perturbed RF output signal based upon the selected deep learning signal perturbation model to cause the signal classification change in the RF signal classifier, at Block 405, as discussed further above. The method of FIG. 40 illustratively concludes at Block 406.

Figure 41:
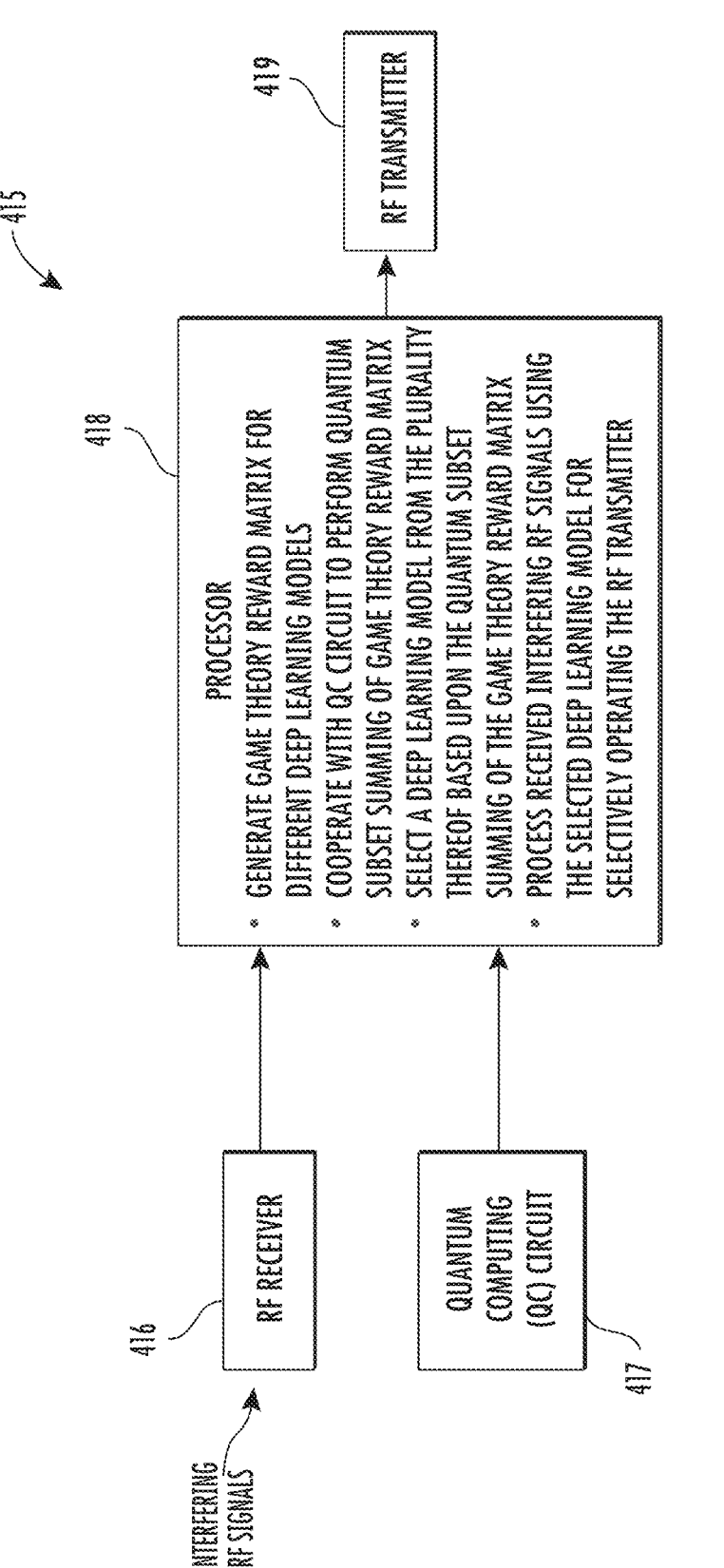
FIG. 41 is a schematic block diagram of a cognitive radio device which incorporates quantum computing techniques in accordance with an example embodiment.

Turning to FIG. 41, a cognitive radio device 415 which incorporates the above-described quantum computing techniques to advantageously provide enhanced operation is now described. The cognitive radio device 415 illustratively includes an RF receiver 416 configured to receive interfering RF signals, an RF transmitter 419 configured to be selectively operated, a quantum computing circuit 417 configured to perform quantum subset summing, and a processor 418. The processor 418 is configured to generate a game theory reward matrix for a plurality of different deep learning models, cooperate with the quantum computing circuit 417 to perform quantum subset summing of the game theory reward matrix, select a deep learning model from the plurality thereof based upon the quantum subset summing of the game theory reward matrix, and process the received interfering RF signals using the selected deep learning model for selectively operating the RF transmitter 419.

More particularly, the cognitive radio device 415 utilizes a quantum algorithm approach for cognitive frequency hopping and hybrid spread signal deep learning optimization. A cognitive, automated approach is used to optimize frequency hopping characteristics, direct spread sequence seeding or direct spread sequence characteristics choices for a transmitter/receiver system, as well as a jammer for a variety of scenarios using a game theoretic engine with quantum computing. The quantum computing circuit 417 may also enable real time channel monitoring to enable the incorporation of time and spatially-varying channel characteristics to be considered in optimization.

As discussed previously above, quantum subset summing is used on a reward matrix to choose which frequency bin, bin width, dwell time, direct sequence chip rate and spreading characteristic is optimal for currently observed conditions of the operating environment and mission requirements. The rows in the reward matrix correspond to the frequency bins operation parameter of the waveform from which to rapidly make the decision. The columns correspond to the predictive deep learning metrics for each model, and the columns in the reward matrix are used to fuse multiple deep learning model inputs.

By way of background, it can be challenging to provide automated decision-making for optimal selection of waveform parameters in cognitive radio applications. This may require avoiding or mitigating adversarial jamming as well as mutual interference from friendly nodes in a network. Furthermore, it may be desirable to optimize resiliency with respect to low probability of detection (LPD) capabilities, as well as optimize resiliency with respect to anti-jamming (AJ) capabilities. Furthermore, there is a need to maximize throughput with evolving channel conditions. Nevertheless, automated decision-making for strategic scenarios is limited by processing constraints based on classical computing approaches with no quantum equivalent approach available for future quantum algorithms.

The cognitive radio device 415 advantageously provides a near real-time robust decision-making platform based on a quantum algorithm approach for data fusion using proven game theory concepts. As a result, the cognitive radio device 415 may provide for resilient LPD and AJ capabilities, as well as the ability to counter evolving jammer capability by developing cognitive LPD techniques. Furthermore, it may also provide for robust AJ analytics and techniques which can increase signal throughput (goodput, Mbps) of the signal.

In cognitive radio applications, there are a number of waveform parameters for selection, including the waveform, data rate, frequency agility, time-space encoding (beamforming, etc.), and routing. In feature-based, expert systems, a rules-based approach is used (e.g., IF this, THEN that), in which predefined adaptive responses are used that may ignore cognitive actions. These also involve signal recognition and network routing. Extensive mission pre-planning (Link16) may be required, as well as human decision making with data from disparate sources. While some approaches use machine learning for signal recognition, this may still be challenging since there may be a very large list of signals/modulations supported across the range of existing systems.

Figure 42:
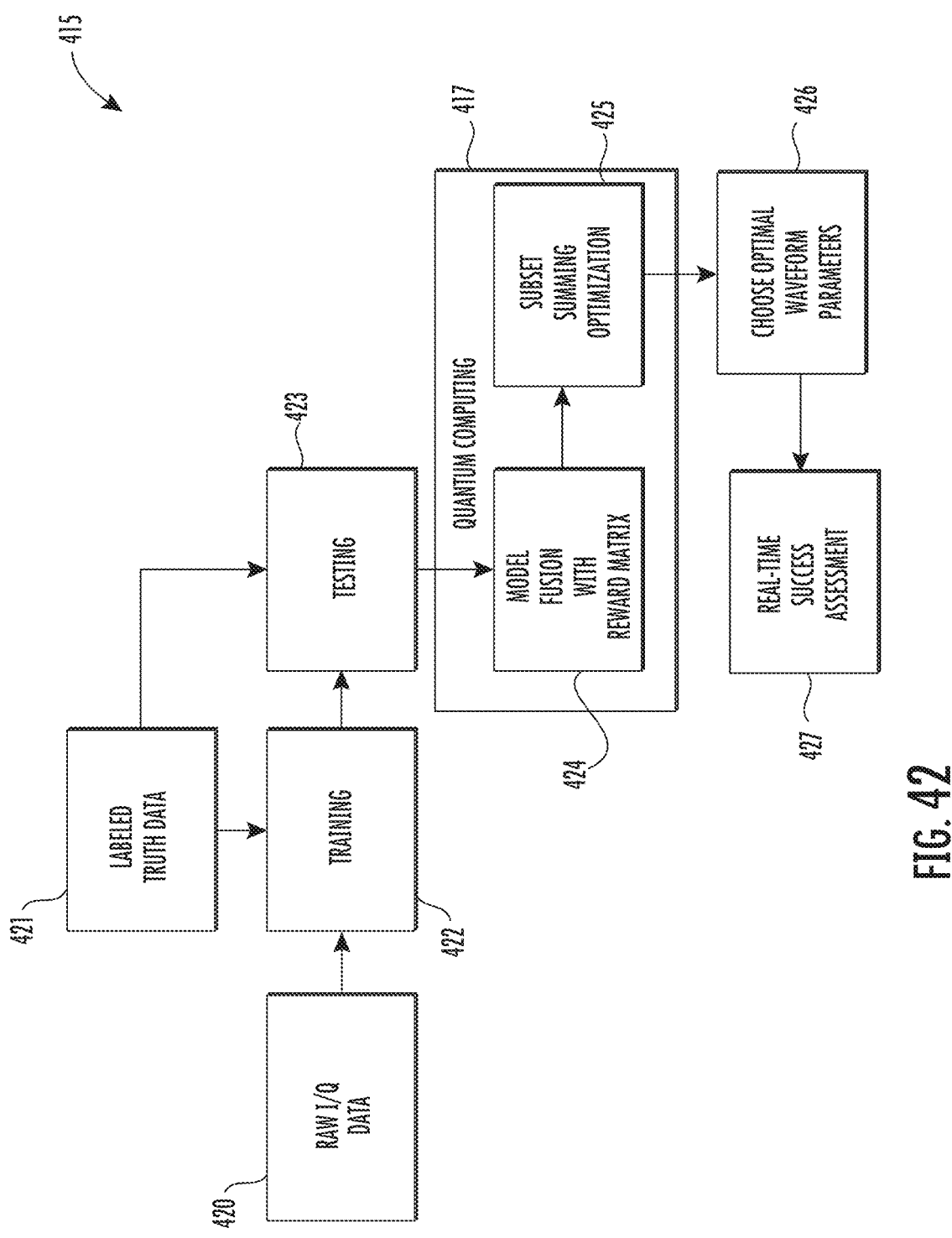
FIG. 42 is a schematic block diagram of an example implementation of the cognitive radio device of FIG. 41.
Figure 43:
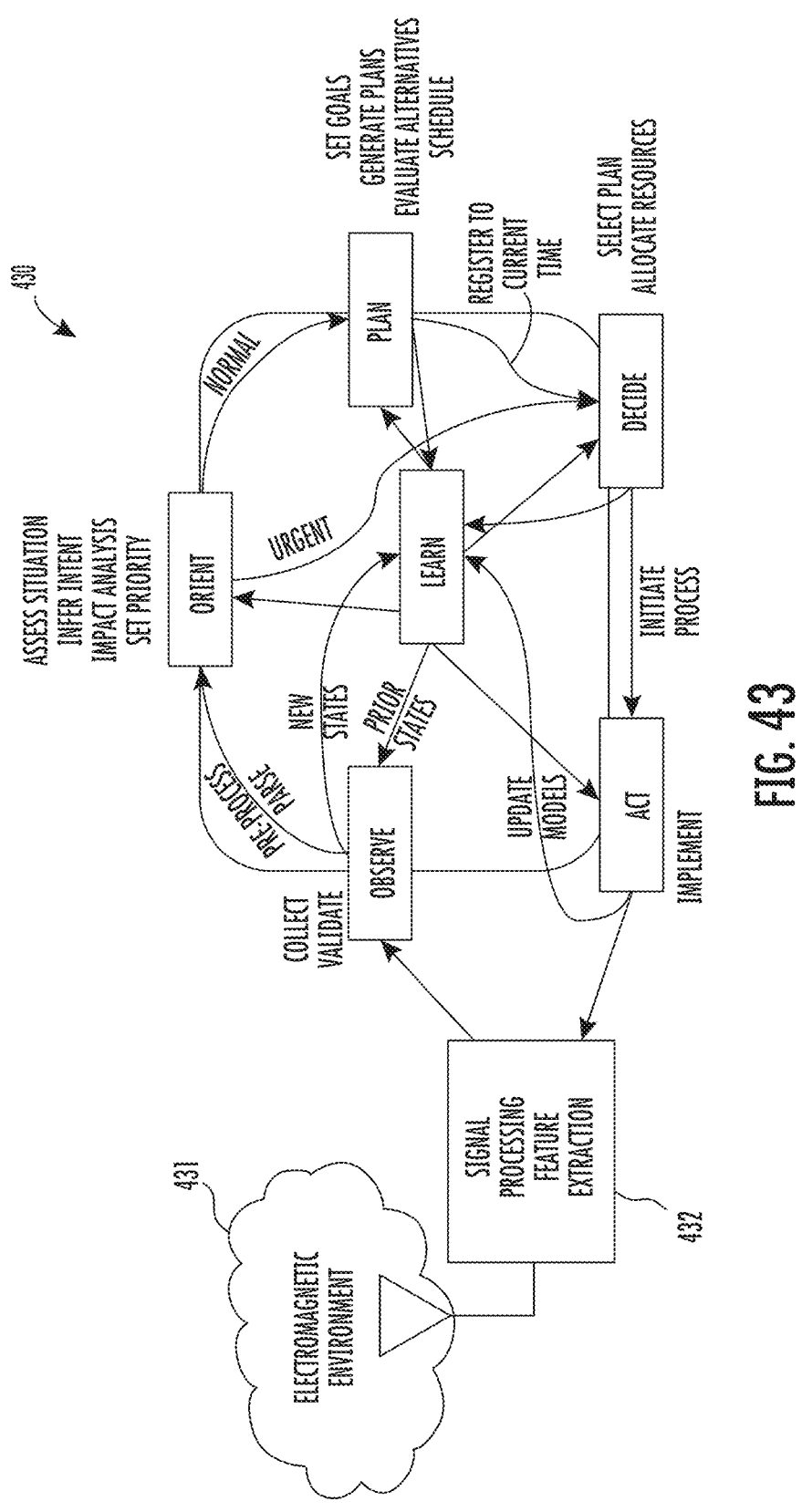
FIG. 43 is a schematic block diagram illustrating Observe, Orient, Plan, Decide, Act, and Learn (OOPDAL) loop processing operations which may be performed by the processor of the system of FIG. 42.

Referring additionally to FIGS. 42-44, an example implementation of the cognitive radio device 415 is now described. The cognitive radio device 415 applies quantum subset summing on a reward matrix 440, and a linear program determines the optimal waveform parameter(s) to select for the next transmission. Rows in reward matrix 440 correspond to the union of changeable waveform parameters, while columns correspond to predictive deep learning metrics for different models. The quantum linear program approximates the solution to the linear program via a quantum linear program. The output of the nodes are fused, and a mixed or pure strategy for waveform parameter selection is returned to rapidly make a selection to counter existing threats.

In the illustrated example, raw I/Q data 420 and labeled truth data features 421 are provided to a GAN training module 422 and a testing module 423, similar to those described above. The output of the testing module 423 is provided to the quantum computing circuit 417, which in the illustrated example performs model fusion with the reward matrix (Block 424) and subset summing optimization (Block 425), The output of the quantum computing circuit 417 is used to determine the optimal waveform parameters (Block 426) and provide a real or near real-time success assessment, at Block 427.

The cognitive radio device 415 may advantageously provide AJ, LPD, and cognitive radio functionality with environmental sensing for minimizing adversarial impact using dynamic cognitive radio techniques. Spectral scene and modem performance are sensed, and actions are planned by constructing a reward matrix then utilizing game theory to take appropriate action. By way of example, the cognitive radio device 415 may advantageously implement an Observe, Orient, Plan, Decide, Act, and Learn (OOPDAL) loop 430 to learn from and react to its electromagnetic environment 431. It should be noted that some of the illustrated processes may be distributed across multiple cognitive radios 415 (also referred to as "nodes") sharing a common objective in some embodiments, and that signal proceeding feature extraction operations 432 may also be distributed (e.g., as in a cloud computing configuration).

In the reward matrix 440, the rows include the union of potential parameter selections, while the columns include a vector of metrics for each parameter choice from a different sensor/feature-extraction algorithm. Such a reward matrix 440 may become extremely large for a cognitive radio application, yet the quantum processing provided by the quantum computing circuit 417 may be used to apply quantum linear program to solve the reward matrix which would otherwise be prohibitively large for conventional computational methods.

In the example illustrated in FIG. 44, there are N frequency bins, W transmit waveforms, and R data rates. Each row includes a union of parameter selections N×W×R rows, and each column is the output of one metric vector. Subset summing is then utilized over a significantly large reward matrix 440, and may be performed over columns and/or rows.

Figure 45:
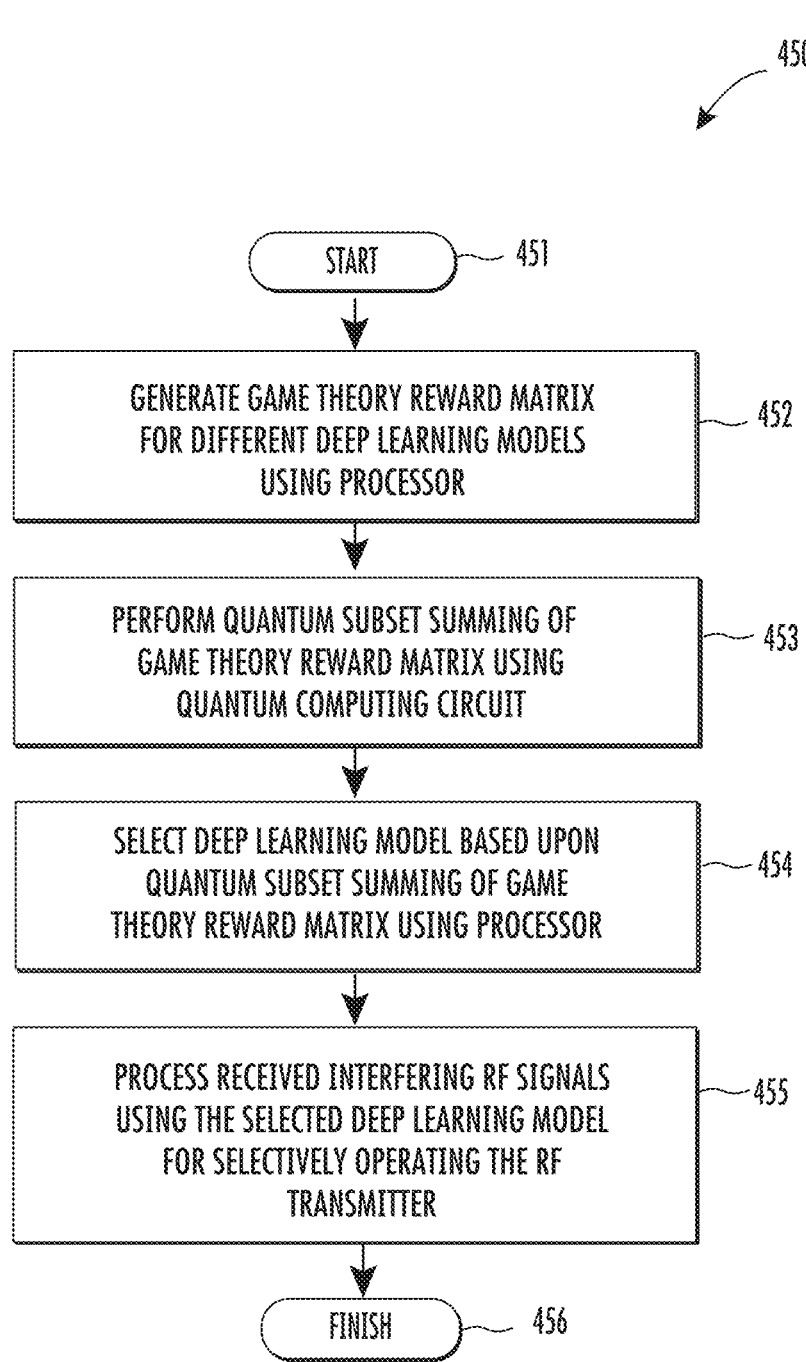
FIG. 45 is a flow diagram illustrating example method aspects associated with the cognitive radio device of FIG. 41.

A related method is now described with reference to the flow diagram 450 of FIG. 45 for operating the cognitive radio device 415. The method begins (Block 451) using the processor 418 for generating a game theory reward matrix for a plurality of different deep learning models, at Block 452, and cooperating with the quantum computing circuit 417 to perform quantum subset summing of the game theory reward matrix, at Block 453. The method further illustratively includes using the processor 418 for selecting a deep learning model from the plurality thereof based upon the quantum subset summing of the game theory reward matrix, at Block 454, and processing the received interfering RF signals using the selected deep learning model for selectively operating the RF transmitter, at Block 455. The method of FIG. 45 illustratively concludes at Block 456.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. An object detection device comprising:
   a variational autoencoder (VAE) configured to encode image data to generate a latent vector, and decode the latent vector to generate new image data;

a quantum computing circuit configured to perform quantum subset summing; and
   a processor configured to
      generate a game theory reward matrix for a plurality of different deep learning models, the game theory reward matrix including a first arrangement of data corresponding to the different deep learning models, and a second arrangement of data corresponding to predictive deep learning metrics for the different deep learning models,
      cooperate with the quantum computing circuit to perform quantum subset summing of the game theory reward matrix,
      select a deep learning model from the plurality thereof based upon the quantum subset summing of the game theory reward matrix, and
      process the new image data using the selected deep learning model for object detection.

2. The object detection device of claim 1 wherein the first arrangement of data comprises rows, and the second arrangement of data comprises columns.

3. The object detection device of claim 1 wherein the processor is configured to construct a 3D latent space for the selected deep learning model, generate clusters of eigenvalues from the selected model for different object classes, and process the new image data using the selected deep learning model for object detection based upon the clusters of eigenvalues.

4. The object detection device of claim 3 wherein the quantum computing circuit is configured to construct a Z-test for a test observation for each object class.

5. The object detection device of claim 4 wherein the processor is configured to determine a P-value for each Z-test, and to determine a target object class based upon a maximum P-value.

6. The object detection device of claim 1 wherein the plurality of different deep learning models comprises at least some of Adaptive Moment Estimation (ADAM), Stochastic Gradient Descent with Momentum (SGDM), and RMSProp deep learning models.

7. The object detection device of claim 1 wherein the VAE comprises an encoder configured to generate a mean vector and a standard deviation vector from the image data, and generate the latent vector from the mean vector and the standard deviation vector.

8. The object detection device of claim 1 wherein the image data comprises geospatial image data.

9. An object detection device comprising:
   a variational autoencoder (VAE) configured to encode geospatial image data to generate a latent vector, and decode the latent vector to generate new geospatial image data;
   a quantum computing circuit configured to perform quantum subset summing; and
   a processor configured to
      generate a game theory reward matrix for a plurality of different deep learning models, the game theory reward matrix including rows corresponding to the different deep learning models, and columns corresponding to predictive deep learning metrics for the different deep learning models,
      cooperate with the quantum computing circuit to perform quantum subset summing of the game theory reward matrix,
      select a deep learning model from the plurality thereof based upon the quantum subset summing of the game theory reward matrix, and process the new geospatial image data using the selected deep learning model for object detection.

10. The object detection device of claim 9 wherein the processor is configured to construct a 3D latent space for the selected deep learning model, generate clusters of eigenvalues from the selected model for different object classes, and process the new geospatial image data using the selected deep learning model for object detection based upon the clusters of eigenvalues.

11. The object detection device of claim 10 wherein the quantum computing circuit is configured to construct a Z-test for a test observation for each object class.

12. The object detection device of claim 11 wherein the processor is configured to determine a P-value for each Z-test, and to determine a target object class based upon a maximum P-value.

13. The object detection device of claim 9 wherein the plurality of different deep learning models comprises at least some of Adaptive Moment Estimation (ADAM), Stochastic Gradient Descent with Momentum (SGDM), and RMSProp deep learning models.

14. The object detection device of claim 9 wherein the VAE comprises an encoder configured to generate a mean vector and a standard deviation vector from the geospatial image data, and generate the latent vector from the mean vector and the standard deviation vector.

15. An object detection method comprising:
encoding image data to generate a latent vector, and decoding the latent vector to generate new image data, using a variational autoencoder (VAE);
generating a game theory reward matrix for a plurality of different deep learning models using a processor, the game theory reward matrix including a first arrangement of data corresponding to the different deep learning models, and a second arrangement of data corresponding to predictive deep learning metrics for the different deep learning models;
performing quantum subset summing of the game theory reward matrix using a quantum computing circuit;
selecting a deep learning model from the plurality thereof based upon the quantum subset summing of the game theory reward matrix using the processor; and
processing the new image data with the processor using the selected deep learning model for object detection.

16. The method of claim 15 wherein the first arrangement of data comprises rows, and the second arrangement of data comprises columns.

17. The method of claim 15 comprising:
constructing a 3D latent space for the selected deep learning model using the processor;
generating clusters of eigenvalues from the selected model for different object classes using the processor; and processing the new image data using the selected deep learning model for object detection based upon the clusters of eigenvalues using the processor.

18. The method of claim 17 comprising constructing a Z-test for a test observation for each object class using the quantum computing circuit.

19. The method of claim 18 comprising determining a P-value for each Z-test, and determining a target object class based upon a maximum P-value using the processor.

20. The method of claim 15 wherein the plurality of different deep learning models comprises at least some of Adaptive Moment Estimation (ADAM), Stochastic Gradient Descent with Momentum (SGDM), and RMSProp deep learning models.

21. An object detection device comprising:
a variational autoencoder (VAE) configured to encode geospatial image data to generate a latent vector, and decode the latent vector to generate new geospatial image data;
a quantum computing circuit configured to perform quantum subset summing; and
a processor configured to
generate a game theory reward matrix for a plurality of different deep learning models,
cooperate with the quantum computing circuit to perform quantum subset summing of the game theory reward matrix,
select a deep learning model from the plurality thereof based upon the quantum subset summing of the game theory reward matrix, and
process the new geospatial image data using the selected deep learning model for object detection.

22. The object detection device of claim 21 wherein the processor is configured to construct a 3D latent space for the selected deep learning model, generate clusters of eigenvalues from the selected model for different object classes, and process the new geospatial image data using the selected deep learning model for object detection based upon the clusters of eigenvalues.

23. The object detection device of claim 21 wherein the plurality of different deep learning models comprises at least some of Adaptive Moment Estimation (ADAM), Stochastic Gradient Descent with Momentum (SGDM), and RMSProp deep learning models.

24. The object detection device of claim 21 wherein the VAE comprises an encoder configured to generate a mean vector and a standard deviation vector from the geospatial image data, and generate the latent vector from the mean vector and the standard deviation vector.

* * * * *